(12) United States Patent  
Matsushita et al.

(10) Patent No.: US 12,204,799 B2  
(45) Date of Patent: Jan. 21, 2025

(54) STORAGE SYSTEM AND MEMORY CONTROL METHOD

(71) Applicant: Hitachi, Ltd., Tokyo (JP)

(72) Inventors: Takaki Matsushita, Tokyo (JP); Kazuki Matsugami, Tokyo (JP); Akira Deguchi, Tokyo (JP); Norio Shimozono, Tokyo (JP); Shinichi Hayashi, Tokyo (JP)

(73) Assignee: Hitachi Vantara, Ltd., Yokohama (JP)

(*) Notice: Subject to any disclaimer, the term of this patent is extended or adjusted under 35 U.S.C. 154(b) by 0 days.

(21) Appl. No.: 18/244,058

(22) Filed: Sep. 8, 2023

(65) Prior Publication Data

US 2024/0231706 A1 Jul. 11, 2024

(30) Foreign Application Priority Data

Jan. 11, 2023 (JP) .................................. 2023-002530
Jun. 27, 2023 (JP) .................................. 2023-104941

(51) Int. Cl.
*G06F 12/00* (2006.01)
*G06F 3/06* (2006.01)
*G06F 12/02* (2006.01)

(52) U.S. Cl.
CPC ............ *G06F 3/0665* (2013.01); *G06F 3/065* (2013.01); *G06F 12/0253* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 10,963,485 | B1 | 3/2021 | Matsushita et al. | |
| 2014/0281306 | A1* | 9/2014 | Nakajima | G06F 3/0647 |
| | | | | 711/162 |
| 2018/0373429 | A1* | 12/2018 | Yamamoto | G06F 3/061 |
| 2020/0272359 | A1* | 8/2020 | Tsuruya | G06F 12/0895 |

FOREIGN PATENT DOCUMENTS

JP 2022-026812 A 2/2022

* cited by examiner

*Primary Examiner* — Daniel D Tsui
(74) *Attorney, Agent, or Firm* — Volpe Koenig

(57) ABSTRACT

A first node performs copy (virtual copy) of address mapping between a virtual volume and a pool to a first virtual volume to create a third virtual volume in the first node. A second node performs mapping from a first pool volume in the second node to the third virtual volume in the first node, links an address of the first pool volume, which is mapped to the third virtual volume, to an address of a second virtual volume in the second node on a one-to-one basis, and performs log-structured write of the data in the second virtual volume to a second pool volume in the second node.

15 Claims, 33 Drawing Sheets

FIG. 4

[VOLUME MANAGEMENT TABLE] 141

| VOLUME ID | CAPACITY | USAGE | VOLUME TYPE | BELONGING POOL | DIRECT MAP | CORRESPONDING POOL VOLUME ID |
|---|---|---|---|---|---|---|
| 0 | 100GB | 10GB | Virtual VOL | 0 | OFF | — |
| 1 | 200GB | 20GB | Pool VOL | 1 | OFF | — |
| 2 | 300GB | 10GB | Virtual VOL (Clone) | 1 | ON | 3 |
| 3 | 300GB | 40GB | Pool VOL (External VOL) | 1 | OFF | — |
| ... | ... | ... | ... | ... | | |

FIG. 5

[LOGICAL-PHYSICAL CONVERSION TABLE] 142

| LOGICAL ADDRESS | PHYSICAL ADDRESS (PAGE NUMBER) |
|---|---|
| 0x00000000 | 0 |
| 0x00000010 | 2 |
| 0x00000020 | FFFFFFFF(Invalid) |
| ... | ... |

FIG. 6

[PAGE MANAGEMENT TABLE]     143

| PAGE NUMBER (1431) | POOL VOLUME ID (1432) | START ADDRESS (1433) | STATUS [1:Allocated/0:Free] (1434) | ALLOCATION DESTINATION VOLUME ID (1435) | ALLOCATION DESTINATION LOGICAL ADDRESS (1436) |
|---|---|---|---|---|---|
| 0 | 0 | 0x00000000 | 1 | 0 | 0x00000000 |
| 1 | 0 | 0x00000010 | 0 | — | — |
| 2 | 0 | 0x00000020 | 1 | 0 | 0x00000010 |
| 3 | 1 | 0x00000000 | 0 | — | — |
| 4 | 1 | 0x00000010 | 1 | 0 | 0x00000020 |
| ... | ... | ... | ... | ... | ... |

FIG. 7

[POOL MANAGEMENT TABLE]     144

| POOL ID (1441) | CAPACITY (1442) | USAGE (1443) | VOLUME ID (1444) | ATTRIBUTE (1445) | EXTERNAL VOLUME ID (1446) |
|---|---|---|---|---|---|
| 0 | 10TB | 3TB | 1 | Internal | — |
| | | | 3 | External | 0 |
| | | | 5 | Internal | — |
| | | | 10 | External | 1 |
| | | | ... | | |

FIG. 8

[EXTERNAL VOLUME MANAGEMENT TABLE]     145

| EXTERNAL VOLUME ID (1451) | CONNECTION NODE ID (1452) | PORT ID (1453) | TARGET DEVICE ID (1454) |
|---|---|---|---|
| 0 | 1 | XXX | AAAABBBB |
| 1 | 0 | YYYY | CCCCDDD |
| 2 | 2 | ZZZ | EEEEFFFF |
| ... | ... | | |

FIG. 18
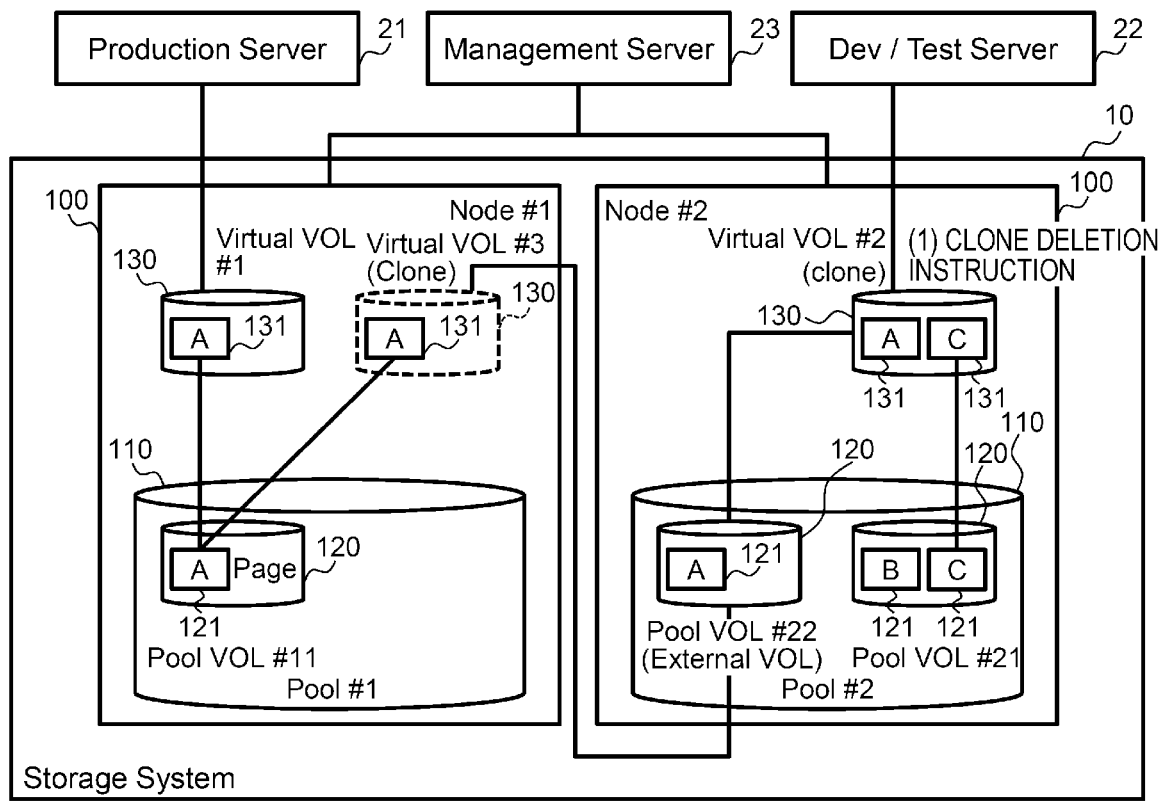
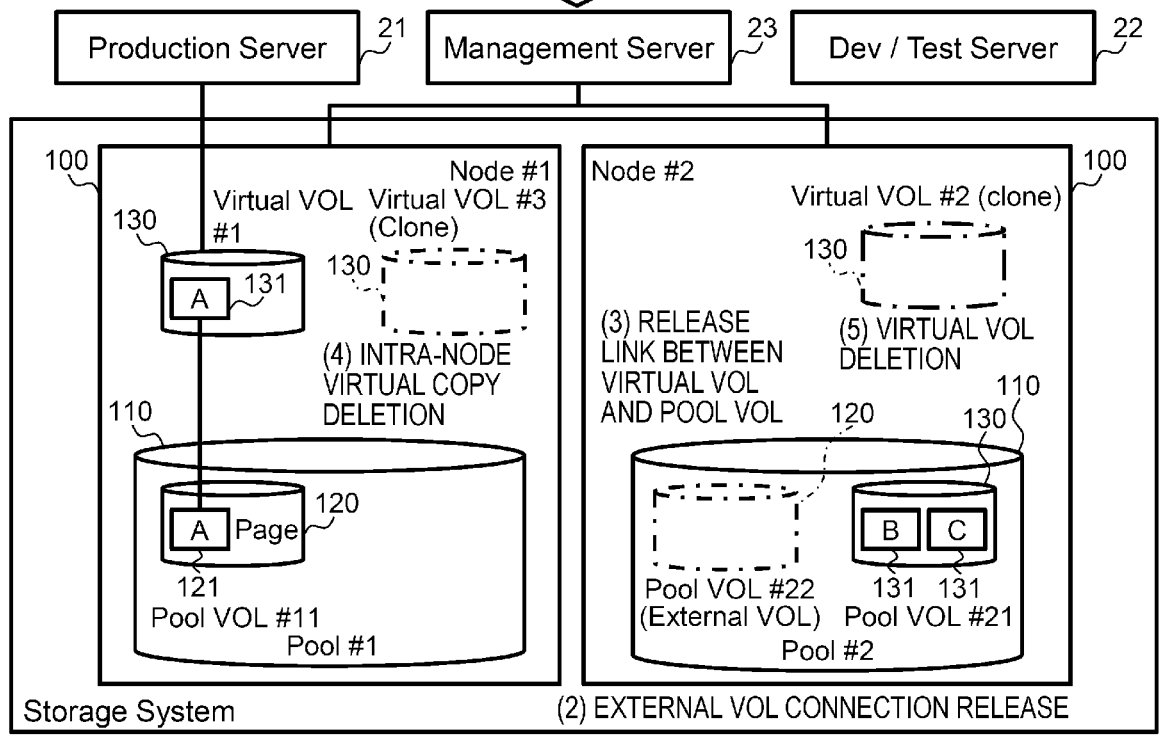

COMPARATIVE EXAMPLE

FIG. 26
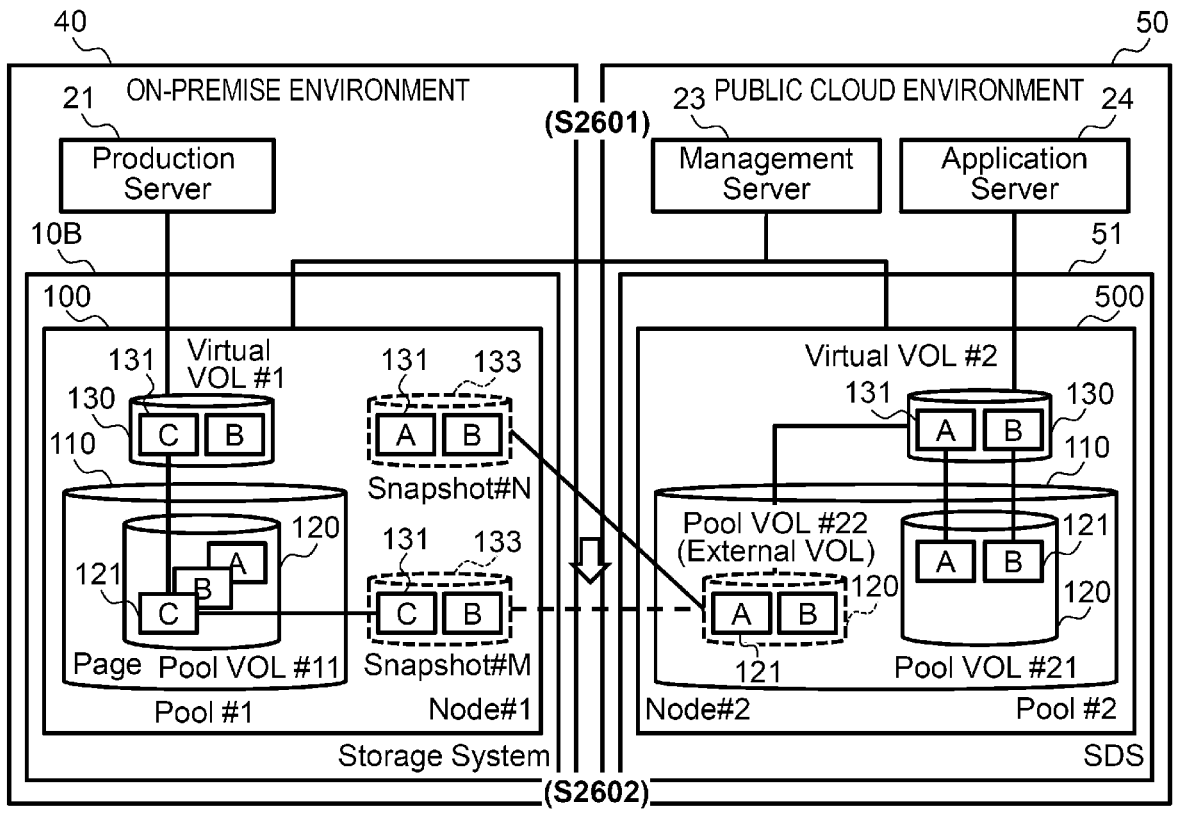
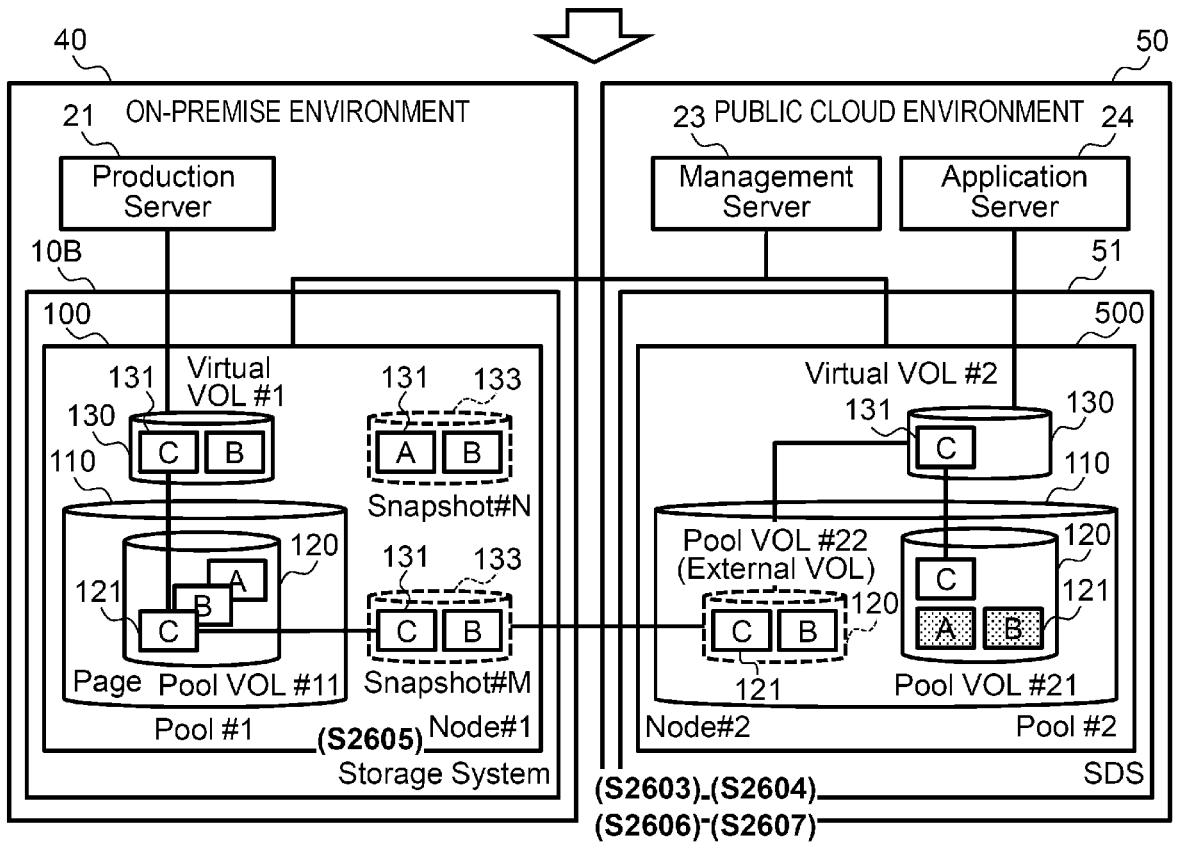

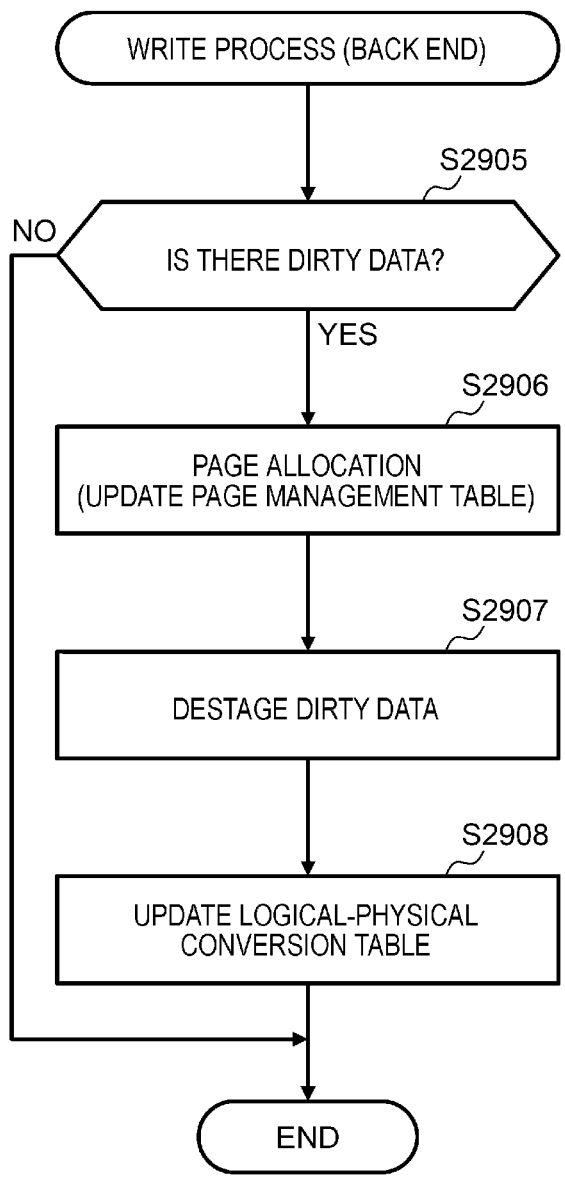

FIG. 33
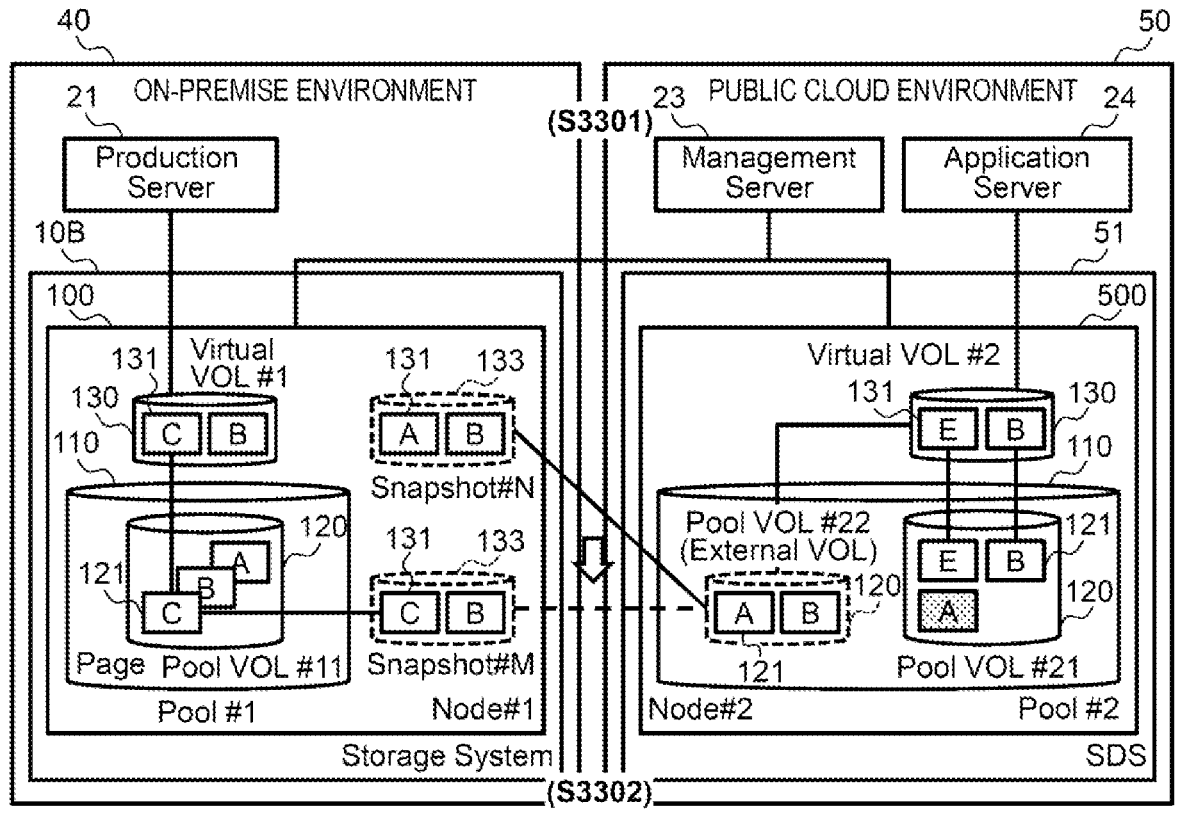
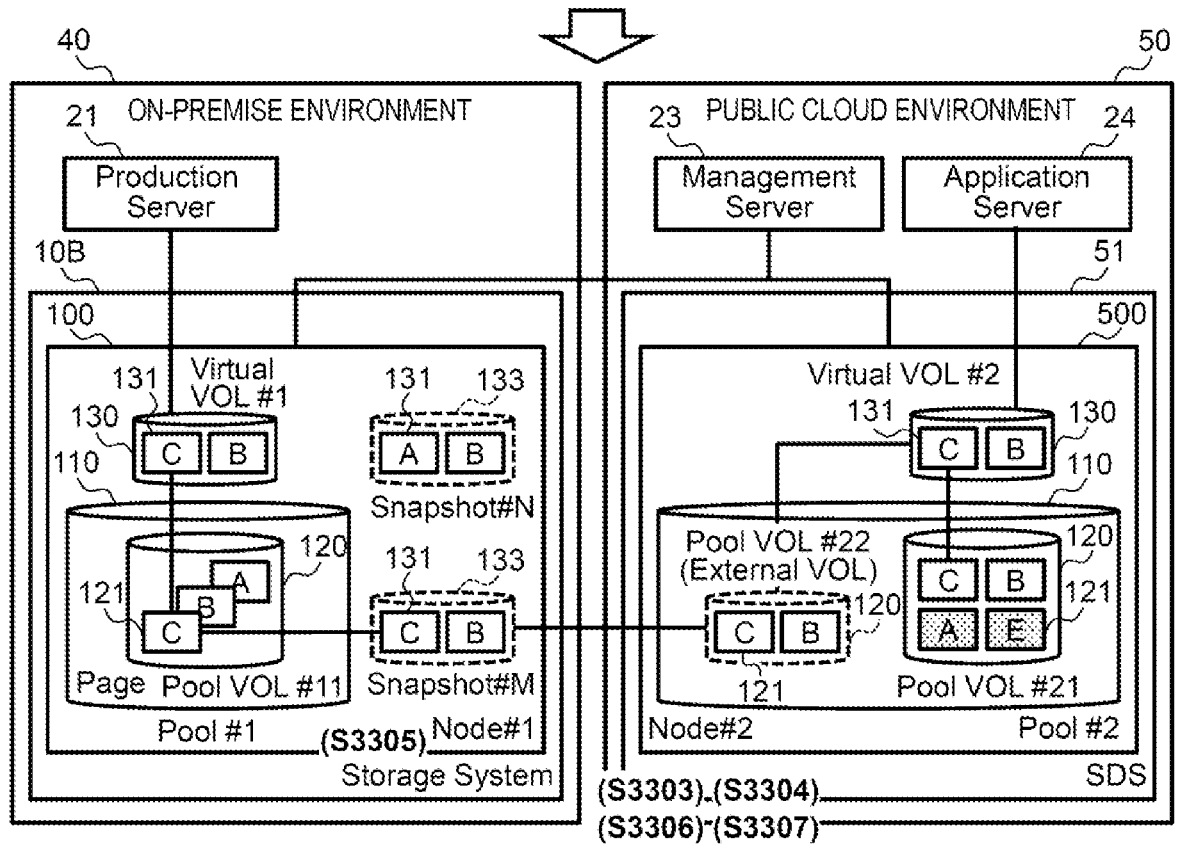

FIG. 34

[LOGICAL-PHYSICAL CONVERSION TABLE]      142

| LOGICAL ADDRESS | PHYSICAL ADDRESS (PAGE NUMBER) | HOST WRITE DATA FLAG |
|---|---|---|
| 0x00000000 | 0 | 0 |
| 0x00000010 | 2 | 1 |
| 0x00000020 | FFFFFFFF(Invalid) | 0 |
| ... | ... | |

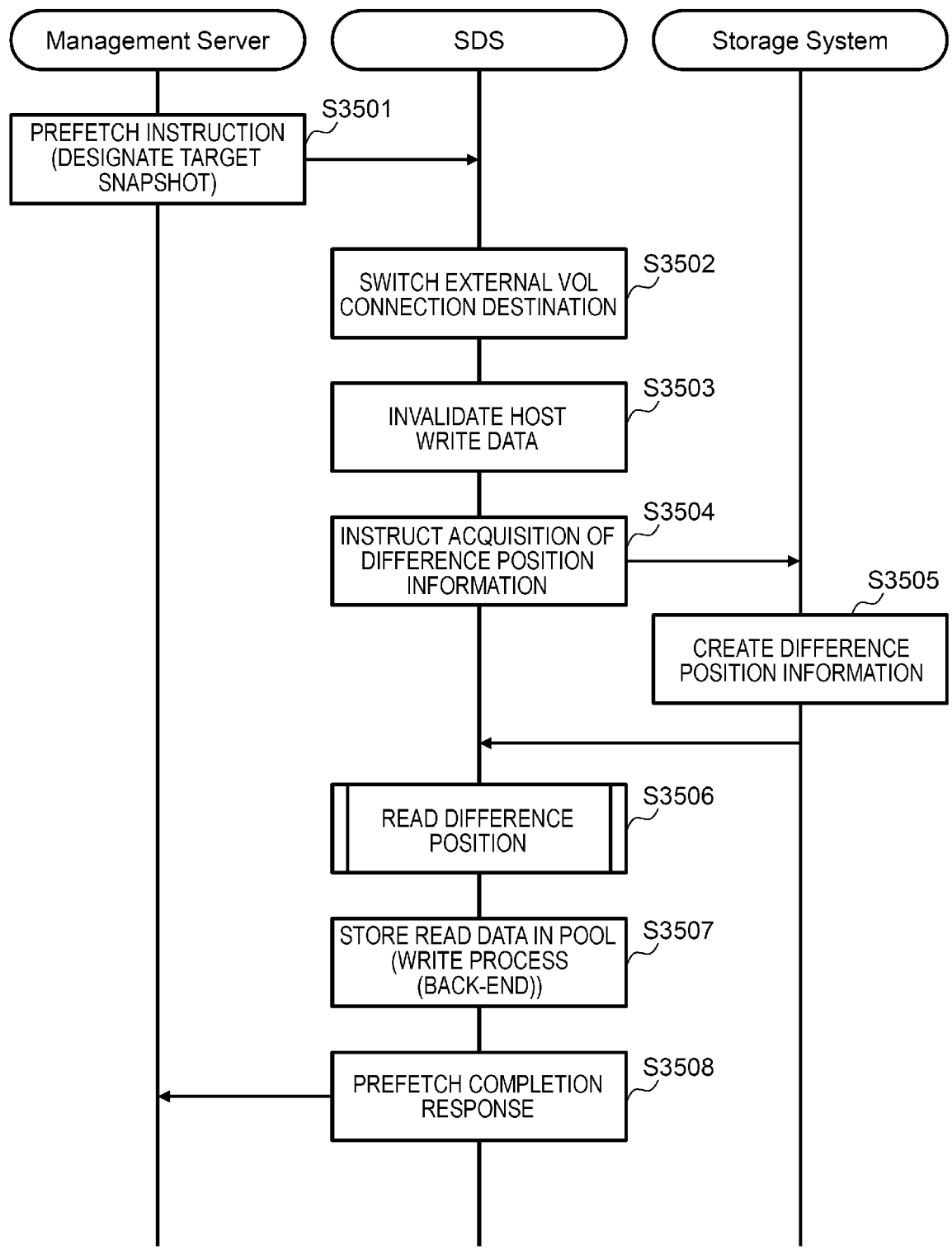

STORAGE SYSTEM AND MEMORY CONTROL METHOD

BACKGROUND OF THE INVENTION

1. Field of the Invention

The present invention relates generally to memory control.

2. Description of Related Art

For example, JP2022-26812A discloses a storage system capable of executing virtual copying according to redirect on write (RoW) method. The storage system of JP2022-26812A has a tree structure including first control information that is linked to a volume on a one-to-one basis and second control information that manages user data, and copies only the first control information to quickly create a copy of the volume.

Incidentally, in recent years, storage systems have been required to have a scale-out function that can expand performance and capacity from a small-scale configuration as needed. Specifically, a storage system is composed of a plurality of nodes (appliances), and nodes can be added or removed.

In recent years, the need for data utilization has increased, and data utilization includes an example in which data stored in a first environment is used in a second environment. Specifically, examples of data utilization include using data stored in a production environment for work in a development or test environment and using the data stored in a core business environment in a secondary usage environment such as analysis.

When such data utilization is applied to a plurality of nodes in a scale-out storage system, it is conceivable to use data stored in a first volume provided by a first node through a second volume provided by a second node.

One method is to copy all data stored in the first volume from the first node to the second node. However, in such method, the amount of data transferred between nodes is large, and the storage capacity of the second node is greatly consumed.

As another method, a method in which the second node acquires needed data from the first node when data is needed through the second volume is considered. However, such method requires data to be transferred between nodes each time the data is needed, thus degrading the performance of the second volume.

SUMMARY OF THE INVENTION

A storage system includes a plurality of nodes including first and second nodes. Each of the nodes includes a virtual volume, a pool including one or more pool volumes in which data to an address of the virtual volume is logically stored in an address mapped to the address of the virtual volume, one or more physical drives that store entity of data which is logically stored in the pool, a memory that stores management information about data which is information including mapping between an address of the virtual volume and an address of the pool, and a processor connected to the memory. A processor of the first node performs virtual copy, which is a copy of the mapping between the address of the virtual volume and the address of the pool, to a first virtual volume in the first node, to create a third virtual volume in the first node. A processor of the second node performs mapping from a first pool volume in the second node to the third virtual volume created in the first node, links an address of the first pool volume, which is mapped to the third virtual volume, to an address of a second virtual volume in the second node on a one-to-one basis, and when an address of data to be written is an address of the second virtual volume, performs log-structured write of the data to the second pool volume in the second node. The log-structured write includes storing post-update data in the pool while pre-update data remains in the pool, and changing a mapping destination address of the address of the virtual volume from an address of the pre-update data to an address of the post-update data.

According to the present invention, it is possible to reduce deterioration of the performance of the second volume in relation to acquiring the data of the first volume through the second volume without copying all pieces of data of the first volume on the first node to the second volume on the second node.

BRIEF DESCRIPTION OF THE DRAWINGS

FIG. 4 is a diagram showing an example of a volume management table 141;

FIG. 5 is a diagram showing an example of a logical-physical conversion table 142;

FIG. 6 is a diagram showing an example of a page management table 143;

FIG. 7 is a diagram showing an example of a pool management table 144;

FIG. 8 is a diagram showing an example of an external volume management table 145;

FIG. 18 is a diagram showing a processing image of a clone deletion process;

FIG. 26 is a diagram showing a process image in which the SDS 51 in the public cloud environment 50 prefetches data in the storage system 10B in the on-premises environment 40;

FIG. 29B is a flowchart showing an example of a processing procedure of the write process (back-end) in the SDS 51 in the public cloud environment 50;

FIG. 33 is a diagram showing a process image in which the SDS 51 in the public cloud environment 50 prefetches data in the storage system 10B in the on-premises environment 40;

FIG. 34 is a diagram showing an example of the logical-physical conversion table 142 of the SDS 51; and FIG. 35 is a flowchart showing an example of a processing procedure of the process in which the SDS 51 in the public cloud environment 50 prefetches the data in the storage system 10B in the on-premises environment 40.

DESCRIPTION OF EMBODIMENTS

Figure 1:
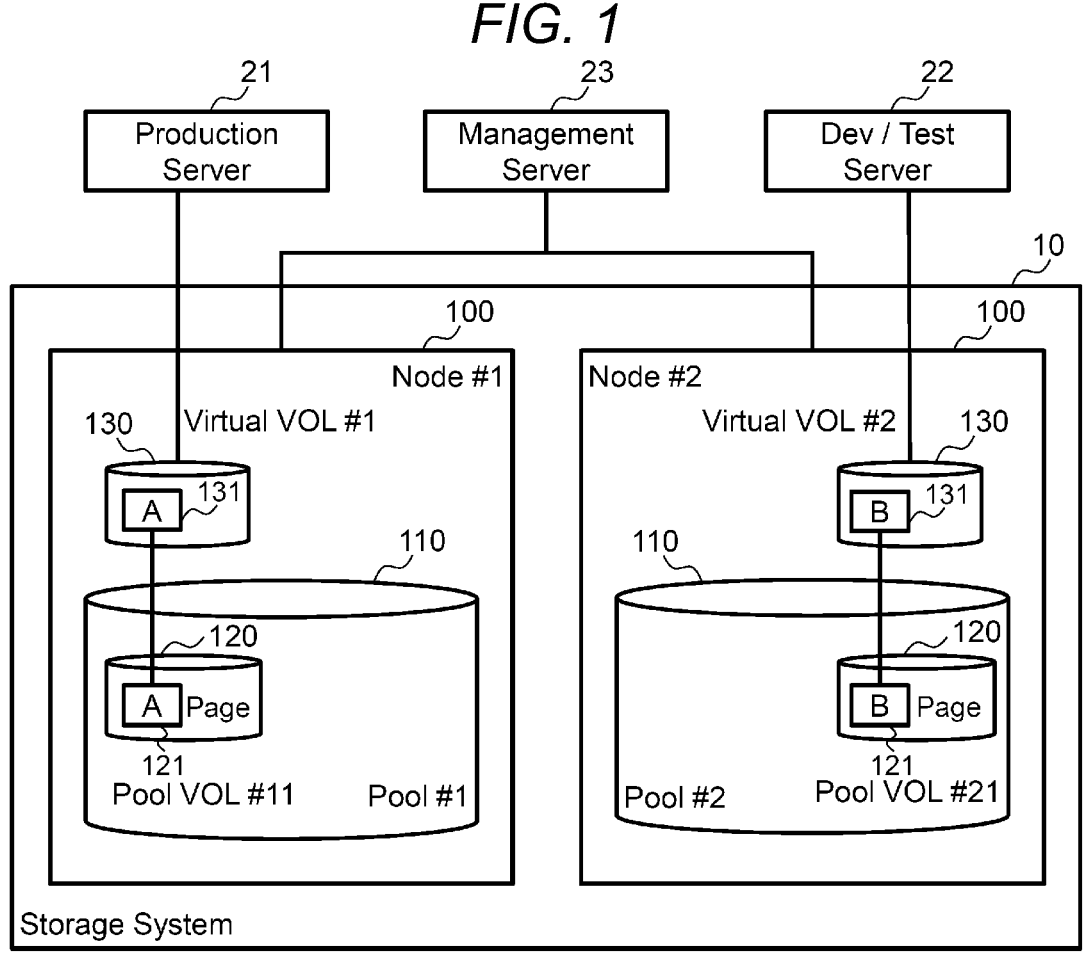
FIG. 1 is a block diagram showing a logical configuration example of a storage system 10 according to a first embodiment of the present invention.

Hereinafter, embodiments of the present invention will be described in detail with reference to the drawings.

The following description and drawings are examples for explaining the present invention, and are appropriately omitted and simplified for clarity of explanation. Not all combinations of the features described in the embodiments are necessarily essential to the solution of the invention. The present invention is not limited to the embodiments, and all application examples consistent with the idea of the present invention are included in the technical scope of the present invention. Those skilled in the art can make various additions and modifications within the scope of the present invention. The present invention can be implemented in various other forms. Unless otherwise specified, each component may be singular or plural.

In the following explanation, various types of information may be described using expressions such as "table", "list", and "queue", but various types of information may be expressed in data structures other than such expressions. "XX table", "XX list", or the like may be referred to as "XX information" to indicate independence of the data structure. Expressions such as "identification information", "identifier", "name", "ID", and "number" are used in a case of describing contents of each piece of information, but such expressions can be replaced with each other.

In the following description, in a case of describing elements of the same type without distinguishing between the elements, reference symbols or common numbers in reference symbols are used, and in a case of describing elements of the same type while distinguishing between the elements, the reference symbols of the elements may be used, or the IDs, identification numbers, or the like assigned to the elements may be used instead of the reference symbols. For example, in a case of describing "virtual volumes" without distinguishing, the virtual volumes are described as "virtual volume 130", and in a case where the individual virtual volumes 130 are distinguished and explained, the virtual volumes may be described as "virtual volume #1" and "virtual volume #2."

In the following description, a process performed by executing a program may be described, but the program is executed by at least one or more processors (for example, CPU) to perform a prescribed process while appropriately using storage resources (for example, memory) and/or interface devices (for example, communication ports). Therefore, a processor may be the subject of the process. Similarly, the subject that performs a process by executing a program may be a controller, a device, a system, a computer, a node, a storage system, a storage device, a server, a management computer, a client, or a host, each including a processor. The subject (for example, a processor) that performs a process by executing a program may include a hardware circuit that performs part or all of the process. For example, the subject that performs a process by executing a program may include a hardware circuit that executes encryption and decryption, or compression and decompression. A processor operates as a functional unit that implements a predetermined function by operating according to a program. Devices and systems including processors are devices and systems that include such functional units.

A program may be installed on an apparatus such as a computer, from a program source. The program source may be, for example, a program distribution server or a non-transitory computer-readable storage medium. When the program source is a program distribution server, the program distribution server includes a processor (for example, a CPU) and a non-transitory storage resource, and the storage resource may further store a distribution program and a program to be distributed. The processor of the program distribution server may distribute the program to be distributed to other computers by executing the distribution program. In the following description, two or more programs may be implemented as one program, and one program may be implemented as two or more programs.

(1) First Embodiment

(1-1) System Configuration

FIG. 1 is a block diagram showing a logical configuration example of a storage system 10 according to a first embodiment of the present invention.

The storage system 10 is a storage system that employs a loosely coupled scale-out architecture, and includes a plurality of nodes 100 (for example, Node #1 and Node #2). As shown in FIG. 1, each node 100 includes a pool 110 (Pool), a pool volume 120 (Pool VOL), and a virtual volume 130 (Virtual VOL), as a logical configuration. A storage that employs a loosely coupled scale-out architecture has a scale-out function that can expand performance or capacity from a small-scale configuration as needed. A loosely coupled scale-out method in which a plurality of appliances (nodes 100) are clustered is mainly used, and the storage system 10 shown in FIG. 1 also adopts such scale-out method, but the present invention is not limited thereto.

The pool volume 120 is a logical storage device (logical volume) managed by the storage system 10, and the pool 110 is created by integrating one or more pool volumes 120. The virtual volume 130 is a virtual volume created from the pool 110, and data of the virtual volume 130 is managed in units of pages 131 (Page).

The virtual volume 130 is associated with a belonging pool (pool 110 of a creation source) by a volume management table 141, which will be described later. With respect to the page 131, an address of an allocation destination is managed by a page management table 143, which will be described later. For example, in FIG. 1, a virtual volume #1 is associated with a pool #1 including a pool volume #11, and a page 131 of "A" of the virtual volume #1 is assigned to a page 121 (Page) of "A" of the pool volume #11.

Figure 2:
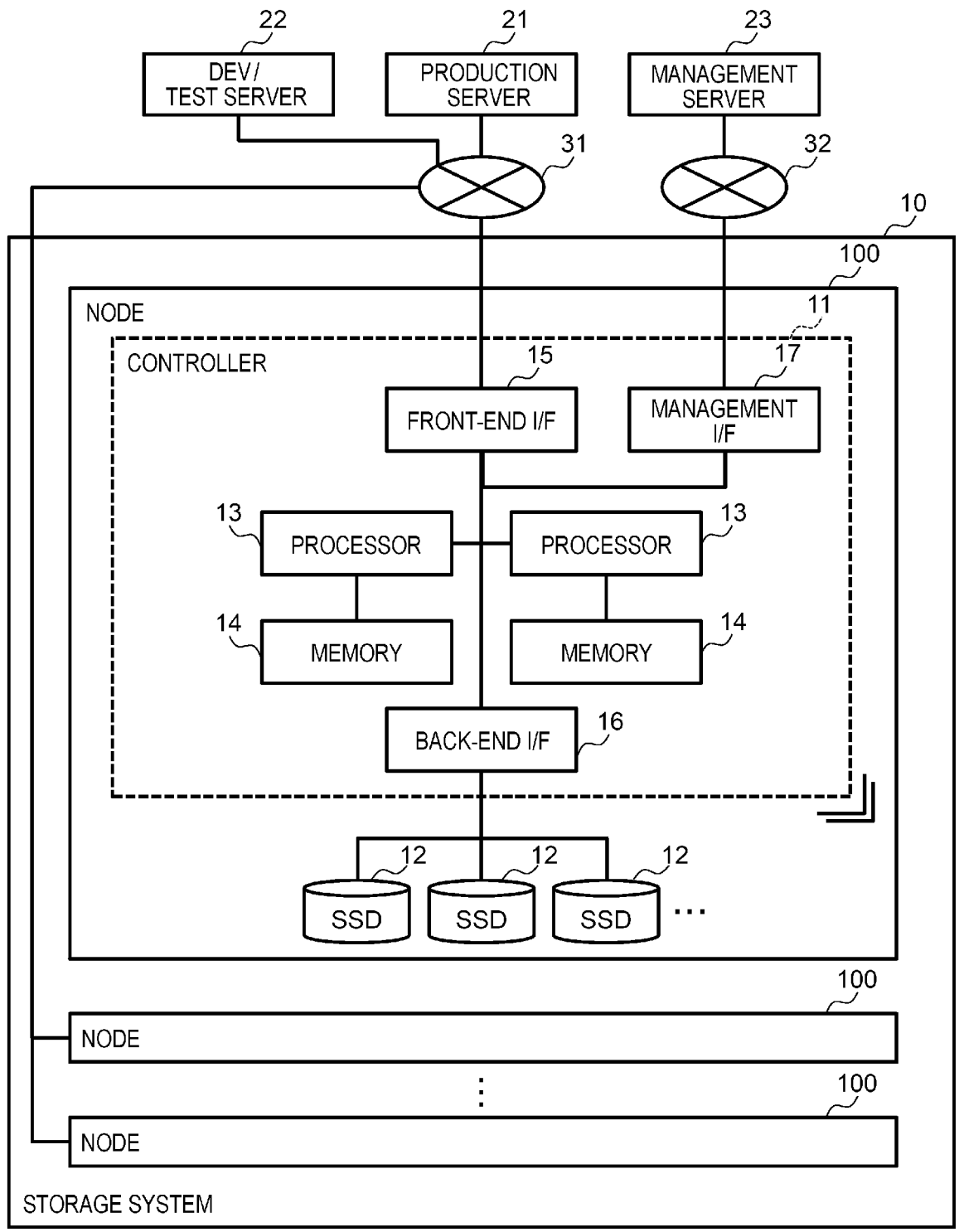
FIG. 2 is a block diagram showing a hardware configuration example of the storage system 10.

FIG. 2 is a block diagram showing a hardware configuration example of the storage system 10. As described in FIG. 1, the storage system 10 includes the plurality of nodes 100. The storage system 10 is connected to a production server 21 and a development/test server 22 via a storage network 31, and is connected to a management server 23 via a management network 32.

The production server 21 is a server that operates in a production environment that handles business data. The development/test server 22 is a server that operates in a development environment or a test environment. The production server 21 and the development/test server 22, as hosts, transmit I/O requests (write requests or read requests) with designated I/O destinations, to a controller 11 of the storage system 10.

The management server 23 is a server that manages the storage system 10. Management control of the storage system 10 by the management server 23 is performed via the management network 32.

The storage network 31 is, for example, a fiber channel (FC) network, and the management network 32 is, for example, an internet protocol (IP) network. Note that the storage network 31 and the management network 32 may be the same communication network.

The node 100 includes one or more controllers 11 and one or more physical drives 12 (SSD). The physical drive 12 is connected to each controller 11, and one or more physical drives 12 are assigned to each controller 11. In FIG. 2, a solid state drive (SSD) is shown as an example of the physical drive 12, but the present embodiment is not limited thereto as long as a device that physically stores data such as a hard disk drive (HDD) is used.

The controller 11 includes one or more processors 13, one or more memories 14, a front-end I/F 15, a back-end I/F 16, and a management I/F 17.

The processor 13 is a processor that implements various controls by executing programs read from the memory 14. In the present embodiment, the processor 13 controls writing and reading of data, and the like in addition to clone creation and deletion. The processor 13 is, for example, a central processing unit (CPU), but is not limited thereto.

The memory 14 is a storage unit that stores programs executed by the processor 13, data used by the processor 13, and the like. In the present embodiment, for example, as shown in FIG. 2, the memory 14 is duplicated by a set of the processor 13 and the memory 14.

The front-end I/F 15 is a communication interface device that mediates data exchange between the production server 21 or development/test server 22 and the controller 11. The controller 11 is connected to the production server 21 and the development/test server 22 via the storage network 31 from the front-end I/F 15.

The back-end I/F 16 is a communication interface device that mediates data exchange between the physical drive 12 and the controller 11. A plurality of physical drives 12 are connected to the back-end I/F 16.

The management I/F 17 is a communication interface device that mediates data exchange between the management server 23 and the controller 11. The controller 11 is connected to the management server 23 via the management network 32 from the management I/F 17.

(1-2) Memory Configuration

Figure 3:
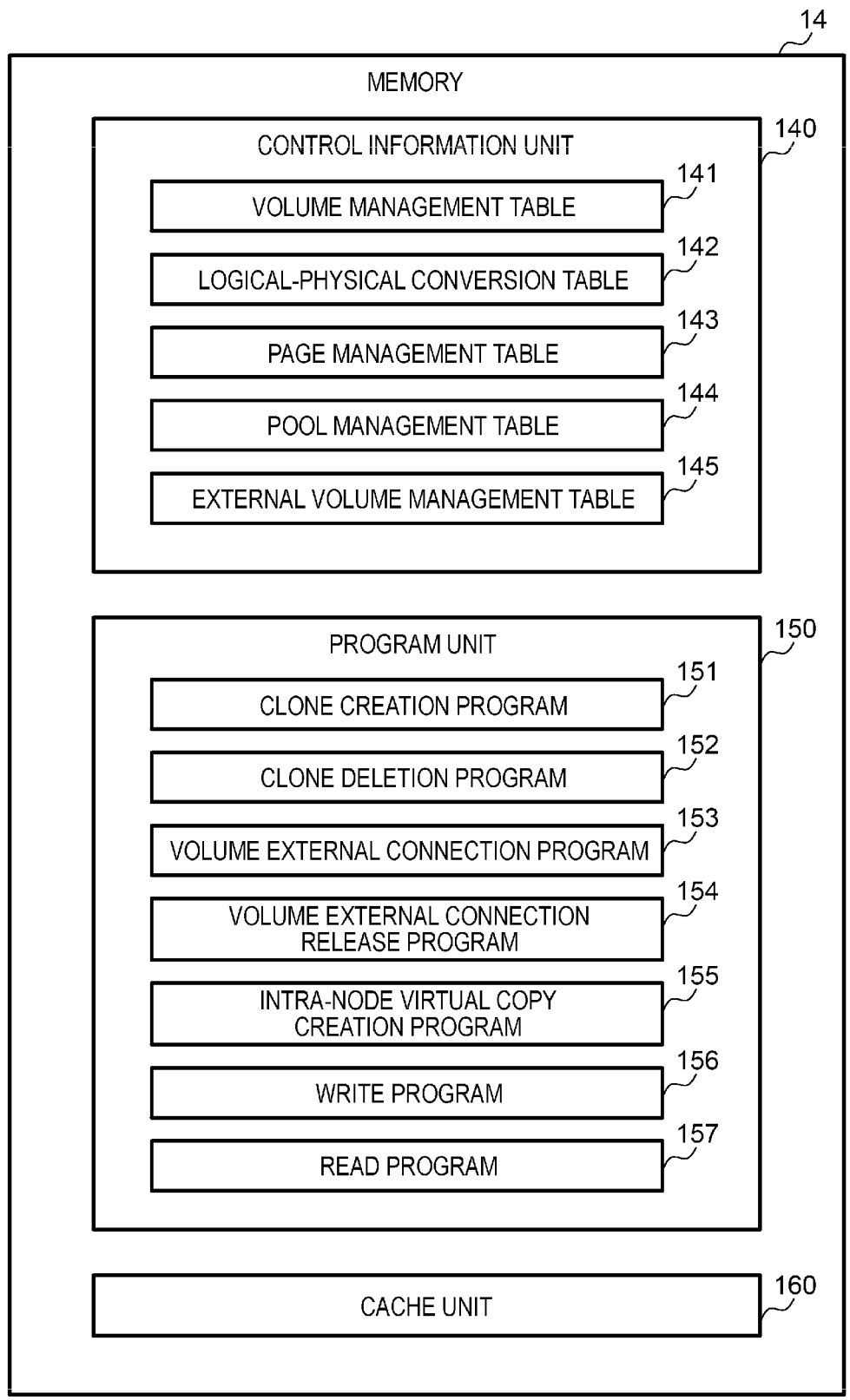
FIG. 3 is a diagram showing a configuration example of a memory 14 of the storage system 10.

FIG. 3 is a diagram showing a configuration example of the memory 14 of the storage system 10, showing an example of programs and control data in the memory 14 used by the storage system 10. The programs and control data used by the storage system 10 (mainly the controller 11) are read into the memory 14 and executed or used by the processor 13.

As shown in FIG. 3, the memory 14 includes memory areas of a control information unit 140 that stores control data, a program unit 150 that stores programs executed by the processor 13, and a cache unit 160 as a cache. The program unit 150 is a local memory used by the memory 14 and the processor 13 (see FIG. 2) belonging to the same group as the memory 14. On the other hand, the control information unit 140 may be a shared memory that can be used not only by the processors 13 belonging to the same group as the memory 14, but also by the processors 13 belonging to other groups. At least one of the above memory areas may be an independent memory.

The control information unit 140 stores the volume management table 141, a logical-physical conversion table 142, the page management table 143, a pool management table 144, and an external volume management table 145. FIGS. 4 to 8, which will be described later, show configuration examples of each table.

The program unit 150 stores a clone creation program 151, a clone deletion program 152, a volume external connection program 153, a volume external connection release program 154, an intra-node virtual copy creation program 155, a write program 156, and a read program 157. Such programs are installed for each of the plurality of controllers 11 and cooperate with each other to perform target processes. Details of the process by each program will be described later.

The cache unit 160 temporarily stores data sets to be written to or read from the physical drive 12.

FIG. 4 is a diagram showing an example of the volume management table 141. The volume management table 141 is control data for managing volumes such as the pool volume 120 and the virtual volume 130. The volume management table 141 includes items of a volume ID 1411, a capacity 1412, usage 1413, a volume type 1414, a belonging pool 1415, a direct map 1416, and a corresponding pool volume ID 1417.

The volume ID 1411 indicates a volume identifier (volume ID). The capacity 1412 indicates a capacity allocated to the volume identified by the volume ID 1411 (hereinafter referred to as the volume), and the usage 1413 indicates the current usage of the volume.

The volume type 1414 indicates a type of the volume. When the volume is a clone that is a virtual copy of a certain volume, "(Clone)" is indicated in the type, and when the volume is an external volume that is externally connected from a node different from the own node, "(External VOL)" is indicated in the type.

In the present description, "externally connected" means mapping from the virtual volume 130 of the own node to the data of another node, and also includes mapping the pool volume 120 with which the virtual volume 130 of the own node is linked and the virtual volume 130 storing the data of the other node. More specifically, when attempting to implement an external connection for the data of the node #1, which is a virtual clone source node (data of the pool volume #11) from virtual volume #2 of the node #2, which is a virtual clone destination node, a pool volume #22 to which the virtual volume #2 is linked and the virtual volume storing the data of the pool volume #11 in the node #1 (in the present example, the virtual volume #3 which is the intra-node virtual copy of the virtual volume #1, instead of the virtual copy source virtual volume #1) are mapped. Here, the pool volume #22 relays the mapping between the virtual volume 130 (virtual volume #2) of the own node and the virtual volume 130 (virtual volume #3) storing the data of the other node, and the pool volume #22 is called an external volume. The reason why the pool volume #22 is externally connected to virtual volume #3 instead of the virtual volume #1 is to prevent the data change in the clone source node (node #1) after clone creation from affecting the clone destination virtual volume #2.

The belonging pool 1415 indicates the identifier (pool ID) of the pool 110 to which the volume belongs. When the volume is a virtual volume (Virtual VOL), the belonging pool 1415 indicates the pool ID of the pool 110 of a creation source.

The direct map 1416 indicates whether the data of the volume is directly mapped. In the storage system 10, when the body of the data of the virtual volume 130 is stored in the node 100 different from the own node (for example, in the case of an external connection described later), direct mapping is performed, and the direct map 1416 is set to "ON". In the case of a virtual volume (virtual clone) generated by virtual copying the virtual volume 130 in the same node, direct mapping is not performed and the direct map 1416 is "OFF".

The corresponding pool volume ID 1417 indicates the volume ID of the corresponding pool volume 120, when direct mapping of the volume is "ON".

FIG. 5 is a diagram showing an example of the logical-physical conversion table 142. The logical-physical conversion table 142 is data for managing correspondence between a logical address 1421 and a physical address 1422 in which data is stored. In the present embodiment, data is processed in units of pages, so the physical addresses 1422 in FIG. 5 are indicated by page numbers. When the value of the physical address 1422 is a valid value such as "0" or "2", it means that data is stored in the own node that stores the logical-physical conversion table 142. On the other hand, when the value of the physical address 1422 is an invalid value such as "FFFFFFFF", data is stored in the logical address 1421 of the directly mapped pool volume 120 in the own node (same address as the logical address 1421 of the accessed virtual volume). For example, when the accessed virtual volume is a clone and is directly mapped to a pool volume, and the pool volume is externally connected to the virtual volume of the clone source node, the entity of the data is stored in the clone source.

FIG. 6 is a diagram showing an example of the page management table 143. The page management table 143 is control data for managing pages. The page management table 143 includes items of a page number 1431, a pool volume ID 1432, a start address 1433, a status 1434, an allocation destination volume ID 1435, and an allocation destination logical address 1436.

The page number 1431 indicates an identifier (page number) assigned to each page. The pool volume ID 1432 indicates the volume ID of the pool volume 120 that stores the entity data of the page identified by the page number 1431 (hereinafter referred to as the page). The start address 1433 indicates the start address of the entity data of the page stored in the pool volume ID 1432.

The status 1434 indicates whether the page is assigned to the page 131 of the virtual volume 130. The allocation destination volume ID 1435 indicates the volume ID of the virtual volume 130 to which the page is allocated, and the allocation destination logical address 1436 indicates the logical address (start address) of the page allocated to the virtual volume 130.

FIG. 7 is a diagram showing an example of the pool management table 144. The pool management table 144 is control data for managing the pool 110. The pool management table 144 includes items of a pool ID 1441, a capacity 1442, usage 1443, a volume ID 1444, an attribute 1445, and an external volume ID 1446.

The pool ID 1441 indicates a pool identifier (pool ID). The capacity 1442 indicates the capacity allocated to the pool identified by the pool ID 1441 (hereinafter referred to as the pool), and the usage 1443 indicates the current usage of the pool.

The volume ID 1444 indicates the volume ID of the pool volume 120 belonging to the pool. The attribute 1445 indicates whether the entity data of the volume exists in the pool (own node) (Internal) or the entity data of the volume exists in another pool (another node) (External), as an attribute of the volume identified by the volume ID 1444. Specifically, when the volume is an "external volume (External VOL)" that is externally connected to the virtual volume 130 of another node, the attribute 1445 is "External". The external volume ID 1446 indicates the identifier of the external volume, when the attribute 1445 is "External".

FIG. 8 is a diagram showing an example of the external volume management table 145. The external volume management table 145 is control data for managing a volume externally connected from another node (external volume). The external volume management table 145 includes items of an external volume ID 1451, a connection node ID 1452, a port ID 1453, and a target device ID 1454.

The external volume ID 1451 indicates an identifier given to the external volume in the own node. The external volume ID 1446 of the pool management table 144 shown in FIG. 8 corresponds to the external volume ID 1451.

The connection node ID 1452 indicates the node ID of the connection source node of the external volume identified by the external volume ID 1451 (hereinafter referred to as the external volume). A node ID is an identifier for uniquely identifying each of the plurality of nodes 100 configuring the storage system 10. The port ID 1453 indicates the identifier of the port of the own node to which the external volume is connected, and the target device ID 1454 indicates the identifier of the target device that stores the entity data of the external volume in the connection source node.

(1-3) Process

Below, as processes executed by the storage system 10 according to the present embodiment, a "clone creation process" for creating a clone of a volume (virtual volume 130), a "write process" executed in response to a write request to the clone, a "read process" executed in response to a read request to the clone, and a "clone deletion process" for deleting the clone will be described in detail.

(1-3-1) Clone Creation Process

Figure 9:
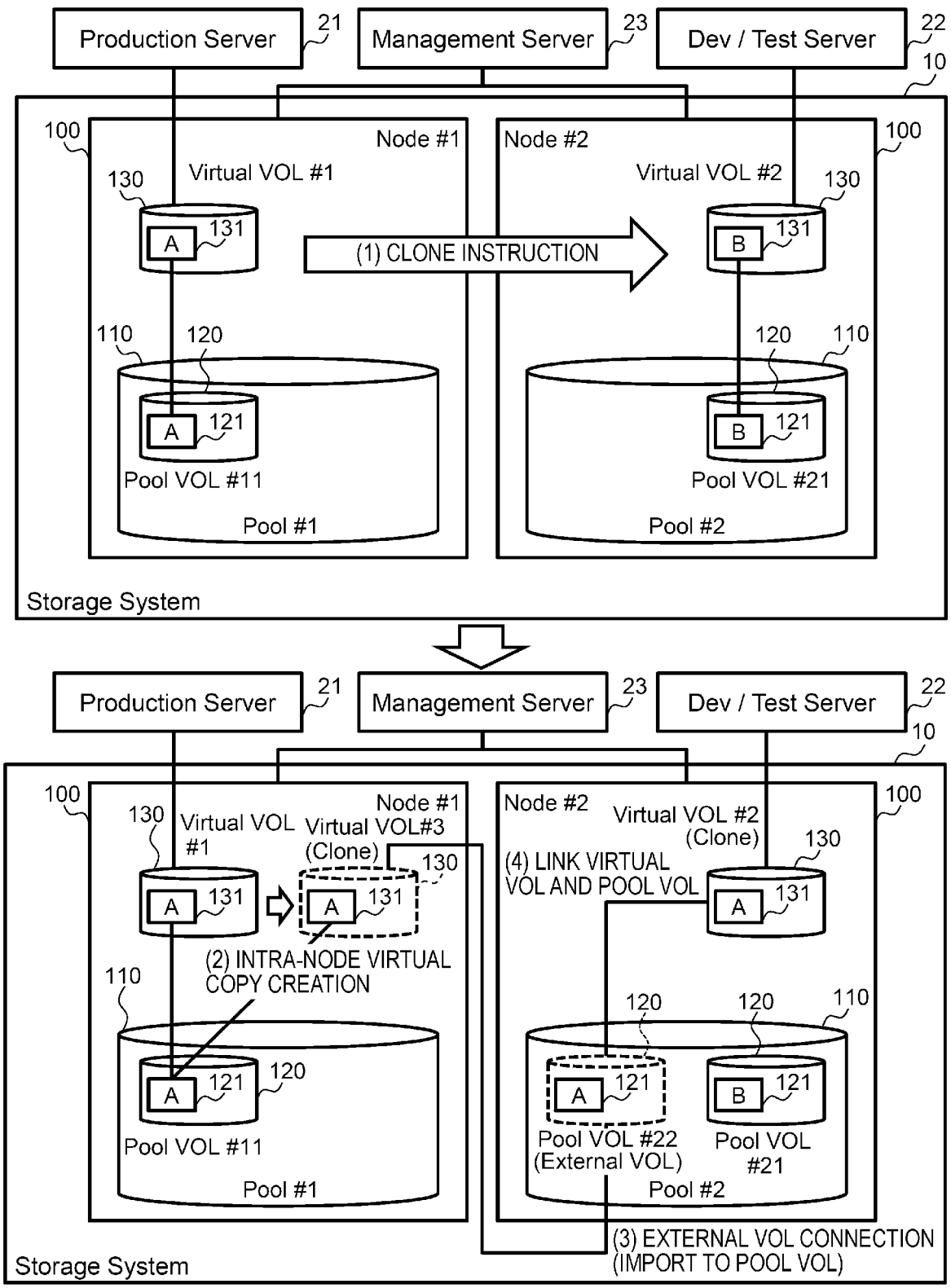
FIG. 9 is a diagram showing a processing image of a clone creation process.
Figure 10:
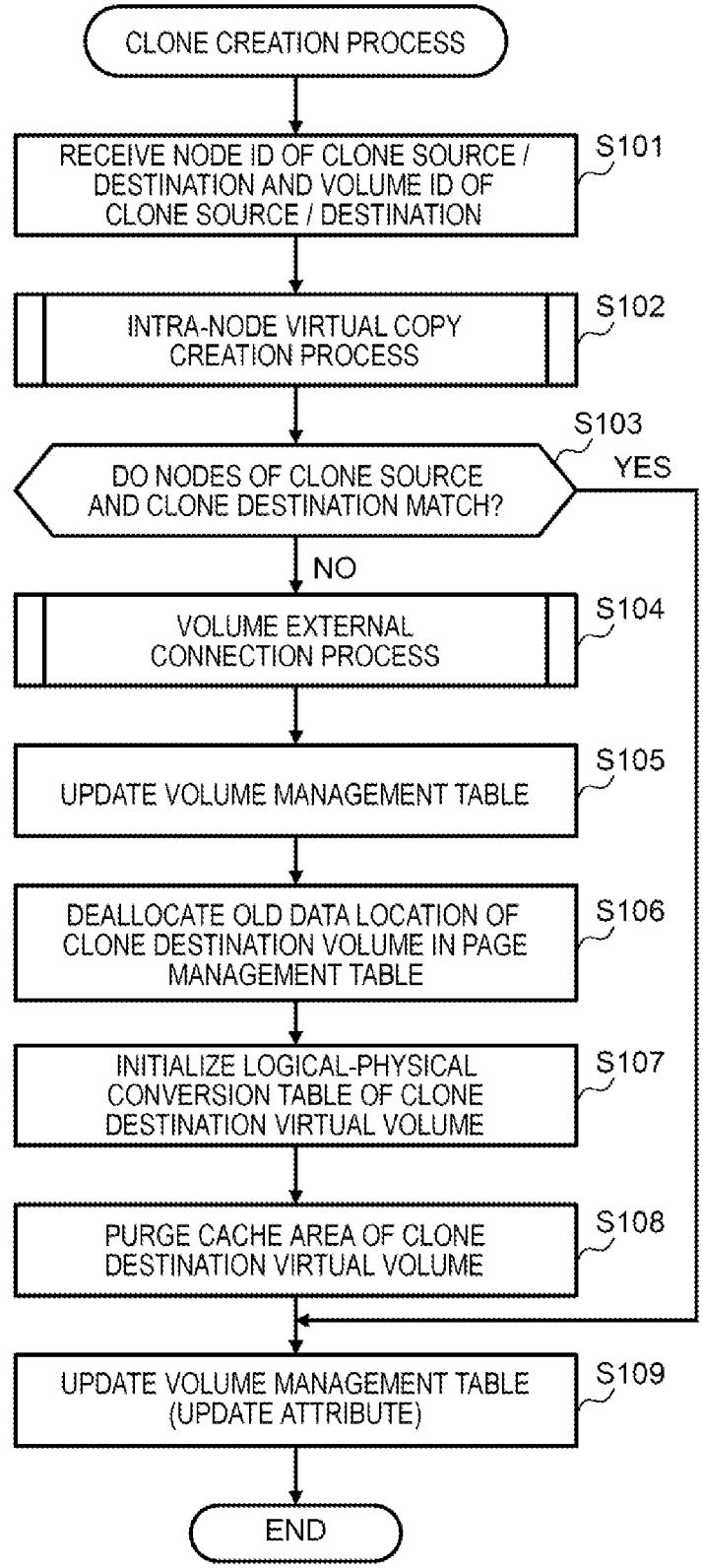
FIG. 10 is a flowchart showing an example of a processing procedure of the clone creation process.

FIG. 9 is a diagram showing a processing image of the clone creation process. The upper part of FIG. 9 shows a processing image when the host instructs to create a clone of a volume with a different node as the creation destination, and the lower part of FIG. 9 shows a processing image during the subsequent clone creation process. FIG. 10 is a flowchart showing an example of a processing procedure of the clone creation process. Below, the processing procedure of the clone creation process will be described according to the flowchart of FIG. 10 while showing the corresponding portions in FIG. 9 as appropriate.

A "clone instruction" to create a clone of the virtual volume 130 accessible from the own server in a predetermined node 100 is transmitted from the host (for example, the production server 21, but the management server 23 or the like may be used) to the storage system 10, and the clone creation process is started when the clone source node 100 receives the instruction.

As described in the problem to be solved by the invention, in the related art, in a storage system that employs a loosely coupled scale-out architecture in which a plurality of nodes are clustered, the volume clone creation destination is limited to the same node as the volume. On the other hand, the storage system 10 according to the present embodiment can designate a node different from the volume as the clone creation destination of the volume. Although the details will be described later, when the latter clone instruction is issued, a virtual clone of the volume (virtual volume 130) across the nodes 100 is created by executing the clone creation process. The clone instruction can be requested by the development/test server 22, but the processing procedure of the clone creation process requested by the development/test server 22 is the same as when the production server 21 requests the clone instruction, so the explanation is omitted.

In FIG. 9, in "(1) clone instruction", the production server 21 requests the node #1 to create a clone of the virtual volume #1 of the node #1 in the virtual volume #2 of the node #2 which is another node.

Here, in the controller 11 of the clone source node #1 that received the clone instruction, the processor 13 starts the clone creation program 151 to execute the clone creation process. Below, the started program is described as a process subject. The same applies to other processes described later.

According to FIG. 10, first, the clone creation program 151 receives the identifier of the volume of the clone source (the volume ID of the virtual volume #1 in the case of FIG. 9), the identifier of the node 100 where the volume of the clone source exists (same, node ID of the node #1), the identifier of the clone destination volume (same, volume ID of the virtual volume #2), and the identifier of the node 100 where the clone destination volume exists (same, node ID of the node #2) (step S101) as the information contained in the clone instruction.

Next, the clone creation program 151 creates a virtual copy of the clone source volume in the same node as the clone source by calling the intra-node virtual copy creation program 155 to execute an intra-node virtual copy creation process (step S102). The process corresponds to "(2) intra-node virtual copy creation" shown in FIG. 9, and the virtual volume #3, which is a clone of the virtual volume #1, is created inside the node #1.

Figure 11:
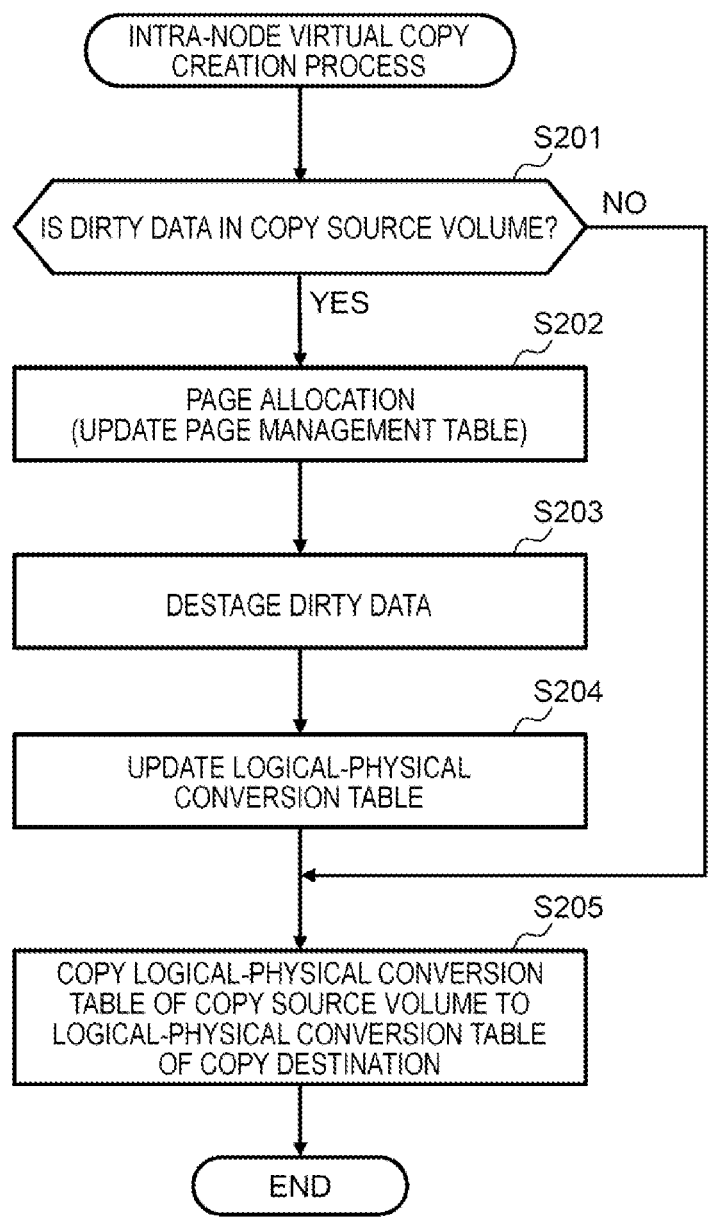
FIG. 11 is a flowchart showing an example of a processing procedure for an intra-node virtual copy creation process.

FIG. 11 is a flowchart showing an example of a processing procedure for the intra-node virtual copy creation process. The intra-node virtual copy creation process shown in FIG. 11 corresponds to the process of step S102 in FIG. 10, and is executed by the intra-node virtual copy creation program 155 of the clone source node (for example, the node #1). Note that, in the present description, creating a virtual copy in the same node is called copying.

According to FIG. 11, first, the intra-node virtual copy creation program 155 checks whether dirty data exists in the copy source volume (virtual volume #1) (step S201). The dirty data is a well-known flag for managing consistency of data stored in the memory (control information unit 140) and the cache (cache unit 160), and detailed description thereof will be omitted. When the dirty data exists (YES in step S201), the process proceeds to step S202, and when the dirty data does not exist (NO in step S201), the process proceeds to step S205.

In step S202, the intra-node virtual copy creation program 155 establishes data consistency between the control information unit 140 and the cache unit 160 based on the dirty data, performs page allocation of storing the dirty data of the copy source virtual volume, and updates the page management table 143.

Next, the intra-node virtual copy creation program 155 destages the dirty data (writes the data in the cache unit 160 to the physical drive 12) (step S203), and updates the logical-physical conversion table 142 with respect to the destage (step S204).

After the process of step S204, or when NO is determined in step S201, the intra-node virtual copy creation program 155 copies the logical-physical conversion table 142 of the copy source volume (virtual volume #1) to the logical-physical conversion table 142 of the copy destination volume (virtual volume #3) (step S205), and ends the intra-node virtual copy creation process.

By executing the intra-node virtual copy creation process as described above, the virtual volume #3, which is a virtual copy of the virtual volume #1, is created as shown in (2) of FIG. 9, and the page 121 of the pool volume #11 that was assigned to the page 131 of the virtual volume #1 is also assigned to the page 131 of the virtual volume #3.

The description returns to FIG. 10. After the intra-node virtual copy creation process ends, the clone creation program 151 checks whether the clone source node 100 and the clone destination node 100 match based on the node ID received in step S101 (step S103).

When nodes in the clone source and clone destination match in step S103 (YES in step S103), it means that the clone destination designated by the clone instruction is in the same node. Here, since the clone was created in the same node in step S102, the clone creation program 151 proceeds to step S109 to update the attribute of the intra-node virtual copy in the volume management table 141, and ends the clone creation process.

On the other hand, when nodes in the clone source and clone destination do not match in step S103 (NO in step S103), it means that the clone destination designated by the clone instruction is a different node, and here, the process proceeds to step S104.

In step S104, the clone creation program 151 of the clone source node transmits a request for volume external connection to the controller 11 of the clone destination node, and the controller 11 that received the request starts the volume external connection program 153 from the own memory 14 to execute a volume external connection process, so that the intra-node virtual copy created by the intra-node virtual copy creation process in step S102 is externally connected to the pool volume 120 of the clone destination node. The process corresponds to "(3) External VOL connection (import to Pool VOL)" shown in FIG. 9, and the virtual volume #3 created in the node #1 is externally connected to the pool volume #22 of the node #2, which is the clone destination node.

Figure 12:
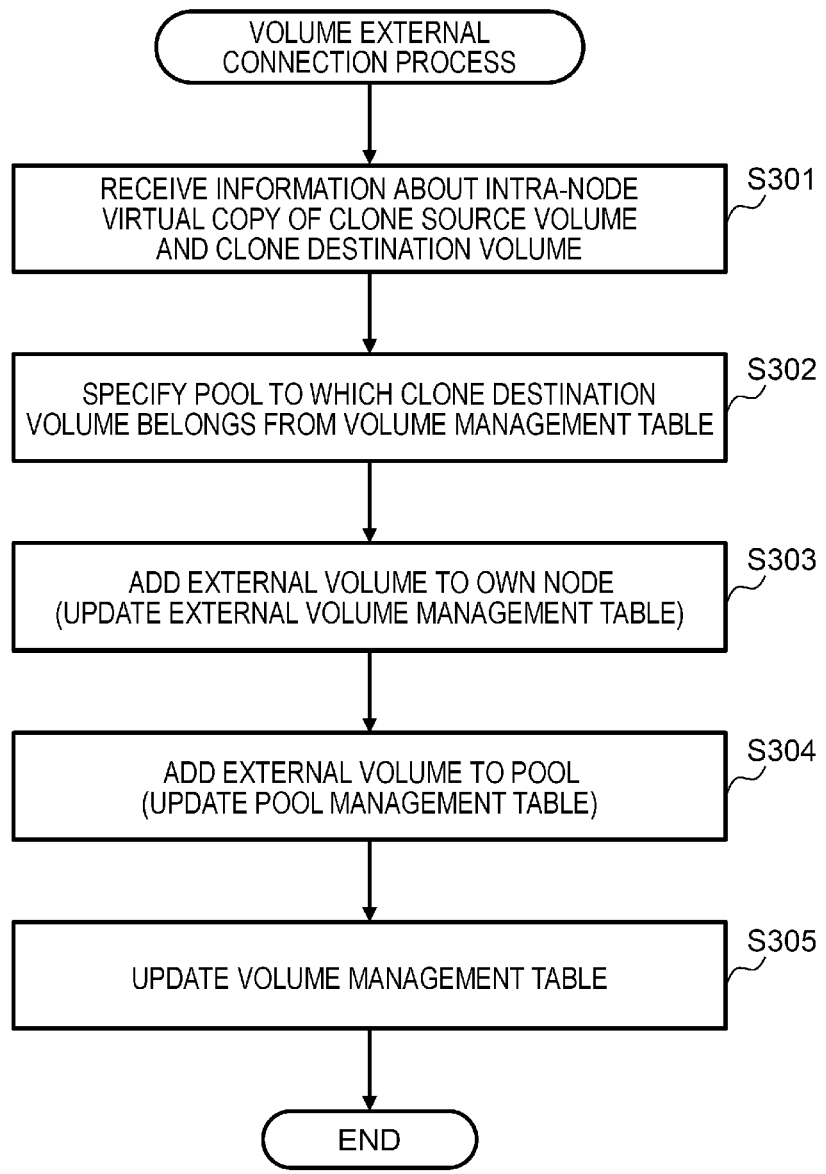
FIG. 12 is a flowchart showing an example of a processing procedure of a volume external connection process.

FIG. 12 is a flowchart showing an example of a processing procedure of the volume external connection process. The volume external connection process shown in FIG. 12 corresponds to the process of step S104 in FIG. 10, and is executed by the volume external connection program 153 of the clone destination node (for example, node #2).

According to FIG. 12, first, the volume external connection program 153 receives information about the intra-node virtual copy (virtual volume #3) of the clone source volume (for example, virtual volume #1) and information about the clone destination volume (virtual volume #2), which are included in the volume external connection request (step S301).

Next, the volume external connection program 153 refers to the volume management table 141 of the own node (node #2) and specifies the pool (for example, pool #2) to which the clone destination volume (virtual volume #2) belongs (step S302).

Next, the volume external connection program 153 creates and updates a record in the external volume management table 145 for any pool volume (for example, pool volume #22) created in the pool #2 specified in step S302 to add the external volume (pool volume #22) externally connected from the clone source node to the own node (step S303).

Next, the volume external connection program 153 updates the pool management table 144 and adds the external volume added to the own node in step S303 to the pool specified in step S302 (step S304).

Finally, the volume external connection program 153 updates the volume management table 141 for the intra-node virtual copy (virtual volume #3) and external volume (pool volume #22) according to the processing results of steps S303 and S304 (step S305), and ends the volume external connection process.

By executing the volume external connection process as described above, as shown in (3) of FIG. 9, in the node #2 which is the clone destination node, the virtual volume #3 created in the node #1, which is the clone source node, is externally connected to the external volume (pool volume #22).

The description returns to FIG. 10. After the volume external connection process ends, the clone creation program 151 of the clone destination node (node #2) updates the volume management table 141 according to the processing result of the volume external connection process in the own node (step S105). Specifically, the clone creation program 151 sets the value of the direct map 1416 of the clone destination volume (virtual volume #2) to "ON" in the volume management table 141, and adds the volume ID of the external volume to the corresponding pool volume ID 1417 of the same record.

Next, for the page of the clone destination volume (virtual volume #2) corresponding to the data stored in the externally connected intra-node virtual copy (virtual volume #3), the clone creation program 151 sets the allocation destination logical address 1436 of the page in the page management table 143 to unallocated "-" (step S106). The data stored in the externally connected intra-node virtual copy (virtual volume #3) has the same value as the data stored in the clone source volume (virtual volume #1), and is hereinafter also referred to as "old data". On the other hand, in the clone destination volume generated across nodes, the data newly written by the write process is called "new data".

The process of steps S105 and S106 above corresponds to "(4) link Virtual VOL and Pool VOL" shown in FIG. 9, and the page in the clone destination volume (virtual volume #2) mapped to the data in the intra-node virtual copy (virtual volume #3) and the page in the external volume (pool volume #22) to which the intra-node virtual copy (virtual volume #3) is externally connected are linked on a one-to-one basis in the clone destination node (node #2).

Next, the clone creation program 151 initializes the logical-physical conversion table 142 of the clone destination volume (virtual volume #2) (step S107), and purges the cache area of the volume (step S108). In the initialization of the logical-physical conversion table 142, the value of the physical address 1422 corresponding to the logical address 1421 is set to an invalid value.

Finally, the clone creation program 151 updates the attribute in the volume management table 141 (step S109), and ends the clone creation process.

As described above, by performing the clone creation process, even under the constraint of the loosely coupled scale-out architecture that the copy destination and copy source of the virtual copy need to be the same node, the storage system 10 according to the present embodiment can create a virtual clone of a volume across nodes (between different nodes 100).

(1-3-2) Write process

Figure 13:
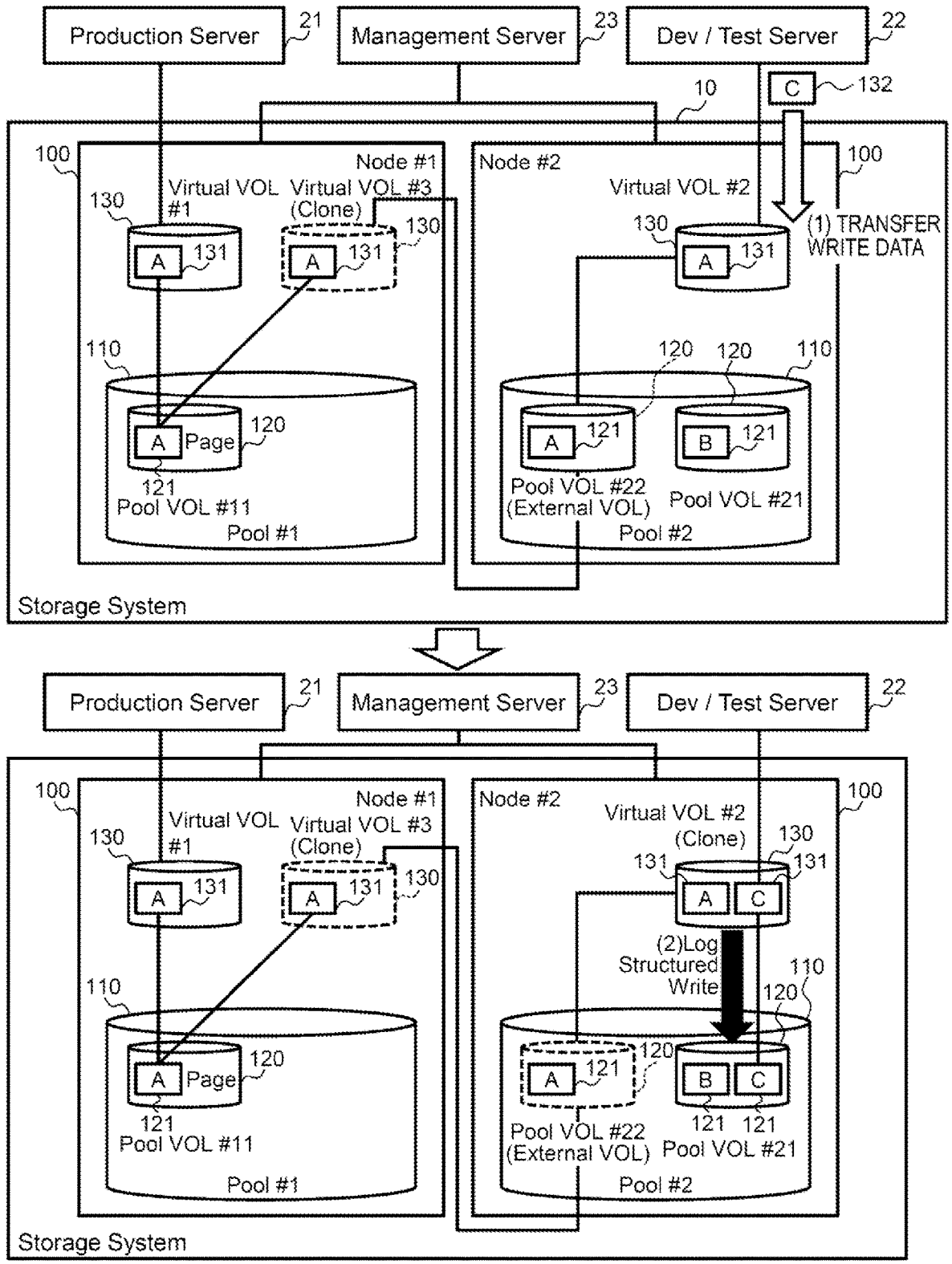
FIG. 13 is a diagram showing a processing image of a write process.

FIG. 13 is a diagram showing a processing image of the write process.

Figure 14:
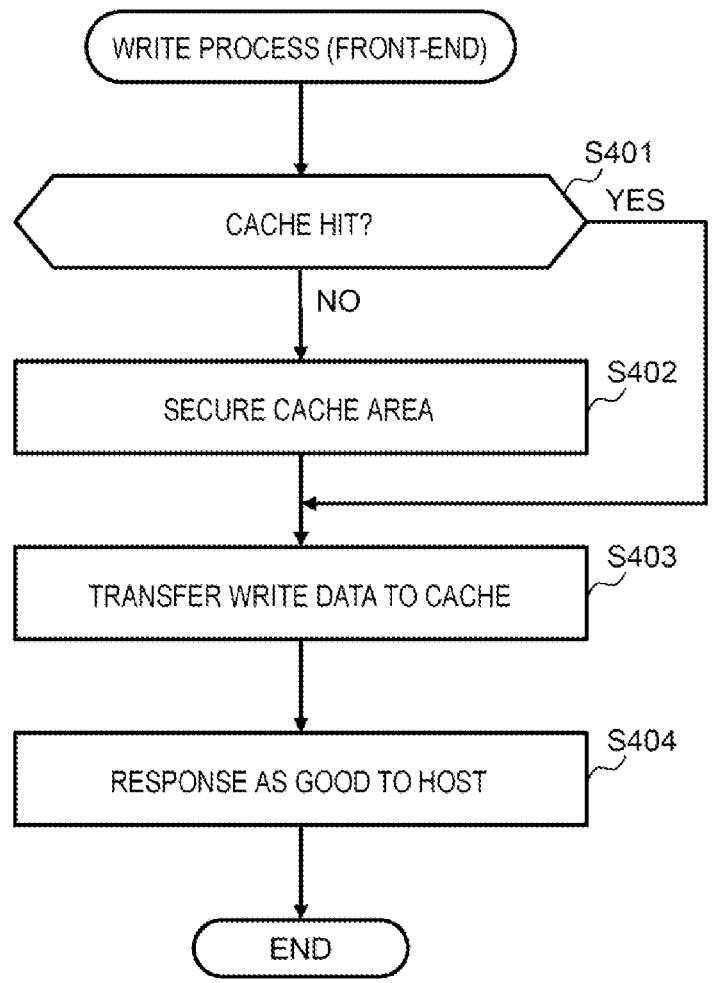
FIG. 14 is a flowchart showing an example of a processing procedure of the write process on a front-end side.
Figure 15:
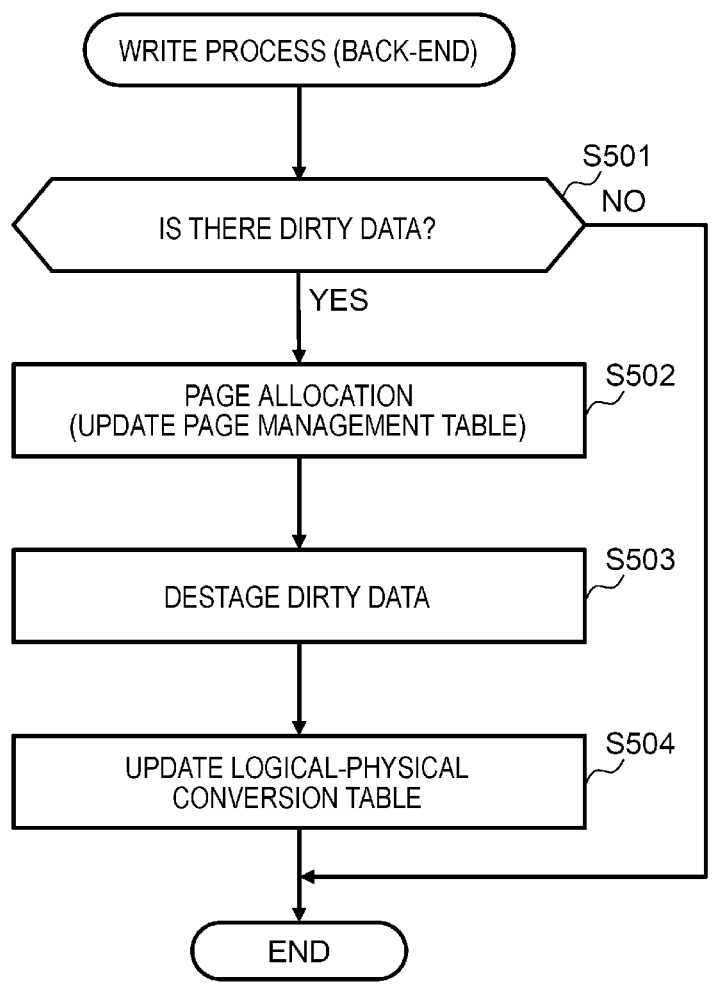
FIG. 15 is a flowchart showing an example of a processing procedure of the write process on a back-end side.

The upper part of FIG. 13 shows a processing image when write data is transferred by a write request from the host to the virtual clone (clone destination virtual volume 130), and the lower part of FIG. 13 shows a processing image during the subsequent write process. FIG. 14 is a flowchart showing an example of a processing procedure of the write process on the front-end side, and FIG. 15 is a flowchart showing an example of a processing procedure of the write process on the back-end side. In the controller 11 of the node 100 that received the write request, the write program 156 executes the write process shown in FIG. 14 and the write process shown in FIG. 15 in parallel. Below, the processing procedure of the write process will be described according to the flowcharts of FIGS. 14 and 15 while showing the corresponding portions in FIG. 13 as appropriate.

When the host (production server 21, development/test server 22, or management server 23) issues a write request to write data to the volume in the storage system 10, in the controller 11 of the node 100 that includes the write destination volume, the processor 13 starts the write program 156 to execute the write process. The write request includes data to be written (write data) and a write destination address in the target virtual volume 130.

In FIG. 13, in "(1) Write Data transfer", the development/test server 22 issues a write request to the virtual volume #2, and write data 132 of "C" is transferred. Here, the virtual volume #2 is a virtual clone created in the node #2 different from the clone source node by the clone creation process described above with reference to FIGS. 9 to 12.

When a write request is received, at the front-end, as shown in FIG. 14, the write program 156 first checks whether the cache area for the write destination address is secured in the cache unit 160, in other words, whether the data for the write destination address is stored in the cache unit 160 (whether there is a cache hit) (step S401). When there is no cache hit (NO in step S401), the write program 156 secures a cache area for write data (step S402), and transfers the write data to the cache area (step S403). On the other hand, when there is a cache hit (YES in step S401), the write program 156 skips step S402 and transfers the write data to the corresponding cache area (step S403).

The write program 156 then returns a normal response (Good response) to the write request to the host (step S404), and ends the write process in the front-end.

Upon receiving the write request, in the back-end, as shown in FIG. 15, the write program 156 first checks whether dirty data exists in the write destination volume (virtual volume #2) (step S501). When dirty data exists (YES in step S501), the process proceeds to step S502, and when dirty data does not exist (NO in step S501), the process ends.

In step S502, the write program 156 establishes data consistency between the control information unit 140 and the cache unit 160 based on the dirty data, performs page allocation of the write data to the write destination volume (virtual volume #2), and updates the page management table 143.

Here, as one of the features of the storage system 10, in response to a write request to at least the virtual volume 130 created as a virtual clone (for example, virtual volume #2 in FIG. 13), the write program 156 of the same node (node #2) performs log-structured write (so-called "additional writing") of the write data in the own node. Note that the write program 156 may perform additional writing in the same way when a write request is made to a virtual volume 130 other than a virtual clone.

In the log-structured write (additional writing), the pool 110 (pool volume 120) stores historical data (pre-update data) updated by the write data 132. Specifically, when a write request is made for existing data in the virtual volume 130, the write program 156 writes separate write data (post-update data) to the pool volume 120 that is not an external volume while maintaining the existing data (pre-update data) in the pool volume 120, and then, changes the mapping from the virtual volume 130 to the pool volume 120 from the pre-update data to the post-update data. As a result, the data in the virtual volume 130 is updated, and the historical pre-update data is stored in the pool 110 (pool volume 120). When a write request for new data is issued to the virtual volume 130, there is no pre-update data in the pool volume 120 linked to the virtual volume 130, so the write program 156 writes write data to the pool volume 120 that is not an external volume, and performs mapping for the write data from the virtual volume 130 to the pool volume 120.

FIG. 13 shows a processing image when a write request for write data 132 (page "C") is issued to the virtual volume #2, which is a virtual clone, as an example of the log-structured write, and specifically, shows that the write program 156 of the node #2 writes write data (page "C") to a pool volume #21, which is not an external volume, and maps the page "C" from the virtual volume #2 to the pool volume #21, without performing a process such as deleting or moving existing data in pool #2 (page "A" of the pool volume #22 and page "B" of the pool volume #21).

It can be seen that such additional writing is shown as "(2) Log Structured Write" in FIG. 13, the pool volume #21 is set as the storage destination of the write data (page "C") described above, and page "C" of the pool volume #21 is allocated to page "C" of the virtual volume #2. When the write request for the write data 132 is to update the page "A" of the virtual volume #2, in the lower part of FIG. 13, page "A" of the virtual volume #2 is updated to page "C" by setting the mapping destination of the old page (page "A") in the virtual volume #2 to the newly written page "C" of the pool volume #21.

After that, the write program 156 destages the dirty data (step S503), updates the logical-physical conversion table 142 regarding the destage (step S504), and ends the process.

By executing the write process as described above, in the storage system 10, when data is written to the clone destination volume (virtual volume #2) across the nodes 100, write data is additionally written to the clone destination node (node #2). As a result, a write operation can be performed on the virtual clone without imposing a load on or affecting the clone source node (node #1).

(1-3-3) Read Process

Figure 16:
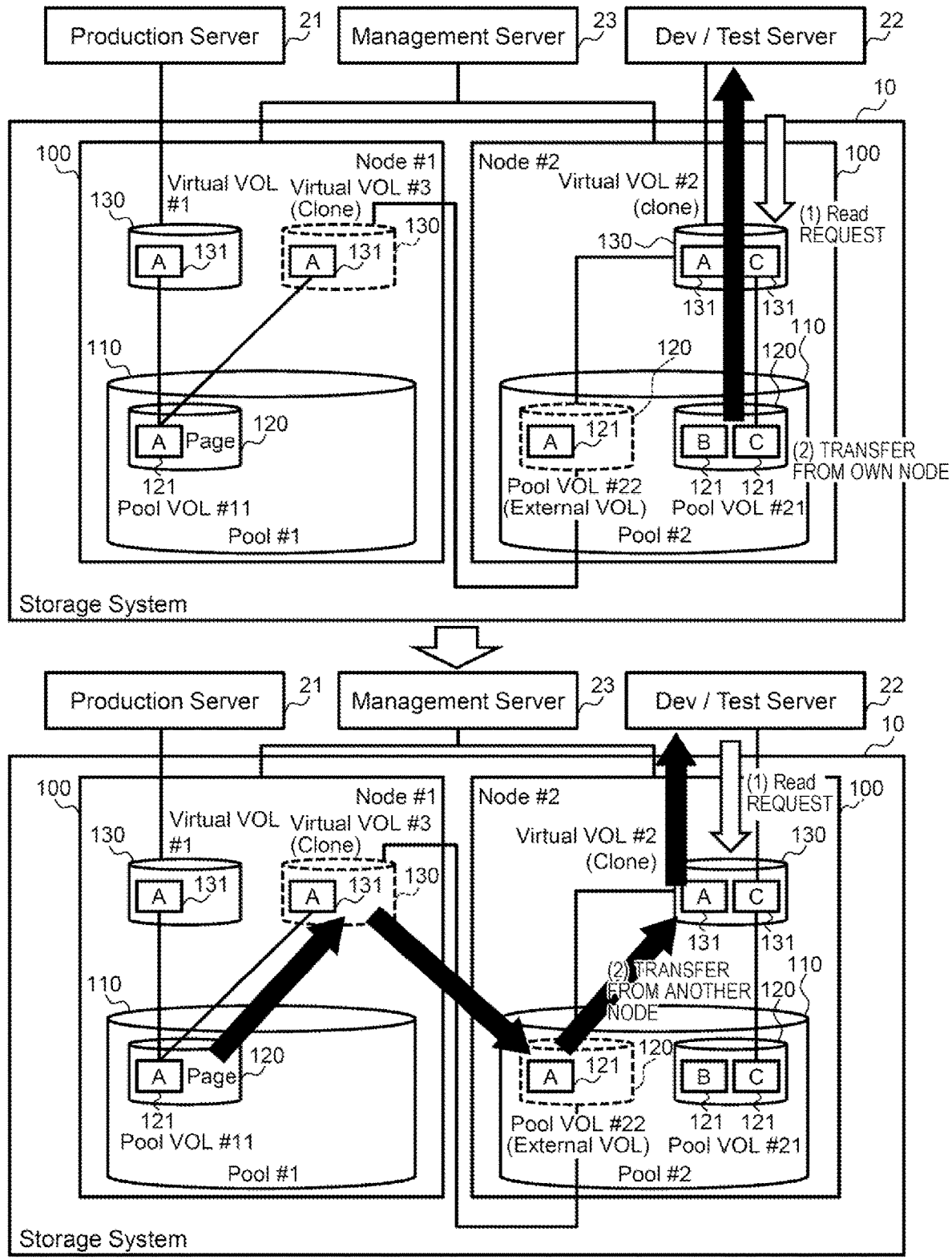
FIG. 16 is a diagram showing a processing image of a read process.
Figure 17:
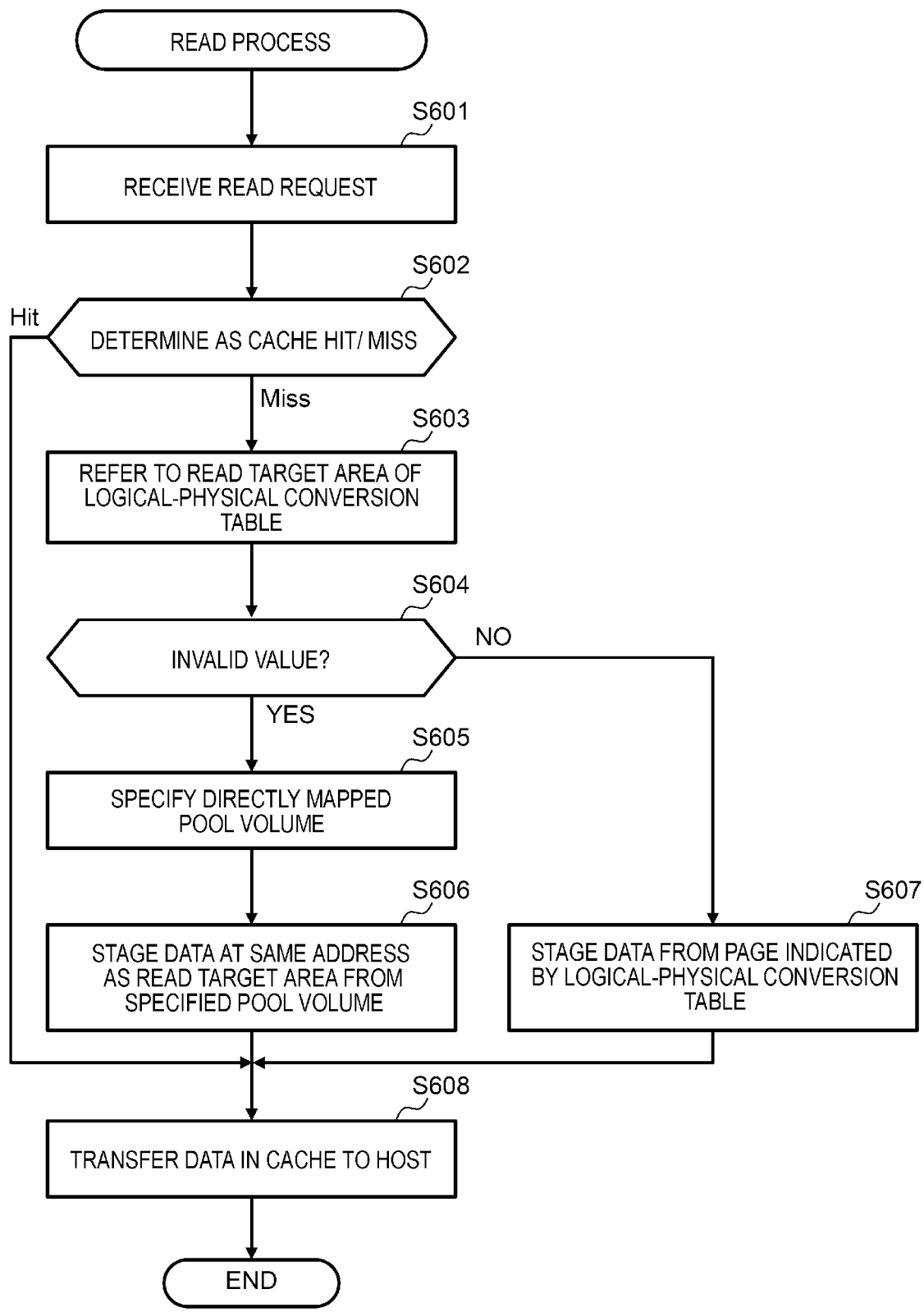
FIG. 17 is a flowchart showing an example of a processing procedure of the read process.

FIG. 16 is a diagram showing a processing image of the read process. The upper part of FIG. 16 shows a processing image of the read process when the host issues a read request for data stored in the clone destination node to the virtual clone (clone destination virtual volume 130) (that is, when the destination volume of the read request and the storage destination of the entity of the read data are the same node). The lower part of FIG. 16 shows a processing image of the read process when the host issues a read request for data stored in the clone source node to the virtual clone (clone destination virtual volume 130) (that is, when the destination volume of the read request and the storage destination of the entity of the read data are different nodes). FIG. 17 is a flowchart showing an example of a processing procedure of the read process. Below, the processing procedure of the read process will be described according to the flowchart of FIG. 17 while showing the corresponding portions in FIG. 16 as appropriate.

When a host (production server 21, development/test server 22, or management server 23) issues a read request to read data from the volume in the storage system 10, in the controller 11 of the node 100 that received the read request, the processor 13 starts the read program 157 to execute the read process. The read request includes the read data storage range (read target area) in the target volume.

According to FIG. 17, the read program 157 first receives a read request (step S601). In the case of the upper part of FIG. 16, in "(1) Read request", a read request for page "C" is issued to the virtual volume #2, which is the virtual clone of the clone destination. In the case of the lower part of FIG. 16, in "(1) Read request", a read request for page "A" is issued to the virtual volume #2, which is the virtual clone of the clone destination.

Next, the read program 157 performs cache hit/miss determination to determine whether the read data is stored in the cache unit 160 (step S602). When the read data hits the cache (Hit in step S602), the cache hit data is transferred to the host (step S608), and the read process ends. On the other hand, when the read data is not in the cache (Miss in step S602), the process proceeds to step S603.

In step S603, the read program 157 refers to the read target area of the logical-physical conversion table 142. Then, the read program 157 checks whether the value of the physical address 1422 of the read target area referred to in step S603 is an invalid value (step S604). When the value of the physical address 1422 of the read target area is an invalid value in step S604 (YES in step S604), the process proceeds to step S605, and when the value of the physical address 1422 of the read target area is not an invalid value (NO in step S604), the process proceeds to step S607.

Here, as described above with reference to FIG. 5, in the logical-physical conversion table 142, when data is not stored in the own node (specifically, data is stored in another node of the clone source, for example), the value of the physical address 1422 is an invalid value such as "FFFFFFFF". In the specific example of FIG. 16, when the read data is page "C" (in the case of the upper part of FIG. 16), page "C" is stored in the node #2, which is the own node, so that the physical address of the storage destination is indicated in the physical address 1422. On the other hand, when the read data is page "A" (in the case of the lower part in FIG. 16), page "A" is stored in the node #1, which is the clone source node, so that an invalid value is indicated in the physical address 1422.

That is, when the entity of the read data is stored in the own node (in the case of the upper part in FIG. 16), the process proceeds from step S604 to step S607, and when the entity of the read data is not stored in the own node (in the case of the lower part of FIG. 16), the process proceeds from step S604 to step S605.

First, to explain the case where the process proceeds from step S604 to step S605, the read program 157 refers to the volume management table 141, and specifies the pool volume 120 (pool volume #22) to which the data of the read request target volume (virtual volume #2) is directly mapped, from the corresponding pool volume ID 1417 (step S605).

Next, the read program 157 stages data at the same address as the read target area from the pool volume 120 specified in step S605 (step S606). The process corresponds to the process indicated as "(2) transfer from another node" on the lower part of FIG. 16. Specifically, as indicated by the thick arrows on the lower part of FIG. 16, via the virtual volume #3 of the clone to which the pool volume #22 specified in step S605 is externally connected, a read request is made for page "A" in the pool volume #11 of the node #1, which is the clone source node, as data at the same address, and the entity data of the page "A" is read from the physical drive 12 storing the entity data of the page "A" and is transferred to the cache unit 160 of the node #2.

After the process of step S606, the read program 157 transfers the data on the cache transferred in step S606 to the host (step S608), and ends the read process.

On the other hand, when proceeding from step S604 to step S607, the read program 157 refers to the logical-physical conversion table 142 and stages data from the page indicated by the physical address 1422 corresponding to the logical address of the read target area (step S607). The process corresponds to the process indicated as "(2) transfer from own node" on the upper part of FIG. 16. Specifically, as indicated by the thick arrow in the upper part of FIG. 16, the page indicated by the logical address of the read target area is page "C" of the pool volume #21, and the entity data of the page "C" is read from the physical drive 12 where the entity data of the page "C" is stored and is transferred to the cache unit 160.

After the process of step S607, the read program 157 transfers the data on the cache transferred in step S607 to the host (step S608), and ends the read process.

By executing the read process as described above, when a valid value is set in the mapping information (logical-physical conversion table 142), the storage system 10 reads read data from the own node and sends a response. On the other hand, when an invalid value is set in the mapping information (logical-physical conversion table 142), the storage system 10 determines that there is read data in another node (clone source node) reads data from the clone source node via the external volume and can respond.

(1-3-4) Clone Deletion Process

Figure 19:
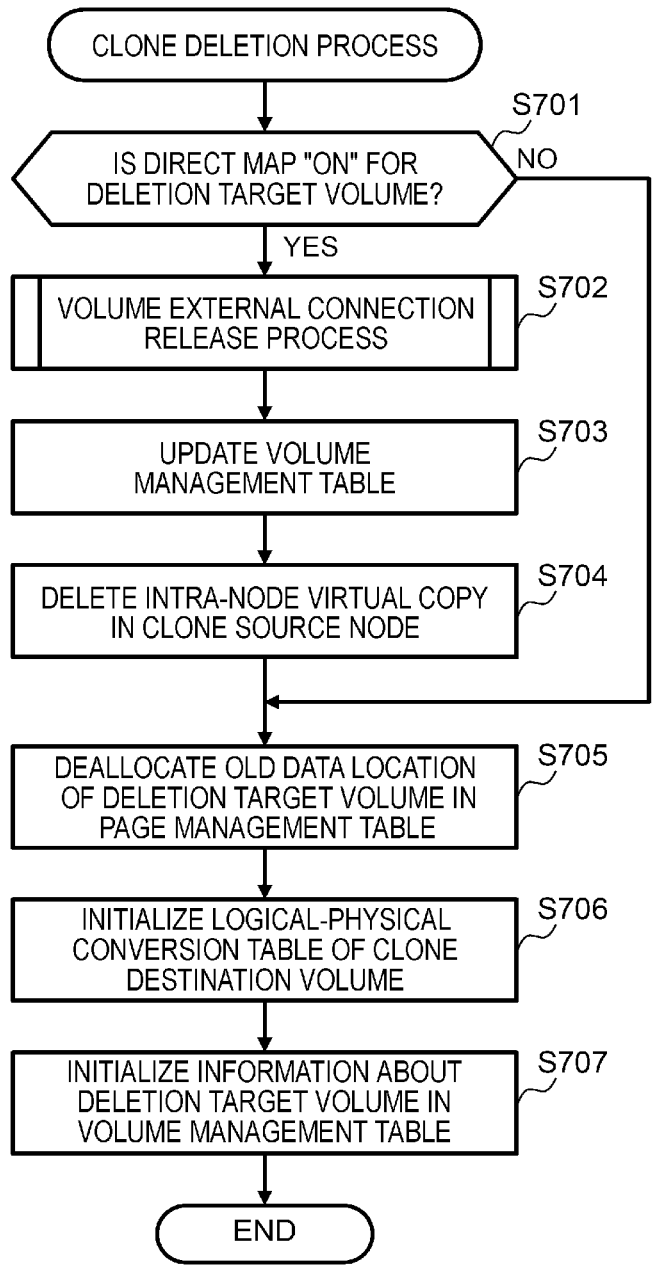
FIG. 19 is a flowchart showing an example of a processing procedure of the clone deletion process.

FIG. 18 is a diagram showing a processing image of the clone deletion process. The upper part of FIG. 18 shows a processing image when the virtual clone (the virtual volume 130 of the clone destination) is instructed to delete the clone from the host, and the lower part of FIG. 18 shows a processing image during the subsequent clone deletion process. FIG. 19 is a flowchart showing an example of a processing procedure for the clone deletion process. Below, the processing procedure of the clone deletion process will be described according to the flowchart of FIG. 19 while showing the corresponding portions in FIG. 18 as appropriate.

The host (for example, the development/test server 22, but the management server 23 or the like may be used) transmits a "clone deletion instruction" requesting deletion of the virtual clone, and the clone deletion process is performed when the clone destination node 100 receives the instruction.

In FIG. 18, in "(1) clone deletion instruction", the development/test server 22 requests the node #2 to delete the virtual volume #2 which is a virtual clone.

Here, in the controller 11 of the clone destination node #2 that received the clone deletion instruction, the processor 13 starts the clone deletion program 152 to execute the clone deletion process.

According to FIG. 19, the clone deletion program 152 first checks whether the direct map 1416 of the volume management table 141 is "ON" for the deletion target volume (virtual volume #2 in the case of FIG. 18) included in the clone deletion instruction (step S701).

When the direct map 1416 is "OFF" in step S701 (NO in step S701), it means that the data of the deletion target volume is completed in the own node. Here, the process proceeds to step S705, which will be described later.

On the other hand, when the direct map 1416 is "ON" in step S701 (YES in step S701), it means that the deletion target volume is externally connected to another node via the external volume. Here, the clone deletion program 152 starts the volume external connection release program 154 to execute a volume external connection release process of releasing the external connection (step S702).

Figure 20:
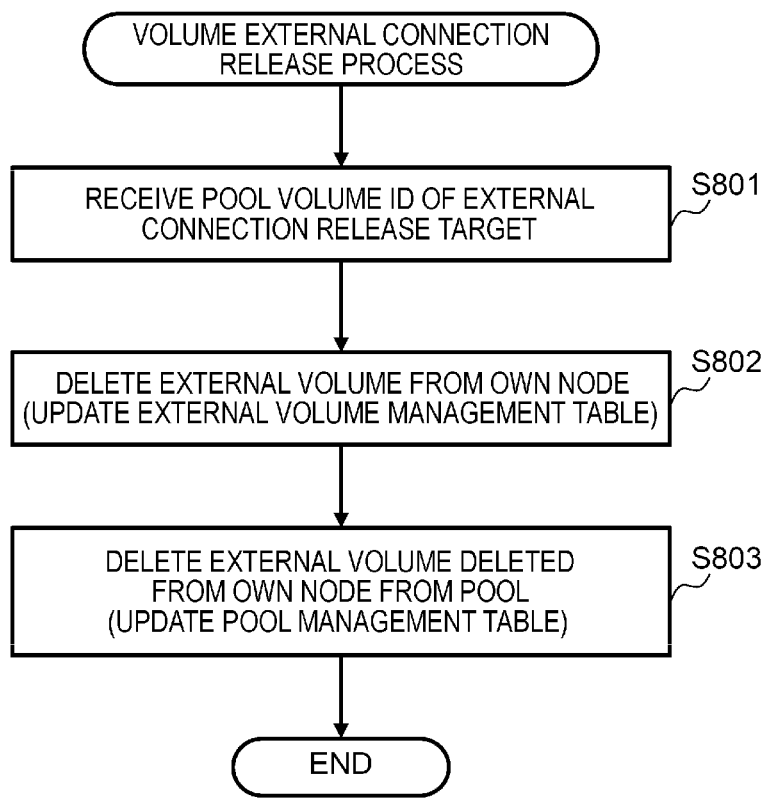
FIG. 20 is a flowchart showing an example of a processing procedure of a volume external connection release process.

FIG. 20 is a flowchart showing an example of a processing procedure of the volume external connection release process. The volume external connection release process shown in FIG. 20 corresponds to the process of step S702 in FIG. 19 and is executed by the volume external connection release program 154.

According to FIG. 20, the volume external connection release program 154 first receives the volume ID of the external volume (pool volume #22 in the case of FIG. 18) whose external connection is to be released (step S801). The volume ID of the external volume is the value of the corresponding pool volume ID 1417 in the record for which the direct map 1416 is "ON" in step S701 of FIG. 19, and is notified from the clone deletion program 152 to the volume external connection release program 154.

Next, the volume external connection release program 154 deletes and updates the record of the external volume (pool volume #22) specified in step S802 in the external volume management table 145 based on the volume ID received in step S801 and deletes the external volume (pool volume #22) specified in step S802 from the own node (step S802).

The process of step S802 corresponds to "(2) External VOL release" shown in FIG. 18.

The volume external connection release program 154 deletes the record linking the deletion target volume (virtual volume #2) and the external volume (pool volume #22) in the pool management table 144 based on the external volume ID 1446 of the external volume (pool volume #22) deleted from the own node in step S803, deletes the external volume (pool volume #22) deleted from the own node in step S802 from the belonging pool 110 (pool #2) (step S803), and ends the volume external connection release process.

The process of step S803 corresponds to "(3) release of link between Virtual VOL and Pool VOL" shown in FIG. 18.

By executing the volume external connection release process described above, the external volume (pool volume #22) relaying the external connection of the deletion target volume is deleted.

The description returns to FIG. 19. After the volume external connection release process is ended, the clone deletion program 152 updates the volume management table 141 according to the processing result (the external volume deletion and the external connection link release) performed in step S702 (step S703). Specifically, the clone deletion program 152 deletes the record of the external volume (pool volume #22) in the volume management table 141, sets the value of the direct map 1416 in the record of the virtual clone (virtual volume #2) to "OFF", and deletes the volume ID of the external volume (pool volume #22) set in the corresponding pool volume ID 1417 of the same record.

Next, the clone deletion program 152 requests the controller 11 of the clone source node (node #1) to delete the intra-node virtual copy (virtual volume #3) (step S704). In the clone source node, the intra-node virtual copy creation program 155 is called to delete the requested intra-node virtual copy. Since the process for deleting the intra-node virtual copy can be easily performed by referring to the processing procedure example of the intra-node virtual copy creation process shown in FIG. 11, detailed description thereof will be omitted. The process corresponds to "(4) intra-node virtual copy deletion" shown in FIG. 18.

When the process up to step S704 is completed, or when NO is determined in step S701 (when the direct map 1416 of the deletion target volume is "OFF"), the clone deletion program 152 performs the process of step S705.

In step S705, for the page of "old data" in the deletion target volume (virtual volume #2), the clone deletion program 152 sets the allocation destination logical address 1436 of the page in the page management table 143 to unallocated "-".

Finally, the clone deletion program 152 initializes information about the clone destination volume (virtual volume #2) in the logical-physical conversion table 142 (step S706), initializes information about the deletion target volume (virtual volume #2) in the volume management table 141 (step S707), and ends the clone deletion process.

The process of steps S705 to S707 above corresponds to "(5) Virtual VOL deletion" shown in FIG. 18.

By performing the clone deletion process as such, the storage system 10 can delete the virtual clone created across the nodes 100 in the clone creation process.

As a modification example of the clone deletion process, after deleting the virtual clone, the clone deletion program 152 may perform a process of deleting data of the clone destination node (node #2) additionally written after the virtual clone is generated, asynchronously with a series of processes of deleting the virtual clone. According to such a modification example, it is possible to delete postscript data that became useless data that has no chance of being used due to the deletion of the virtual clone, and the capacity can be increased.

As described above, even under the constraint that "the copy destination and copy source of a virtual copy are limited to the same node" in the loosely coupled scale-out architecture in which a plurality of nodes are clustered, the storage system 10 according to the present embodiment executes the clone creation process shown in FIG. 10 to externally connect a virtual copy of the clone source volume from the clone destination and links the virtual copy to the clone destination virtual volume, thereby creating a virtual clone of the volume in a node different from the clone source. As a result, usability of the storage system 10 is improved. When a virtual clone is created across nodes, it does not involve copying the data body (entity data) between nodes and the clone creation can be completed instantly, so that a user can immediately perform an input/output (IO) operation on the clone destination volume and the effect of improving business agility can be obtained.

In the storage system 10 according to the present embodiment, data storage destinations before and after clone generation are separated. When a request is made to write data to the virtual clone created on a node different from the clone source node, the write data is stored in the clone destination node by additional writing, by executing the write process shown in FIGS. 14 and 15, so that data can be freely written to the virtual clone without affecting the data in the clone source node. Since data write, which causes a higher load than data read, is not performed on the clone source node via an external connection across nodes, it is possible to reduce an increase in the load on the clone source node.

When reading data from a virtual clone, the storage system 10 according to the present embodiment executes the read process shown in FIG. 17. When the entity data is not stored in the clone destination, the storage system 10 reads data from the clone source node and sends a response via external connection, so that it is possible to implement data reading equivalent to that of the clone source volume in the virtual clone.

(2) Second Embodiment

In the first embodiment, when a virtual clone is created in a node different from the clone source, it does not involve copying the entity data between nodes. However, as data transfer from the clone source node can be performed in IO (especially read) for the created virtual clone, the load on the clone source node may increase. Therefore, in a second embodiment, a storage system that enables performance rebalancing considering the load on the clone source node will be described.

Figure 21:
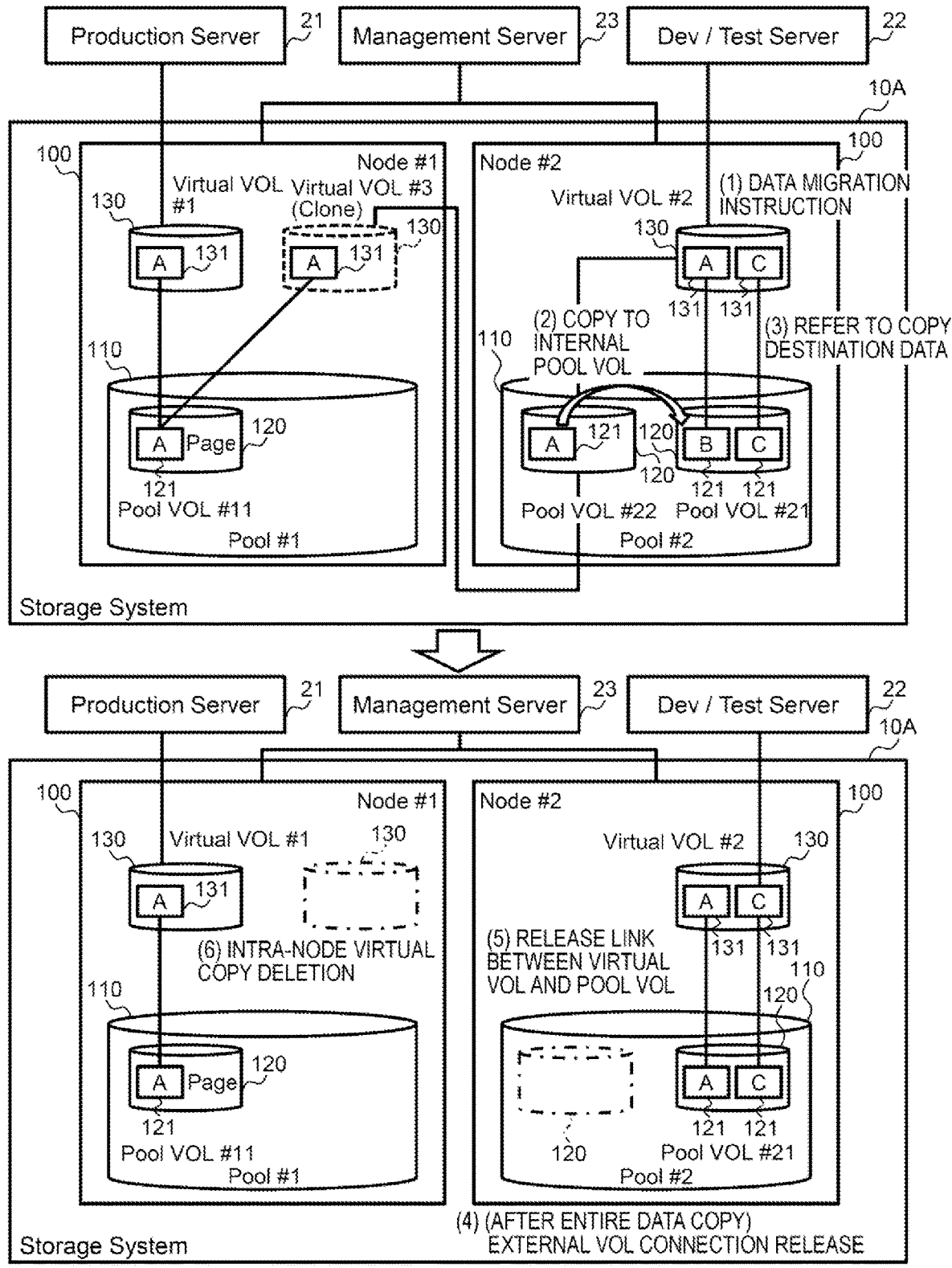
FIG. 21 is a diagram showing a processing image of a performance rebalancing process in a storage system 10A according to a second embodiment of the present invention.

FIG. 21 is a diagram showing a processing image of a performance rebalancing process in a storage system 10A according to the second embodiment of the present invention. The upper part of FIG. 21 shows a processing image of the first half of the rebalancing process, which will be described later, and the lower part of FIG. 21 shows a processing image of the latter half of the rebalancing process. As is clear from a comparison of FIG. 21 and FIG. 1, since the system configuration of the storage system 10A according to the second embodiment is the same as the system configuration of the storage system 10 according to the first embodiment, the same reference numerals are given and the description is omitted.

When the load of the clone source node (node #1) exceeds a predetermined threshold due to read IO to the volume of the clone destination node (node #2), the storage system 10A notifies the overload to the development/test server 22 (or the management server 23) that is the host of the clone destination node. In response to the notification, when the host issues a "data migration instruction" (to be described later) to the clone destination node, the processor 13 of the controller 11 of the clone destination node starts a rebalancing program (not shown) from the memory 14 to execute the rebalancing process for the purpose of performance rebalancing. Note that the rebalancing process execution program is not limited to the independent rebalancing program as described above, and may be partly or wholly executed by another program stored in the memory 14.

The rebalancing process in the storage system 10A will be described with reference to FIG. 21.

First, a data migration instruction is sent from the development/test server 22, which is the host, to the virtual clone (virtual volume #2) of the storage system 10A ((1) in FIG. 21). The data migration instruction may be determined by the user of the host, or may be executed by a program based on the load situation in the read process.

In the case of FIG. 21, for example, in response to the data migration instruction, the entire old data (that is, the entire clone source volume) of the clone source node externally connected from the external volume (pool volume #22) is instructed as a data migration target. Triggered by the reception of the data migration instruction, the rebalancing program executes the rebalancing process.

When the rebalancing program starts the rebalancing process, the entire data (for example, page "A" or the like is included) stored by the external volume (pool volume #22) is copied to the pool volume 120 (hereinafter, referred to as an internal pool volume, specifically, for example, pool volume #21) in the own node which is not externally connected ((2) in FIG. 21). In the case of FIG. 21, page "A" of the pool volume #22 is copied to the area of page "B" of the pool volume #21, which is the internal pool volume. In the data copy, the entity data is also copied from the external connection target clone source node (node #1) to the own node (node #2) and stored in the physical drive 12 of the node #2.

Next, the rebalancing program updates the logical-physical conversion table 142 and the page management table 143 based on the data copy, and performs allocation such that the page (for example, page "A") corresponding to the old data of the virtual clone (virtual volume #2) refers to the corresponding page (for example, page "B") of the internal pool volume (pool volume #21) that is the data copy destination ((3) in FIG. 21).

Then, when the data designated as the data migration target is the entire old data, after copying the entire old data is completed, the rebalancing program starts the volume external connection release program 154 to perform the external connection release process, thereby releasing the external connection of the external volume ((4) in FIG. 21), and releasing the link between the virtual clone (virtual volume #2) and the external volume (pool volume #22) ((5) in FIG. 21). Detailed processing procedures of (4) and (5) in FIG. 21 are the same as the processing procedure shown in FIG. 20. Note that when the data designated as the data migration target is part of the old data, the external connection is not released.

When the processes up to (5) in FIG. 21 are performed, all data entities of the clone destination node are stored in the own node (node #2).

After that, the intra-node virtual copy is deleted in the clone source node (node #1) in the same procedure as steps S704 to S707 of the clone deletion process shown in FIG. 19 ((6) in FIG. 21).

As described above, in the storage system 10A, the old data read from the clone source node can be copied to the own node together with the entity data, without stopping (while continuing) the IO to the clone destination node, by executing the rebalancing process according to the IO status. As a result, even when a read request for old data is issued to the virtual clone, the IO to the clone destination node can be completed in the own node, so that data transfer from the clone source node does not occur, and it is possible to achieve performance rebalancing that reduces the load on the clone source node.

In the above description, the entire old data (the entire externally connected volume) is targeted for data copying, but the data copy target in the present embodiment is not limited thereto, and for example, data may be copied in units of predetermined pages. However, in any case, the data copy target area includes at least the read target data of the old data. For example, during read IO, when an excessive load is applied to the entire volume in the clone source node, the entire volume may be the target of data copy, and when an excessive load is applied in units of pages, the corresponding page may be the target of data copy.

A known method of determining overload may be employed for determining whether to issue a data migration instruction. For example, data migration may not be determined based on a single read request, and it may be determined whether the load exceeds a threshold based on the results of a plurality of read requests. The timing of issuing the data migration instruction may not be the timing associated with the read request as long as the timing is after at least one read request.

When the data copied by the data migration instruction is common data, both the copy source and the copy destination, that is, both the clone source node and the clone destination node are notified of the data, so that the consumption capacity of the entire storage system 10A is doubled, but the effect of reducing the load during the IO process can be expected. When the data copied in response to the data migration instruction is single data that is used only at the clone destination, the data may be deleted at the copy source, that is, the clone source node, so that it can be expected to reduce the load on the clone source node while maintaining the consumption capacity of the entire storage system 10A.

(3) Third Embodiment

In the first and second embodiments, a case where the storage system 10 (10A) and hosts (production server 21, development/test server 22, management server 23) are all constructed on-premises has been described. However, the storage system according to the present invention can also be applied to an environment combining on-premises and cloud (for example, public cloud). Therefore, in a third embodiment, a storage system 10B applied to an environment combining on-premises and public cloud will be described. Note that the type of cloud to which the present embodiment can be applied is not limited to public clouds.

Figure 22:
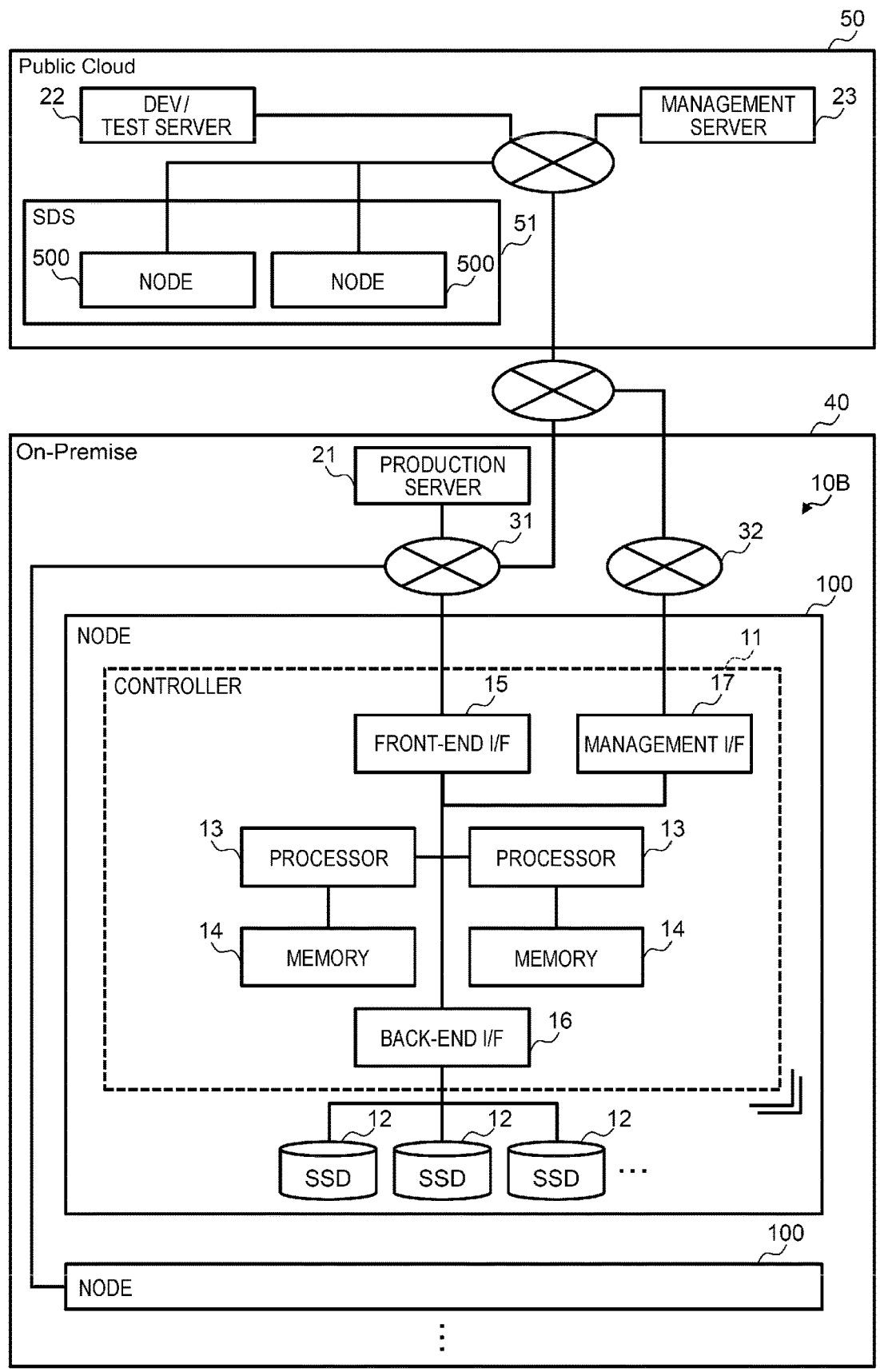
FIG. 22 is a block diagram showing a hardware configuration example of an entire system including a storage system 10B according to a third embodiment of the present invention.

FIG. 22 is a block diagram showing a hardware configuration example of an entire system including the storage system 10B according to the third embodiment of the present invention. As shown in FIG. 22, the entire system including the storage system 10B and a host according to the third embodiment is constructed in an on-premises environment 40 and a public cloud environment 50 connected via networks (the storage network 31 and the management network 32).

In the on-premises environment 40, the storage system 10B and the production server 21 are connected via the storage network 31. The storage system 10B is also connected via the storage network 31 to the development/test server 22 and a software-defined storage (SDS) 51 composed of one or more nodes 500 in the public cloud environment 50. The storage system 10B is connected to the management server 23 in the public cloud environment 50 via the management network 32. The hardware configuration of the storage system 10B is the same as the hardware configuration of the storage system 10 according to the first embodiment shown in FIG. 2, and a detailed description thereof will be omitted. The production server 21 has the same functions as the production server 21 shown in the first embodiment.

In the public cloud environment 50, the development/test server 22, the management server 23, and the SDS 51 composed of one or more nodes 500 are connected to each other via a network, and are also connected to the on-premises environment 40 side. The development/test server 22 and the management server 23 have the same functions as the development/test server 22 and the management server 23 shown in the first embodiment.

The SDS 51 composed of one or more nodes 500 that are not in the first embodiment is a storage area provided in the public cloud environment 50. The SDS is a computer program that provides storage functions similar to that of the controller 11 of the node 100 in the on-premises environment 40, and in the node 500 in the public cloud environment 50, various programs can be called and executed, similar to the controller 11 in the on-premises environment 40. One of the features of the storage system 10B according to the present embodiment is that a virtual copy of the virtual volume created in the node 100 of the storage system 10B can also be created in the node 500 on the public cloud environment 50 side.

Figure 23:
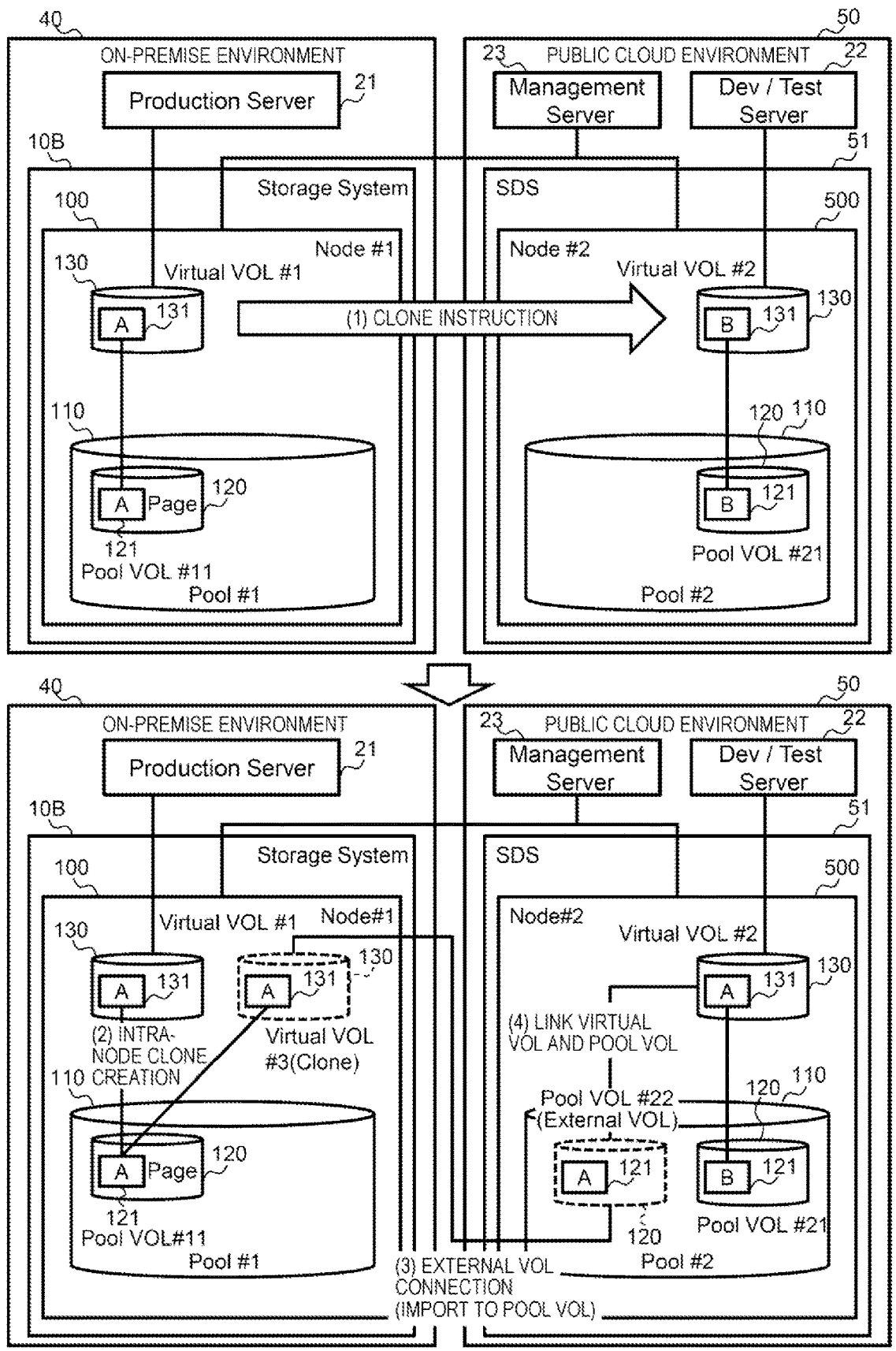
FIG. 23 is a diagram showing a processing image of a clone creation process from the storage system 10B to an SDS 51.

FIG. 23 is a diagram showing a processing image of a clone creation process from the storage system 10B to the SDS 51. The upper part of FIG. 23 shows a processing image when a predetermined volume (for example, virtual volume #1) in the node 100 (for example, node #1) in the on-premises environment 40 is instructed to create a clone with the node 500 (for example, node #2) in the public cloud environment 50 as a creation destination, and the lower part of FIG. 23 shows a processing image during the subsequent clone creation process.

In the third embodiment, the clone creation process with the public cloud environment 50 as the creation destination is basically executed in the same processing procedure as the clone creation process described in the first embodiment.

To explain the outline with reference to FIG. 23, first, a clone instruction that requests a predetermined volume (virtual volume #1) of the node #1 to create a clone in the node 500 in the public cloud environment 50 is issued ((1) in FIG. 23).

Next, the clone creation program 151 of the clone source node (node #1) calls the intra-node virtual copy creation program 155 to execute the intra-node virtual copy creation process shown in FIG. 11, so that an intra-node virtual copy (virtual volume #3) of the clone source volume is created ((2) in FIG. 23).

Next, the clone creation program 151 of the clone source node transmits a request for volume external connection to the SDS 51 of the clone destination node (node #2) and the SDS 51 starts the volume external connection program 153 in the own node to execute the volume external connection process, so that the intra-node virtual copy (virtual volume #3) created by the intra-node virtual copy creation process is externally connected to the pool volume 120 (pool volume #22) of the clone destination node ((3) in FIG. 23). The process of (3) in FIG. 23 is different from the process in the first embodiment in that the SDS 51 controls the process in the clone destination node, but the content of the process is the same as in the first embodiment.

Next, the clone creation program 151 of the clone destination node updates the volume management table 141 and the page management table 143, thereby linking the page in the clone destination volume (virtual volume #2) and the page in the external volume (pool volume #22) externally connected to the intra-node virtual copy (virtual volume #3) on a one-to-one basis ((4) in FIG. 23).

As described above, by performing the clone creation process in the same flow as in the first embodiment, even under the constraint of the loosely coupled scale-out architecture that the copy destination and the copy source of the virtual copy need to be the same node, the storage system 10B according to the third embodiment can also create virtual clones of volumes in the public cloud environment 50 across nodes (between different nodes).

Although detailed description is omitted, the storage system 10B according to the third embodiment can also execute various processes (write process, read process, and clone deletion process) of the storage operation described in the first embodiment, in addition to the clone creation process described above. The storage system 10B according to the third embodiment can copy part or all of the old data to the clone destination node together with the entity data, as described in the second embodiment. Therefore, such storage system 10B can apply the storage system 10, 10A according to the first or second embodiment to secondary use in the cloud space.

(4) Fourth Embodiment

In the third embodiment, an example has been described in which volume replication is virtually created in an environment in which the storage system 10B is deployed on-premises and the SDS 51 is deployed in the cloud (for example, public cloud). In a fourth embodiment, as in the third embodiment, an example will be described in which the SDS 51 prefetches (prereads) the data in the storage system 10B in an environment in which the storage system 10B in the on-premises environment 40 and the SDS 51 in the public cloud environment 50 are combined.

Figure 24A:
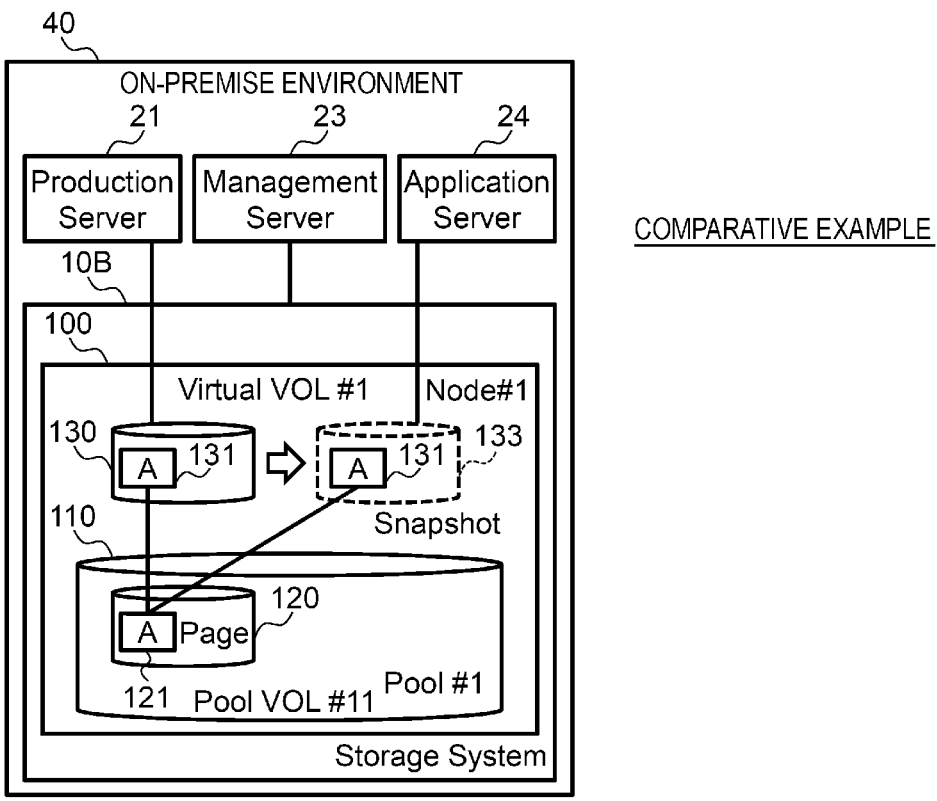
FIGS. 24A and 24B are diagrams for explaining a comparison of a case where the storage system 10B in an on-premises environment 40 performs core business and non-routine analysis/monthly batch processing and a case where the storage system 10B in the on-premises environment 40 performs core business and the SDS 51 in a public cloud environment 50 performs non-routine analysis/monthly batch processing.
Figure 24B:
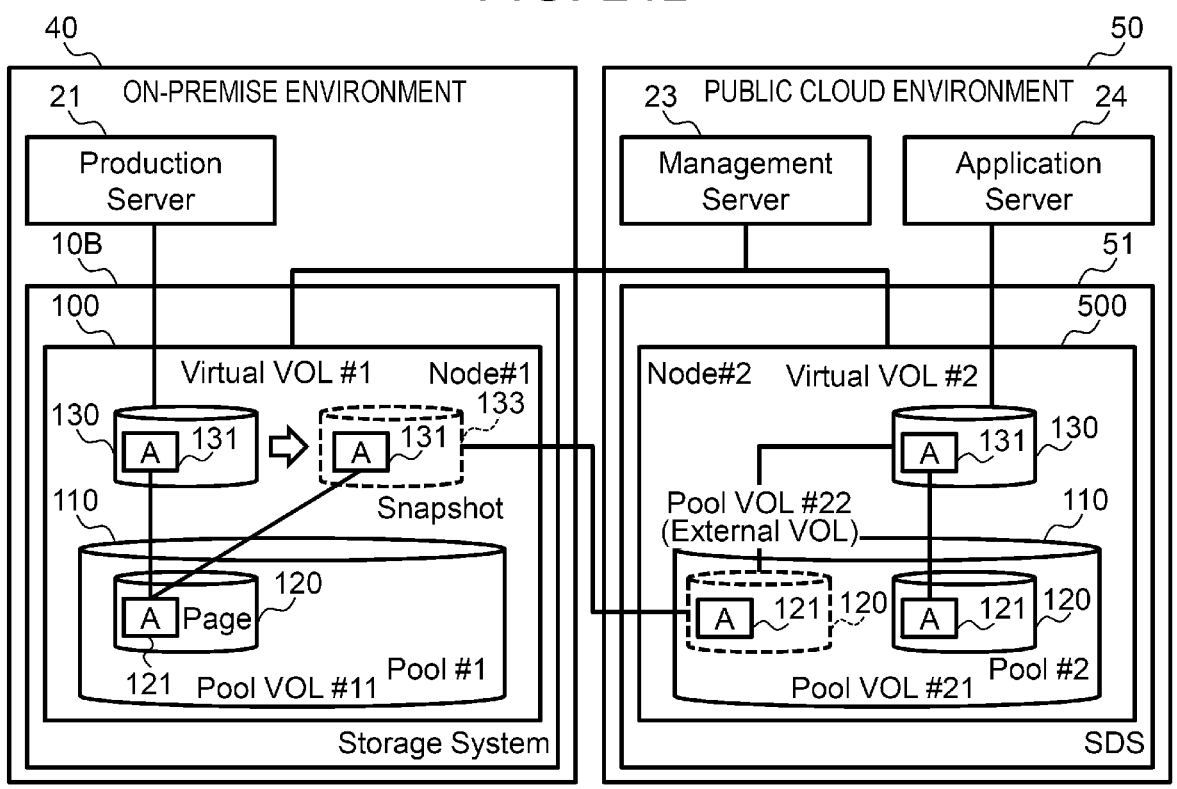

FIG. 24A shows a comparative example, and FIG. 24B shows a use case of the fourth embodiment.

According to FIG. 24A, the production server 21 and an application server 24 are connected to the on-premises storage system 10B. The production server 21 performs, for example, core business, and the application server 24 performs, for example, non-routine analysis business or monthly batch processing business. The non-routine analysis and monthly batch processing are performed on data of a snapshot 133 that stores the state of the data at any time of the virtual volume 130 storing the data on the core business.

When the on-premises storage system 10B performs non-core business such as non-routine analysis business and monthly batch processing business, the load on the storage system 10B increases rapidly, so that there is a risk of impairing the stable operation of core business in terms of performance or the like.

FIG. 24B shows a configuration to improve such problem. The production server 21 is connected to the storage system 10B in the on-premises environment 40, and the application server 24 is connected to the SDS 51 in the public cloud environment 50. A system including the storage system 10B and the SDS 51 is an example of a storage system including a plurality of nodes including first and second nodes. Node #1 (node 100) is an example of a first node, the virtual volume #1 (virtual volume 130) is an example of a first virtual volume, and the production server 21 is an example of a host of the first node (a request source that transmits a read request or a write request designating the address of the first virtual volume). Node #2 (node 500) is an example of a second node, the virtual volume #2 (virtual volume 130) is an example of a second virtual volume, and the application server 24 is an example of a host of the second node (a request source that transmits a read request or a write request designating the address of the second virtual volume). The pool volume #22 (external volume 120) is an example of a first pool volume, and the pool volume #21 is an example of a second pool volume.

The access target for non-routine analysis and monthly batch processing executed by the application server 24 in the public cloud environment 50 is the snapshot 133 created in the storage system 10B in the on-premises environment 40. As in the third embodiment, an external connection function is used for the SDS 51 in the public cloud environment 50 to access the data in the storage system 10B in the on-premises environment 40. The external volume 120 of the SDS 51 and the snapshot 133 of the storage system 10B are connected (mapped) in the same procedure as the flow of FIG. 12. The volume management table 141 is updated such that the virtual volume #2 directly accessed from the application server 24 and the external volume 120 are directly mapped (1:1 linking of addresses). That is, in S305 in FIG. 12, the ID of the external volume 120 is recorded as the corresponding pool volume ID 1417 of the volume management table 141. As described above, the data in the storage system 10B in the on-premises environment 40 can be accessed from the SDS 51 in the public cloud environment 50.

Data to be accessed is transferred (prefetched) from the storage system 10B to the SDS 51 in advance, before executing the non-routine analysis and monthly batch processing. As a result, the storage system 10B in the on-premises environment 40 is not affected by a rapid increase in the load of non-routine analysis and monthly batch processing, and can implement stable operation of core business. Prefetching to the SDS 51 eliminates the need to access the storage system 10B in the on-premises environment 40 physically distant from the SDS 51, and contributes to shortening the processing time for non-routine analysis and monthly batch processing, that is, reducing performance deterioration of the virtual volume #2.

Figure 25:
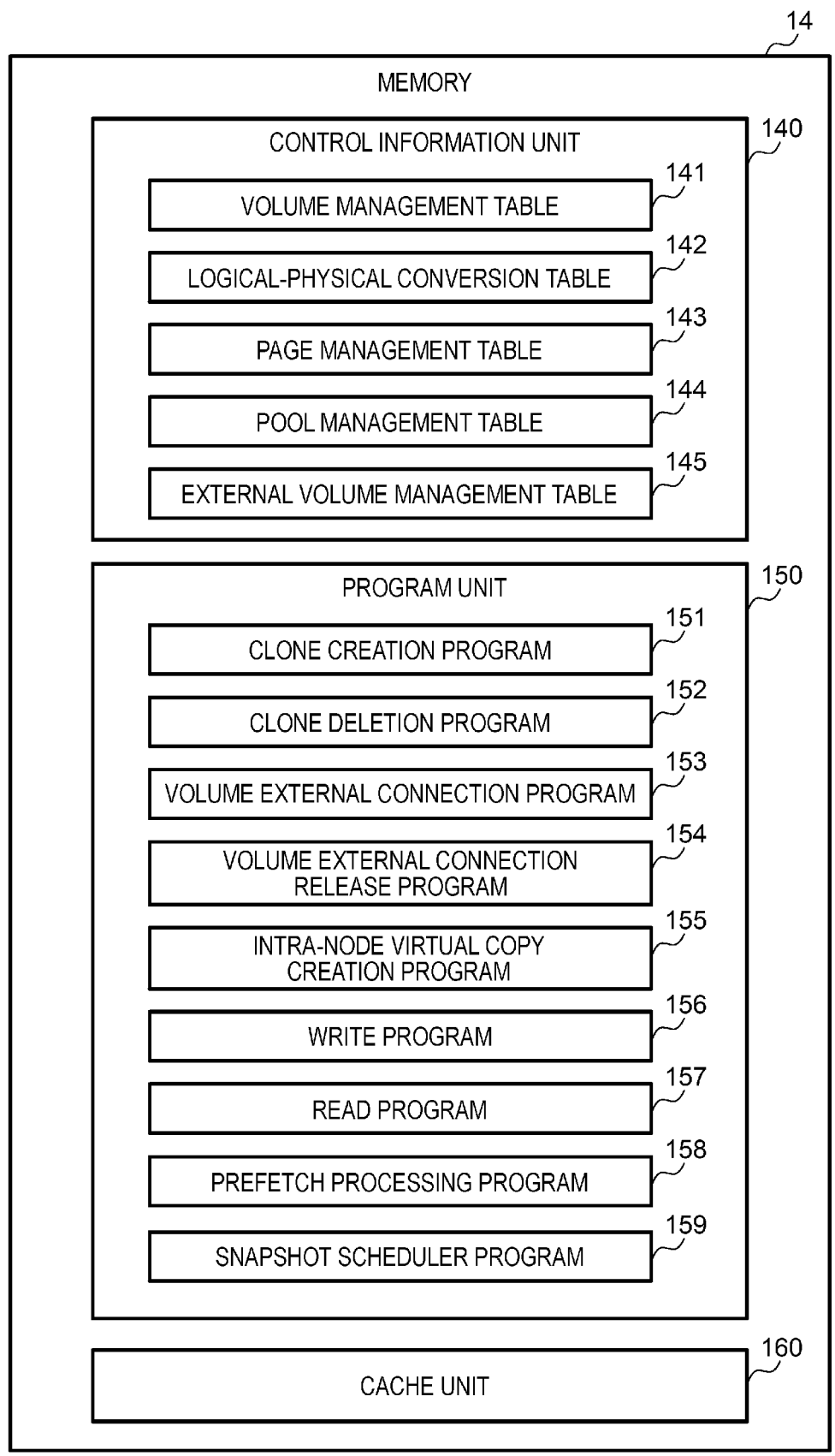
FIG. 25 is a diagram showing a configuration example of the memory 14 of each of the storage system 10 and the SDS 51.

FIG. 25, similar to FIG. 3, is a diagram showing a configuration example of the memory 14 of each of the storage system 10B and the SDS 51, showing an example of programs and control data in the memory 14 used by each of the storage system 10B and the SDS 51. The difference from FIG. 3 is that a prefetch processing program 158 and a snapshot scheduler program 159 are stored in the program unit 150. Details of the process by each program will be described later.

Figure 27:
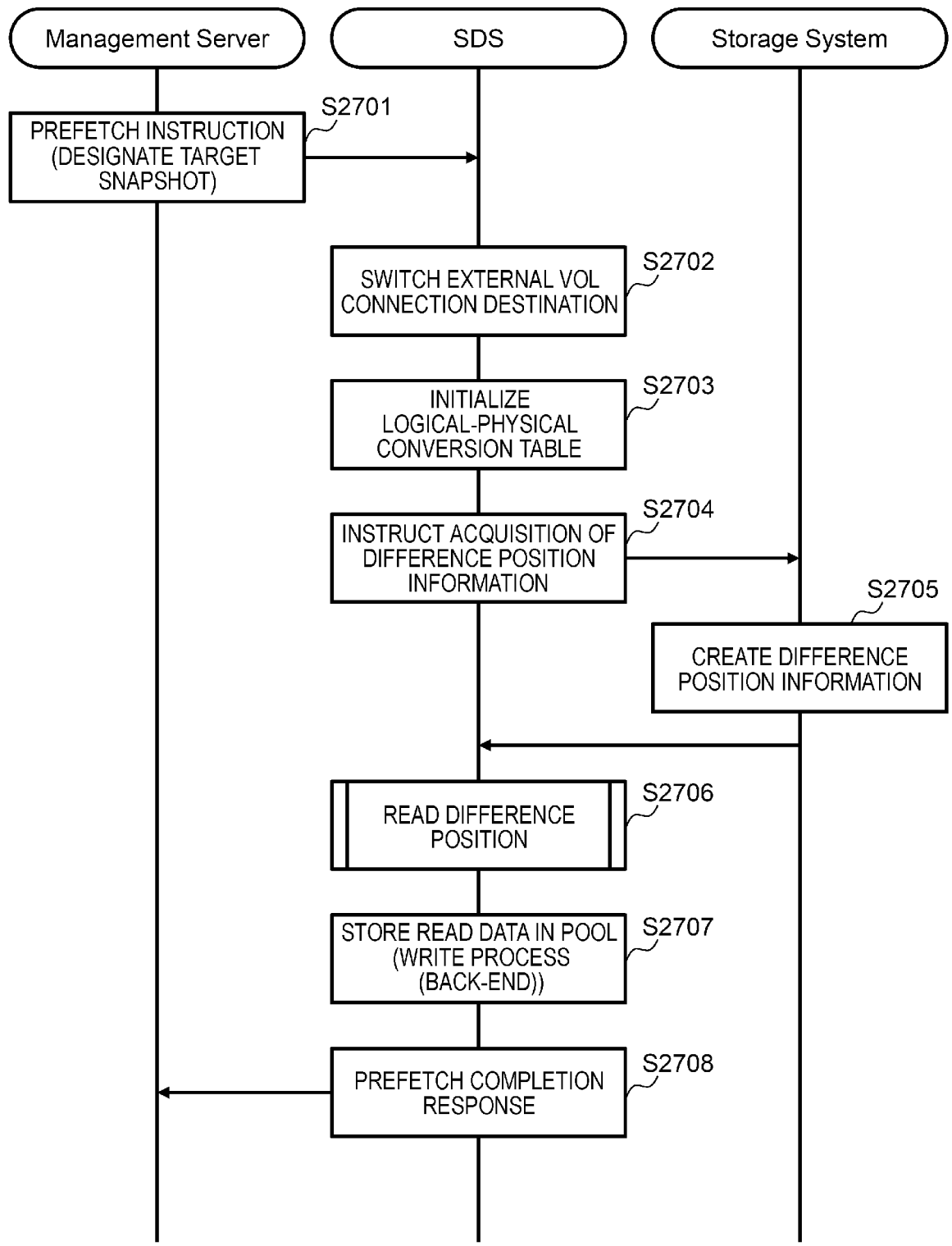
FIG. 27 is a flowchart showing an example of a processing procedure of the process in which the SDS 51 in the public cloud environment 50 prefetches the data in the storage system 10B in the on-premises environment 40.

FIG. 26 is a diagram showing a process image in which the SDS 51 prefetches data in the snapshot 133 of the storage system 10B, before non-routine analysis and monthly batch processing. FIG. 27 is a flowchart showing an example of a processing procedure of a prefetch process. The upper part of FIG. 26 shows a process image when an instruction to prefetch the data in a predetermined snapshot 133 (for example, Snapshot #M) in the node 100 (for example, node #1) in the on-premises environment 40 to the node 500 (for example, node #2) in the public cloud environment 50 is issued, and the lower part of FIG. 26 shows a processing image during the subsequent prefetch process. In the following description, "storage system 10B" may be read as "node #1", and "SDS 51" may be read as "node #2".

Below, the processing procedure of the prefetch process will be described according to the flowchart of FIG. 27 while showing the corresponding portions in FIG. 26 as appropriate. First, in step S2701 of FIG. 27, the management server 23 issues a prefetch instruction to the SDS 51. Specifically, an instruction is issued to prefetch the data in the predetermined snapshot 133 (Snapshot #M) of the node #1 to the node 500 in the public cloud environment 50. This is a process corresponding to (S2601) in FIG. 26. In the prefetch instruction, in addition to Snapshot #M (for example, the current generation number) as the current non-routine analysis/monthly batch processing target, Snapshot #N (for example, the previous generation number) as the previous non-routine analysis/monthly batch processing target may be designated. The management server 23 may exist in the on-premises environment 40 instead of in the public cloud environment 50, or may exist in an environment different from the environments 40 and 50.

Next, in step S2702, the SDS 51 executes a connection destination switching process for the external volume 120 (pool volume #22). That is, the prefetch processing program 158 of the node #2 switches the snapshot of the external connection destination. Before the prefetch instruction, the external volume 120 of the SDS 51 is connected to Snapshot #N of the storage system 10B, but the connection destination of the external volume 120 is changed to Snapshot #M by the switching process. This is a process corresponding to (S2602) in FIG. 26. The external connection destination switching process of the external volume is performed by the same process as in step S303 in FIG. 12. That is, in step S303 in FIG. 12, the entry of the own external volume ID in the external volume management table is updated. Specifically, the target device ID 1454 is rewritten from an ID representing Snapshot #N to an ID representing Snapshot #M which is the switching destination Snapshot. As described above, Snapshot #M in the storage system 10B in the on-premises environment 40 can be accessed from the SDS 51 in the public cloud environment 50.

Next, in step S2703, the prefetch processing program 158 of the SDS 51 initializes the logical-physical conversion table 142 of the virtual volume 130 accessed by the application server 24. By the initialization process, the data prefetched to the SDS 51 by the previous prefetch process is subject to invalidation (subject to garbage collection). For example, when Snapshot #N before switching is subject to non-routine analysis/monthly batch processing, data A and data B in page 131 (address) of Snapshot #N are prefetched to the SDS 51, and the data A and data B are subject to invalidation by the initialization process. This is a process corresponding to (S2603) in FIG. 26. Note that the invalidated data may be deleted by garbage collection and the remaining data may be compacted, so that the remaining data may reside in a continuous address range.

Next, in step S2704, the prefetch processing program 158 instructs the storage system 10B in the on-premises environment 40 to acquire difference position information (information representing a difference position) between Snapshot #N before switching the external connection and Snapshot #M after switching the external connection. This is a process corresponding to (S2604) in FIG. 26. Note that the difference position between Snapshot #N and Snapshot #M is an address of Snapshot #M with a difference in data between Snapshot #M and Snapshot #N. Snapshot #M is an example of a third virtual volume, and Snapshot #N is an example of a third virtual volume of an older generation (for example, the immediately previous generation) than the current third virtual volume.

Next, in step S2705, the prefetch processing program 158 of the storage system 10B creates the difference position information between Snapshot #N and Snapshot #M in response to the difference position information acquisition instruction from the SDS 51, and returns the created difference position information to the SDS 51. This is a process corresponding to (S2605) in FIG. 26. In the example of FIG. 26, the difference position between Snapshot #N and Snapshot #M is the position of data C on page 131 of Snapshot #M. Since the position of data B has not been updated from Snapshot #N, it is not a difference position.

Next, in step S2706, the prefetch processing program 158 of the SDS 51 reads data C from the position (difference position) of the data C on the page 131. That is, data C is transferred from the storage system (block storage) 10B to the SDS 51. This corresponds to the process of (S2606) in FIG. 26. The read process will be described later in detail with reference to FIGS. 30A to 31. Data is read from the difference position specified for the virtual volume #2. Since the virtual volume #2 is directly mapped to the pool volume #22 (the external volume 120), the difference position from which data is to be read is the same position in the pool volume #22 as in the virtual volume #2. The pool volume #22 reads data C (data C in FIG. 26) in the page 131 at the difference position of Snapshot #M of the external destination. As described above, the difference position (address of position of difference data) specified for Snapshot #M is the same for the virtual volume #2 and the pool volume #22, and from the position, data is read from Snapshot #M to the virtual volume #2 through the pool volume #22.

Next, in step S2707, the prefetch processing program 158 of the SDS 51 stores the read data in the own pool #2 of the SDS 51. This is a process corresponding to (S2607) in FIG. 26. Specifically, the prefetch processing program 158 stores (additionally writes) the read data in a pool volume other than the external volume (pool volume #22) in the pool #2. According to the example shown in FIG. 26, data C is stored in the pool volume #21 other than the external volume, and the logical-physical conversion table 142 is updated such that data C stored in page 121 of the pool volume #21 is referenced from the virtual volume #2.

Next, in step S2708, the prefetch processing program 158 of the SDS 51 responds to the management server 23 that the prefetch process is completed.

As described above, before the non-routine analysis/monthly batch processing is performed, the updated portion from the previous non-routine analysis/monthly batch processing target data, specifically, data C illustrated in FIG. 26 can be prefetched to the SDS 51. After that, the SDS 51 performs the IO process of data in response to a request from the application server 24, but the application server 24 is likely to access data C, which is the updated portion from the previously processed data, and the data C was already transferred to the SDS 51 by the prefetch process, which makes high-speed access possible.

Figure 28:
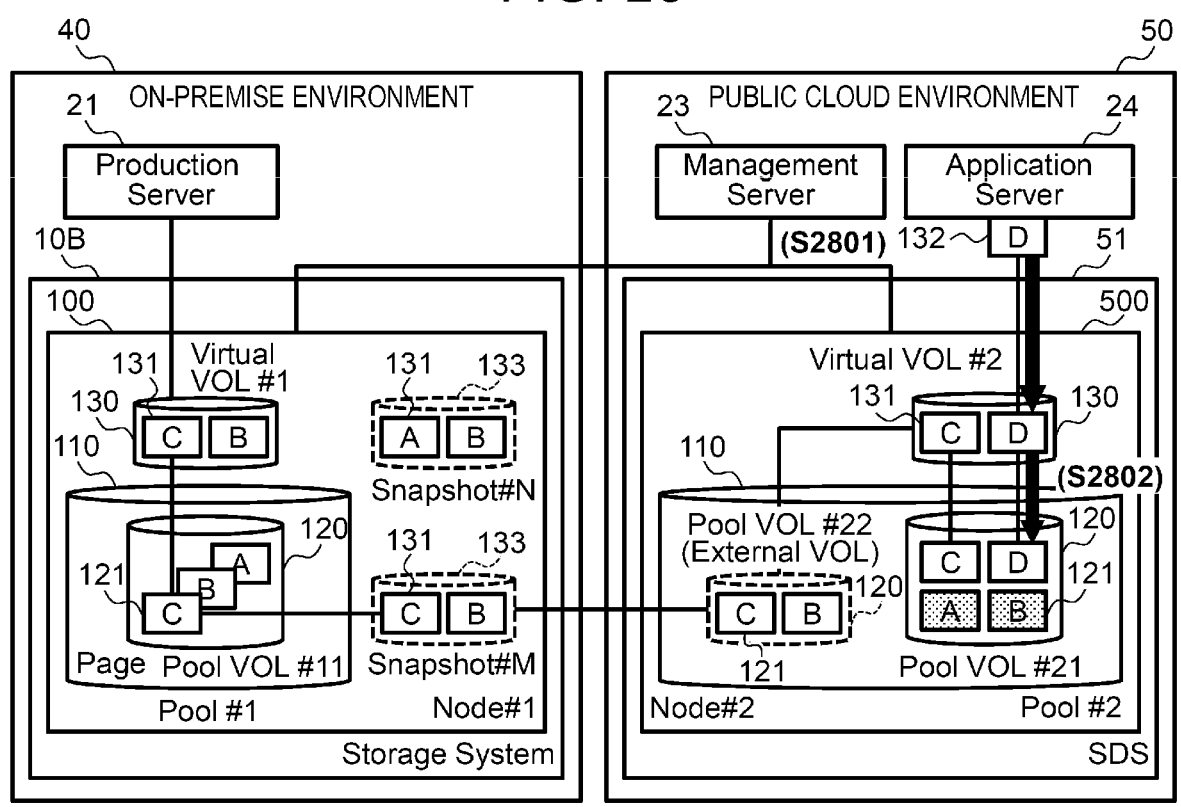
FIG. 28 is a diagram showing a processing image of a write process in the SDS 51 in the public cloud environment 50.
Figure 29A:
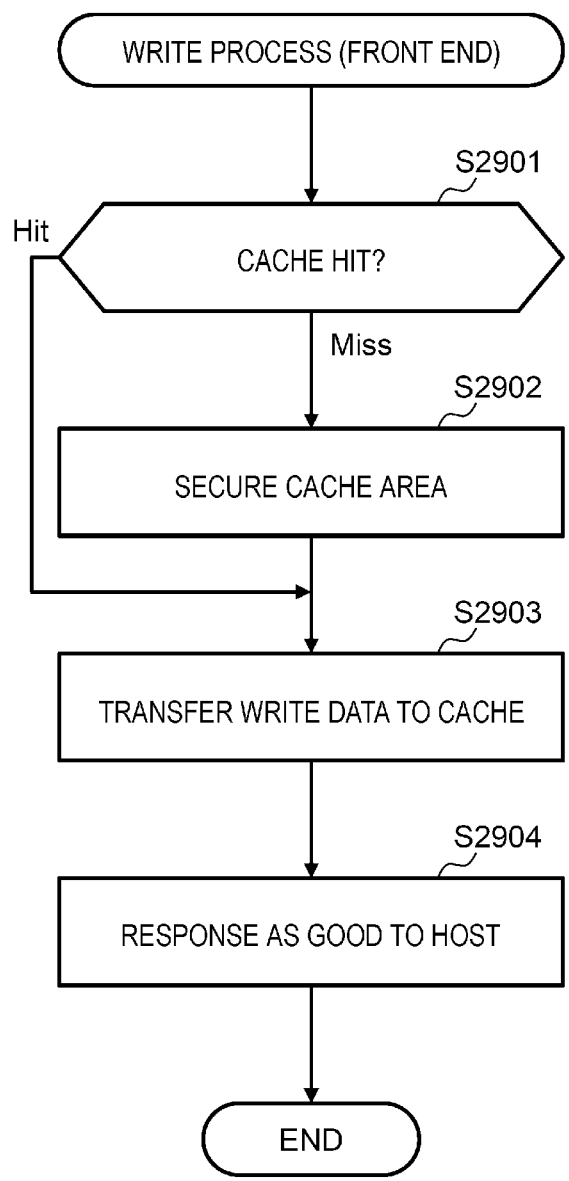
FIG. 29A is a flowchart showing an example of a processing procedure of the write process (front-end) in the SDS 51 in the public cloud environment 50.

FIG. 28 is a diagram showing a processing image of a write process to the virtual volume 130 of the SDS 51. FIG. 28 shows an image in which write data is transferred to the SDS 51 by a write request from the application server 24 to the virtual volume 130, and then the SDS 51 stores the write data in the pool 110. FIG. 29A shows a flowchart showing an example of a processing procedure of the write process on the front-end side, and FIG. 29B shows a flowchart showing an example of a processing procedure of the write process on the back-end side. The write processing procedure on the front-end side executes the same process as in FIG. 14 in the SDS 51. That is, in the controller 11 of the node 500 that received the write request, the write program 156 executes a front-end write process shown in FIG. 29A and a back-end write process shown in FIG. 29B in parallel. Below, the processing procedure of the write process will be described according to the flowcharts of FIGS. 29A and 29B while showing the corresponding portions in FIG. 28 as appropriate.

When the host (application server 24) issues a write request to write data to the virtual volume #2 of the SDS 51, in the controller 11 of the node #2 including the write destination virtual volume #2, the processor 13 starts the write program 156 to execute the write process. The write request includes data to be written (write data) and a write destination address in the target virtual volume 130.

The application server 24 issues a write request to the virtual volume 130 (S2801 in FIG. 28), and write data 132 of "D" is transferred. Here, the virtual volume #2 is a virtual volume for accessing target data for non-routine analysis/monthly batch processing, but actually, Snapshot #M in the block storage 10B in the on-premises environment 40 is externally connected to the pool volume #22 directly mapped to the virtual volume #2, and the data of Snapshot #M is accessible. According to FIGS. 26 and 27, update difference data for the virtual volume #1 from creation of Snapshot #N to creation of Snapshot #M may be prefetched to the SDS 51, as data of the virtual volume #2.

When a write request is received, at the front-end, as shown in FIG. 29A, the write program 156 first checks whether the cache area for the write destination address is secured in the cache unit 160, in other words, whether the data for the write destination address is stored in the cache unit 160 (whether there is a cache hit) (step S2901). When there is no cache hit (Miss in step S2901), the write program 156 secures a cache area for write data (step S2902), and transfers the write data to the cache area (step S2903). On the other hand, when there is a cache hit (Hit in step S2901), the write program 156 skips step S2902 and transfers the write data to the corresponding cache area (step S2903).

The write program 156 then returns a normal response (Good response) for the write request to the host (step S2904), and ends the write process in the front-end.

As shown in FIG. 29B, the write program 156 asynchronously executes the back-end write process, for example. First, it is checked whether dirty data exists in the write destination volume (virtual volume #2) (step S2905). When dirty data exists (YES in step S2905), the process proceeds to step S2906, and when dirty data does not exist (NO in step S2905), the process ends.

In step S2906, the write program 156 establishes data consistency between the control information unit 140 and the cache unit 160 based on the dirty data, performs page allocation of the write data to the write destination volume (virtual volume #2), and updates the page management table 143.

Here, as one of the features of the SDS 51, the external volume to which at least the Snapshot of the block storage 10B is externally connected is the pool volume #22, and the write program 156 of the node (node #2) that configures the SDS 51 performs the log-structured write (so-called "additional writing") of write data in the own node, in response to a write request to the virtual volume 130 (for example, virtual volume #2 in FIG. 28) directly mapped to the pool volume 120. Note that the write program 156 may similarly perform additional writing when a write request is made to the virtual volume 130 that is not directly mapped to the pool volume 120.

In the log-structured write (additional writing), the pool 110 (pool volume 120) stores historical data (pre-update data) updated by the write data 132. Specifically, when a write request is made for existing data in the virtual volume 130, the write program 156 writes (additionally writes) separate write data (post-update data) to the pool volume 120 (for example, pool volume #22) that is not an external volume while maintaining the existing data (pre-update data) in the pool volume 120, and then, changes the mapping from the virtual volume 130 (write destination address) to the pool volume 120, from the address where the pre-update data resides (pool volume address) to the address where the post-update data resides (pool volume address). As a result, the data in the virtual volume 130 is updated, and the historical pre-update data is stored in the pool 110 (pool volume 120). However, since historical pre-update data is no longer referenced by the virtual volume 130, it may be invalidated asynchronously, for example. When a write request for new data is issued to the virtual volume 130, there is no pre-update data in the pool volume 120 linked to the virtual volume 130, so the write program 156 may write the write data to the pool volume 120 that is not an external volume, and perform mapping for the write data from the virtual volume 130 to the pool volume 120.

FIG. 28 shows a processing image when a write request for write data 132 (data "D") is issued to the virtual volume #2, as an example of the log-structured write, and specifically, shows that the write program 156 of the node #2 writes write data (data "D") to the pool volume #21, which is not an external volume, and maps data "D" from the virtual volume #2 to the pool volume #21, without performing a process such as deleting or moving existing data in the pool #2 (data "C" and "B" of the pool volume #22 and data "A", "B" and "C" of the pool volume #21).

It can be seen that such additional writing corresponds to S2802 in FIG. 28, the pool volume #21 is set as the storage destination of the write data (data "D") described above, and data "D" of pool volume #21 is allocated to data "D" of virtual volume #2. When the write request for the write data 132 is to update the data "C" in the virtual volume #2, in FIG. 28, the mapping destination of the old data (data "C") in the virtual volume #2 is updated to the newly written data "D" of pool volume #21, and data "C" of virtual volume #2 is updated to data "D".

After that, the write program 156 destages the dirty data (step S2907), updates the logical-physical conversion table 142 regarding the destage (step S2908), and ends the process.

By executing the write process as described above, when data is written to the virtual volume #2 that can access the data of the snapshot 130 of the storage system 10B via the external volume #22, write data is additionally written to the node #2 of the SDS 51. As a result, the write operation to the virtual volume #2 of the SDS 51 can be performed without imposing a load on or affecting the on-premises storage system 10B.

Figure 30A:
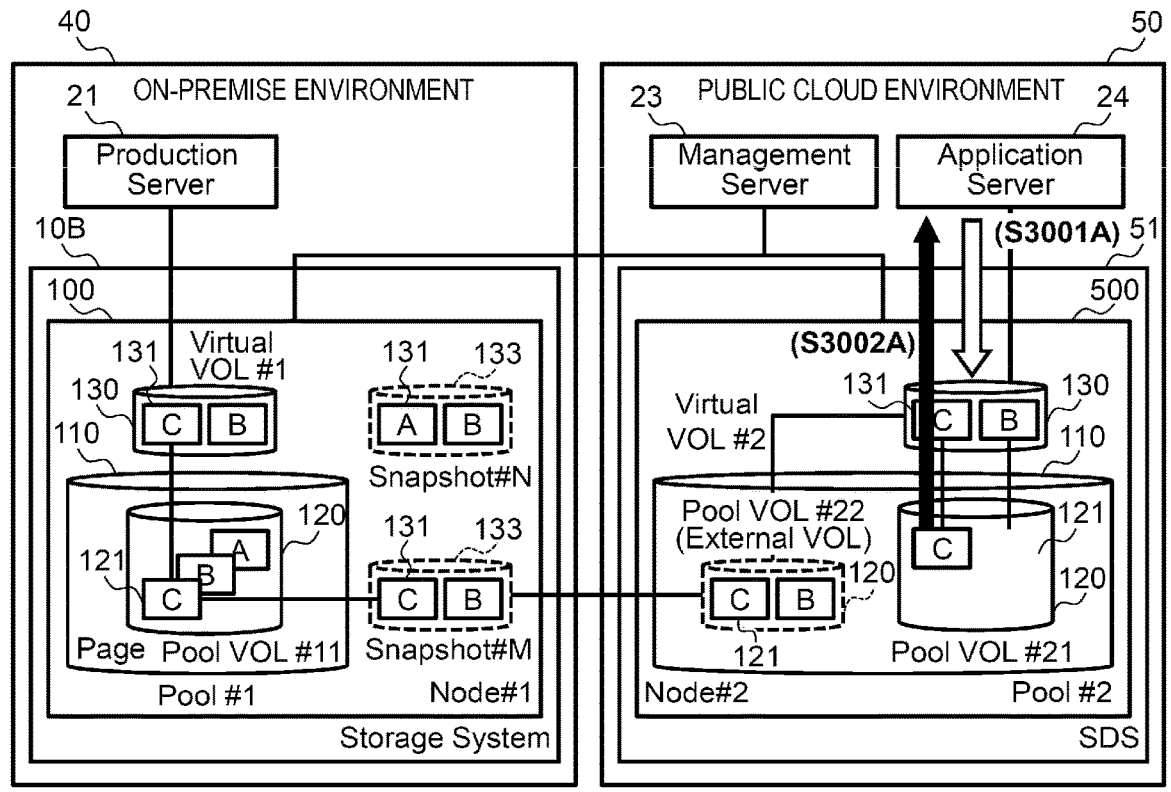
FIG. 30A is a diagram showing a processing image of a read process in the SDS 51 in the public cloud environment 50.
Figure 30B:
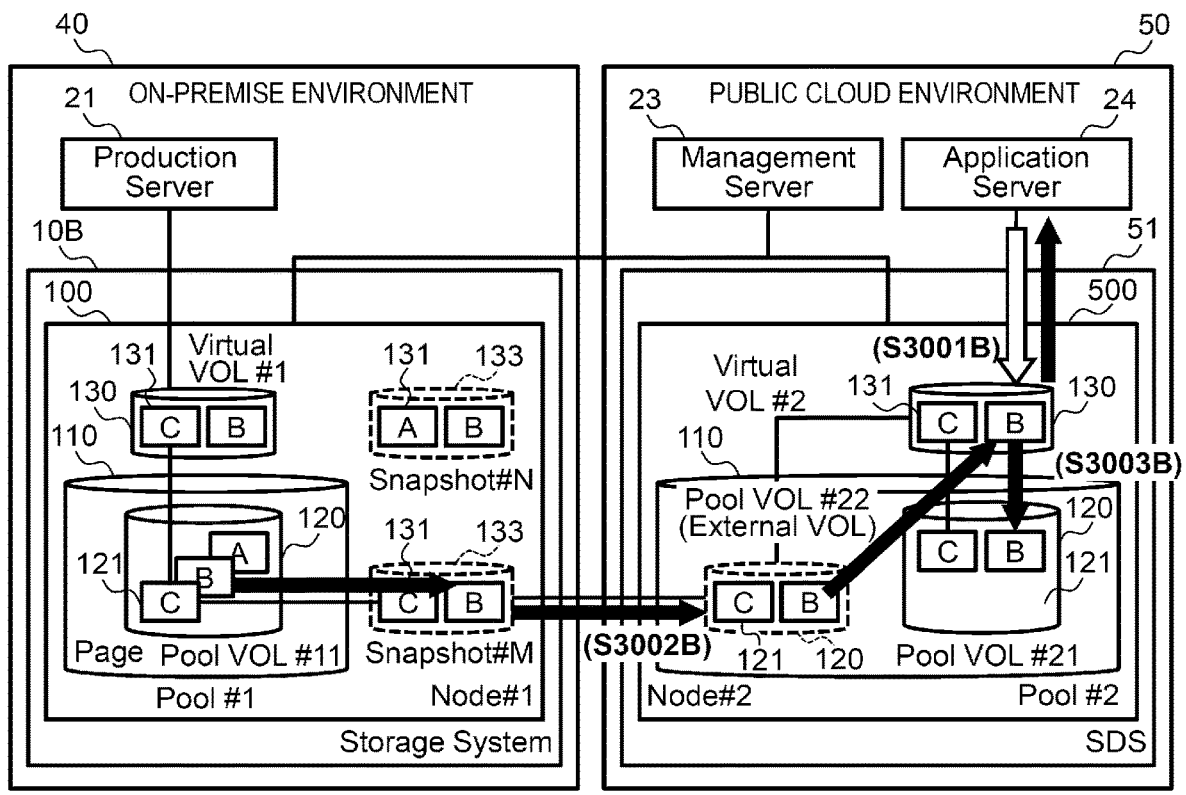
FIG. 30B is a diagram showing a processing image of the read process in the SDS 51 in the public cloud environment 50.

FIGS. 30A and 30B are diagrams each showing an example of a read processing flow. FIG. 30A shows a processing image of the read process when the host issues a read request for data stored in the own node to the virtual volume #2 of the SDS 51 (that is, when the destination volume of the read request and the storage destination of the entity of the read data are the same node). FIG. 30B shows a processing image of the read process when the host issues a read request for data stored in another node to the virtual volume #2 (that is, when the destination volume of the read request and the storage destination of the entity of the read data are different nodes, and in the example of FIG. 30B, when the entity of data is in the block storage 10B in the on-premises environment 40). The example shown in FIG. 30B partially includes the difference position read process in the prefetch process described in FIGS. 26 and 27, that is, step S2706 in FIG. 27 (read process corresponding to S2606 in FIG. 26).

Figure 31:
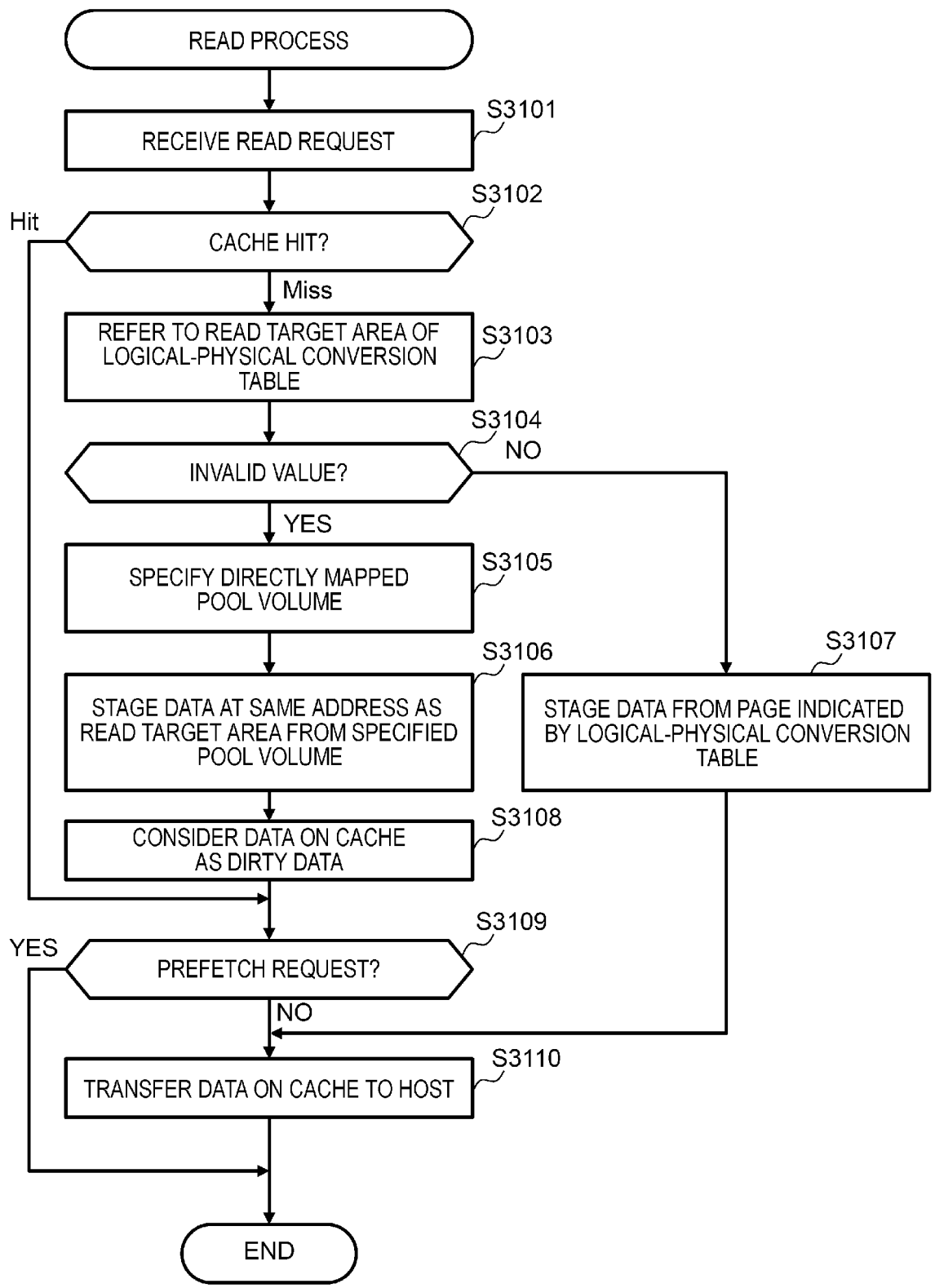
FIG. 31 is a flowchart showing an example of a processing procedure of the read process in the SDS 51 in the public cloud environment 50.

FIG. 31 is a flowchart showing an example of a processing procedure of the read process. Below, the processing procedure of the read process will be described according to the flowchart of FIG. 31 while showing the corresponding portions in FIGS. 30A and 30B as appropriate.

When a host (production server 21, application server 24, or management server 23) issues a read request to read data from the virtual volume of the SDS 51, in the controller 11 of the node 500 that received the read request, the processor 13 starts the read program 157 to execute the read process. The read request includes the read data storage range (read target area) in the target volume.

According to FIG. 31, the read program 157 first receives a read request (step S3101). In FIG. 30A, in S3001A, a read request for data "C" is issued to the virtual volume #2. In FIG. 30B, in S3001B, a read request for data "B" is issued to the virtual volume #2.

Next, the read program 157 performs cache hit/miss determination to determine whether the read data is stored in the cache unit 160 (step S3102). When there is a cache hit of read data (Hit in step S3102), it is determined whether it is a prefetch instruction (step S3109). When it is a prefetch instruction (YES in step S3109), the read program 157 ends the read process. When it is not a prefetch instruction (No in step S3109), the read program 157 transfers the cache hit data to the host (step S3110), and ends the read process. On the other hand, when the read data is not in the cache (Miss in step S3102), the process proceeds to step S3103.

In step S3103, the read program 157 refers to the read target area of the logical-physical conversion table 142. Then, the read program 157 checks whether the value of the physical address 1422 of the read target area referred to in step S3103 is an invalid value (step S3104). When the value of the physical address 1422 of the read target area is an invalid value in step S3104 (YES in step S3104), the process proceeds to step S3105, and when the value of the physical address 1422 of the read target area is not an invalid value (NO in step S3104), the process proceeds to step S3107.

Here, as described above with reference to FIG. 5, in the logical-physical conversion table 142, when data is not stored in the own node (specifically, data is stored in a node other than the node where the read target virtual volume exists, for example), the value of the physical address 1422 is an invalid value such as "FFFFFFFF". In FIG. 30A, when the read data is data "C", the data "C" is stored in the node #2, which is the own node, so that the physical address of the storage destination is indicated in the physical address 1422. On the other hand, in FIG. 30B, when the read data is data "B", the data "B" is stored in the node #1 of the storage system 10B in the on-premises environment 40, so that an invalid value is indicated in the physical address 1422.

That is, when the entity of the read data is stored in the own node (FIG. 30A), the process proceeds from step S3104 to step S3107. When the entity of the read data is not stored in the own node (FIG. 30B), the process proceeds from step S3104 to step S3105.

First, to explain the case where the process proceeds from step S3104 to step S3105, the read program 157 refers to the volume management table 141, and specifies the pool volume 120 (pool volume #22) in which the data of the read request target volume (virtual volume #2) is directly mapped (straight mapped), from the corresponding pool volume ID 1417 (step S3105).

Next, the read program 157 stages data at the same address as the read target area from the pool volume 120 specified in step S3105 (step S3106). This process corresponds to S3002B in FIG. 30B. Specifically, as indicated by the thick arrows in FIG. 30B, via Snapshot #M to which the pool volume #22 specified in step S3105 is externally connected, a read request is made for data "B" in the pool volume #11 of the node #1 in the on-premises environment 40, as data at the same address, and the entity data of the data "B" is read from the physical drive 12 storing the entity data of the data "B" and is transferred to the cache unit 160 of the node #2.

After the process of step S3106, the read program 157 considers the data on the cache transferred in step S3106 as dirty data (step S3108). Due to considering as dirty data, the data read from the storage system 10B in the on-premises environment 40 is to be destaged to the own node (node #500) of the SDS 51 (S3003B in FIG. 30B). By storing (prefetching) the data read from the on-premises environment 40 in the own node as such, it is possible to access the data at high speed when reading the data from the application server 24 again. Additional writing may also be performed in the prefetch. Next, the read program 157 determines whether it is a prefetch instruction in step S3109 (step S3109). When it is a prefetch instruction (Yes in step S3109), the read process ends. When it is not a prefetch instruction (No in step S3109), the read program 157 transfers the data read to the cache to the host (step S3110), and ends the read process.

On the other hand, when the process proceeds from step S3104 to step S3107, the read program 157 refers to the logical-physical conversion table 142 and stages data from the page indicated by the physical address 1422 corresponding to the logical address of the read target area (step S3107). The process corresponds to S3002A in FIG. 30A. Specifically, as indicated by the thick arrow in FIG. 30A, the data on the page indicated by the logical address of the read target area is data "C" of the pool volume #21, and the entity data of the data "C" is read from the physical drive 12 where the entity data of the data "C" is stored and is transferred to the cache unit 160.

After the process of step S3107, the read program 157 transfers the data on the cache transferred in step S3107 to the host (step S3110), and ends the read process.

By executing the read process as described above, the SDS 51 reads read data from the own node and sends a response when a valid value is set in the mapping information (logical-physical conversion table 142). On the other hand, when an invalid value is set in the mapping information (logical-physical conversion table 142), the SDS 51 determines that there is read data in another node, and can read data from the other node via the external volume and respond.

Figure 32:
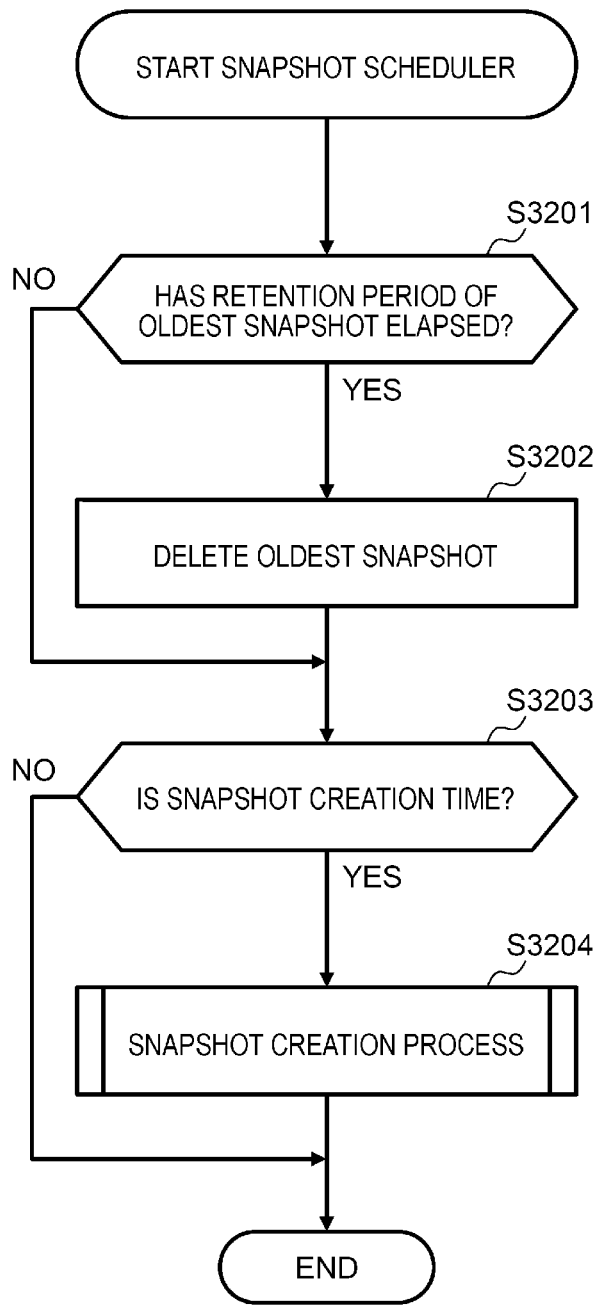
FIG. 32 is a flowchart showing an example of a processing procedure of a snapshot scheduler process in the storage system 10B in the on-premises environment 40.

FIG. 32 is a flowchart showing a processing procedure of a process for periodically creating a snapshot of the virtual volume #1 accessed from the production server 21 in the storage system 10B in the on-premises environment 40. Snapshots, which can instantly and virtually duplicate data in the virtual volume #1, are likely to be used for the purpose of logical data protection and are likely to be created periodically. A retention period (protection period) is set for the snapshot, and during the time from when the snapshot is created until the retention period passed, the snapshot cannot be deleted or rewritten, so that the snapshot can be maintained as backup.

The snapshot scheduler program 159 of the storage system 10B is started asynchronously, for example. After being started, the snapshot scheduler program 159 determines whether the trigger for snapshot deletion/snapshot creation is reached, based on the snapshot creation cycle and retention period information (not shown) set by the user via the management server 23 in advance. In step S3201, the snapshot scheduler program 159 checks the retention period of the oldest snapshot and checks whether the remaining retention period reached zero. When the remaining retention period is zero (YES in step S3201), the process transitions to step S3202. When the remaining retention period remains (NO in step S3201), the process transitions to step S3203.

In step S3202, the snapshot scheduler program 159 deletes the oldest snapshot, because the remaining retention period of the oldest snapshot is zero.

In step S3203, the snapshot scheduler program 159 determines whether the time to create a new snapshot is reached. When the time to create a new snapshot is reached (YES in step S3203), the process transitions to step S3204. When the time to create a new snapshot is not reached (NO in step S3203), the snapshot scheduler program 159 ends.

In step S3204, the snapshot scheduler program 159 creates a snapshot. Specifically, for example, the snapshot scheduler program 159 executes the intra-node virtual copy creation process described with reference to FIG. 11.

(5) Fifth Embodiment

Next, a method different from the prefetch process described with reference to FIGS. 26 and 27 in the fourth embodiment will be described. In the fourth embodiment, the data prefetched in the previous prefetch process is invalidated before the prefetch process. Specifically, in FIG. 26, the data "A" and "B" that are prefetched to the SDS 51 by referring to Snapshot #N from the external volume in the previous process become invalid data in the SDS 51 before the current prefetch process, and the data "C" at the difference position between Snapshot #M externally connected currently and Snapshot #N externally connected previous time is prefetched. In the method, with respect to the data "B" that is not updated between the creation of Snapshot #N and the creation of Snapshot #M, the data entity exists only in the storage system 10B in the on-premises environment 40. When the SDS 51 accesses the data "B", it is necessary to transfer the data again from the on-premises environment 40 to the public cloud environment 50, affecting the agility of non-routine analysis/monthly batch processing.

A fifth embodiment solves the problem. Specifically, in the lower part of FIG. 33, even after switching the external connection destination from Snapshot #N to Snapshot #M, the previously prefetched data "B" is not set as data to be invalidated by the SDS 51, and high-speed access can also be provided when the data "B" is accessed from the application server 24. Note that it is preferable that the fifth embodiment (previously prefetched data is not set as data to be invalidated by the SDS 51) is applied when data overlaps between Snapshot #N, which is the previous analysis target, and Snapshot #M, which is the current analysis target (for example, the case of applications like "data analysis"). On the other hand, it is preferable that the fourth embodiment (previously prefetched data is set as data to be invalidated by the SDS 51) is applied when (for example, when executing "monthly batch processing") only data updated during a certain period (for example, the period from Snapshot #N to Snapshot #M) is treated as data to be handled (utilization target).

The upper part of FIG. 33 shows an example in which data "E" is written to the virtual volume #2 while Snapshot #N is externally connected to the external volume 120, but according to the lower part of FIG. 33, the data "E" written from the host (application server 24) in the public cloud environment 50 is subject to invalidation after the external connection destination is switched to Snapshot #M.

FIG. 33 is a diagram showing a process image in which the SDS 51 prefetches data in the snapshot 133 of the storage system 10B, before non-routine analysis and monthly batch processing. FIG. 34 shows an example in which a host write data flag 1423 is added to the logical-physical conversion table 142 of FIG. 5. The host write data flag 1423 is used to determine whether the data is to be invalidated because it is host write data, or not to be invalidated because it is data read from the on-premises environment 40 by a prefetch process, after the Snapshot of the external connection destination is switched.

FIG. 35 is a flowchart showing an example of a processing procedure of the prefetch process, and the difference from FIG. 26 is that the previous prefetch data remains. The upper part of FIG. 33 shows a processing image when an instruction to prefetch the data of a predetermined snapshot 133 (for example, Snapshot #M) in the node 100 (for example, node #1) in the on-premises environment 40 to the node 500 (for example, node #2) in the public cloud environment 50 is issued, and the lower part of FIG. 33 shows a processing image during the subsequent prefetching process.

Below, the processing procedure of the prefetch process will be described according to the flowchart of FIG. 35 while showing the corresponding portions in FIG. 33 as appropriate. First, in step S3501 of FIG. 35, a prefetch instruction is issued from the management server 23 to the SDS 51. Specifically, an instruction is issued to prefetch the data in the predetermined snapshot 133 (Snapshot #M) of the node #1 to the node 500 in the public cloud environment 50. This is a process corresponding to (S3301) in FIG. 33.

Next, in step S3502, the SDS 51 executes the connection destination switching process for the external volume. That is, the prefetch processing program 158 of the node 500 (node #2) switches the snapshot of the external connection destination. The external volume 120 of the SDS 51, which is connected to Snapshot #N of the storage system 10B before the prefetch instruction, changes the connection destination to Snapshot #M. This is a process corresponding to (S3302) in FIG. 33. The external connection destination switching process of the external volume is performed by the same process as in step S303 in FIG. 12. That is, in S303 in FIG. 12, the entry of the own external volume ID in the external volume management table is updated. Specifically, the target device ID 1454 is changed from an ID representing Snapshot #N to an ID representing Snapshot #M, which is the switching destination Snapshot. As described above, Snapshot #M in the storage system 10B in the on-premises environment 40 can be accessed from the SDS 51 in the public cloud environment 50.

Next, in step S3503, the prefetch processing program 158 of the SDS 51 initializes the entry indicating the host write data in the logical-physical conversion table 142 of the virtual volume 130 accessed by the application server 24, thereby invalidating host write data while Snapshot #N is externally connected. Through the invalidation process, the host write data "E" in the upper part of FIG. 33 is invalidated. The prefetch data "B" of Snapshot #N before Snapshot switching is not subject to invalidation. This is a process corresponding to (S3303) in FIG. 33. The prefetch processing program 158 refers to the host write data flag 1423 in FIG. 34 to determine whether the data is host write data or prefetch data in step S3503.

Next, in step S3504, the prefetch processing program 158 instructs the storage system 10B in the on-premises environment 40 to acquire the difference position information between Snapshot #N before switching the external connection and Snapshot #M after switching the external connection. This is a process corresponding to (S3304) in FIG. 33.

Next, in step S3505, the prefetch processing program 158 of the storage system 10B creates information on difference position between Snapshot #N and Snapshot #M, in response to the difference position information acquisition instruction from the SDS 51, and returns the created difference position information to the SDS 51. This is a process corresponding to (S3305) in FIG. 33. In the example of FIG. 35, the difference position between Snapshot #N and Snapshot #M is the position of data C on page 131 of Snapshot #M. Since the position of data "B" is not updated from Snapshot #N, the position of data "B" is not a difference position.

Next, in step S3506, the prefetch processing program 158 of the SDS 51 reads data C. Therefore, the data "C" is transferred from the block storage 10B to the SDS 51. This corresponds to the processing of (S3306) in FIG. 33. The read process is the same as in FIGS. 30A to 31 described above, and the data at the difference position specified for the virtual volume #2 is read.

Next, in step S3507, the prefetch processing program 158 of the SDS 51 stores the read data in the own pool #2 of the SDS 51. This is a process corresponding to (S3307) in FIG. 33. According to FIG. 33, data "C" is stored in the pool volume #21 other than the external volume, and the logical-physical conversion table 142 is updated such that data "C" stored in page 121 of the pool volume #21 is referred to from the virtual volume #2.

Next, in step S3508, the prefetch processing program 158 of the SDS 51 responds to the management server 23 that the prefetch process is completed.

As described above, before the non-routine analysis/monthly batch processing is performed, data "C" in the example of FIG. 33 can be prefetched to the SDS 51 for the updated portion from the non-routine analysis/monthly batch processing target data. After that, the SDS 51 performs the data 10 process in response to a request from the application server 24. The application server 24 is likely to access data "C", which is the updated portion from the previously processed data, and the data "C" is already transferred to the SDS 51 by the prefetch process, which makes high-speed access possible. In the fifth embodiment, the prefetch data "B" when Snapshot #N is externally connected also remains in the own node (node 500) of the SDS 51, and access to data "B" can be implemented fast.

Although some embodiments have been described above, the embodiments are examples for explaining the present invention, and the scope of the present invention is not limited thereto. The present invention can be executed in various other forms. For example, one or more physical drives 12 may reside outside the node, and a node may not necessarily include the physical drive 12.

The above description can be summarized as follows, for example. The following summary may include supplementary explanation and explanations of modification examples described above.

A storage system includes a plurality of nodes including first and second nodes. Each node includes a virtual volume, a pool (consisting of one or more pool volumes, in which data to an address of the virtual volume is logically stored at an address mapped to the address), one or more physical drives (one or more physical drives in which the entity of the data logically stored in the pool is stored), a memory (a memory that stores management information related to the data, which is information including mapping (for example, the logical-physical conversion table 142) between the address of the virtual volume and an address of the pool), and a processor connected to the memory. The processor in the first node (for example, node #1) performs virtual copy, which is a copy of the mapping between the address of the virtual volume and the address of the pool, for the first virtual volume (for example, virtual volume #1) in the first node, to create a third virtual volume (for example, virtual volume #3 or Snapshot #N) in the first node. The processor in the second node (for example, node #2) performs mapping (external connection) from the first pool volume (for example, pool volume #22) in the second node to the third virtual volume created in the first node. The processor of the second node links the address of the first pool volume mapped (externally connected) to the third virtual volume to the address of the second virtual volume (for example, virtual volume #2) in the second node on a one-to-one basis (performs direct mapping between the first pool volume and the second virtual volume). When the address of the data to be written (specifically, for example, data to be written to the second virtual volume in response to a write request to the second node, or data read from the first node and written to the second virtual volume) is the address in the second virtual volume, the processor of the second node performs the log-structured write of the data to the second pool volume in the second node (an example of a pool volume other than the first pool volume among the pools of the second node). The log-structured write includes storing post-update data in the pool while pre-update data remains in the pool, and changing a mapping destination address of the address of the virtual volume from an address of the pre-update data to an address of the post-update data.

The first node may be a node in the on-premises environment 40 and the second node may be a node in the public cloud environment 50. The third virtual volume may be a volume (for example, Snapshot #M) as a snapshot of the first virtual volume. The processor of the second node may perform a prefetch process in response to a prefetch instruction. The prefetch process may include prefetching the data in the second virtual volume through an address in the first pool volume that is mapped to the address with data in the third virtual volume, and performing log-structured write of the prefetched data to the second pool volume.

The mapping from the first pool volume to the third virtual volume may be changing the mapping destination of the first pool volume from a third virtual volume (for example, Snapshot #N) of a generation older than the third virtual volume to the third virtual volume. The prefetch process may include specifying, from the first node, a difference position which is an address having a difference in data from a third virtual volume of a generation older than the third virtual volume, among the third virtual volumes. The prefetched data may be data obtained from the difference position.

The processor of the second node may invalidate the data prefetched in the previous prefetch process and written to the second pool volume such that the data is subject to garbage collection. The previous prefetch process may include prefetching data from an address having a difference in data from a third virtual volume (not shown) of a further older generation than the third virtual volume of the old generation, among the third virtual volumes of the old generation, and performing log-structured write of the prefetched data to the second pool volume.

When a write request designating the second virtual volume is received after the prefetch process, the processor of the second node may perform log-structured write of write data accompanying the write request, to any pool volume (for example, the second pool volume) other than the first pool volume, among the pools of the second node.

When receiving a read request designating the second virtual volume after the prefetch process, the processor of the second node may determine a node where the data at the address designated in the read request is, based on the management information in the memory of the second node. When the determined node is the second node, the processor of the second node may read data from the address of the second pool volume mapped to the designated address. When the determined node is the first node, the processor of the second node may acquire data from the third virtual volume of the first node through the address of the first pool volume that is mapped to the designated address. When data is acquired from the first node in response to the read request, the processor of the second node performs the log-structured write of the data to any pool volume (for example, the second pool volume).

The processor of the second node may not invalidate the data prefetched in the previous prefetch process and written to the second pool volume for subjecting the data to garbage collection.

The processor of the second node may invalidate the write data in the prefetch process such that the write data, written to the second pool volume in response to the write request before the prefetch process, is subject to garbage collection. The management information in the memory of the second node may include information (for example, the host write data flag 1423) indicating whether it is data prefetched and written in the prefetch process in response to a prefetch instruction or write data written in response to a write request, for each piece of data written to the second pool volume. Based on the management information, the processor of the second node may specify the write data written to the second pool volume in response to the write request before the prefetch process, and invalidate the specified write data.

When a request is made to write the write data to the second virtual volume created as a virtual clone of the first virtual volume, the processor of the second node may store the write data in the second pool volume different from the first pool volume by the log-structured write, store entity of the write data in the physical drive of the second node, and update the mapping such that a link destination of the write data in the second virtual volume is write data stored in the second pool volume.

The management information in each node may include logical-physical conversion data for managing correspondence between a logical storage destination of data and a physical storage destination of the data in the own node. When the virtual clone of the first virtual volume is created, the processor of the second node may set the physical storage destination of the data virtually stored by the second virtual volume linked to the first pool volume to an invalid value, in the logical-physical conversion data.

When a request is made to read the read data to the second virtual volume created as a virtual clone, the processor of the second node may determine a node to read the read data from, based on whether the physical storage destination of the read data is the invalid value, with reference to the logical-physical conversion data of the own node.

When a request is made to read the read data from the second virtual volume created as a virtual clone, when the physical storage destination of the read data in the logical-physical conversion data of the own node is an invalid value, the processor of the second node requests the processor of the first node to read the read data from the third virtual volume mapped from the first pool volume, and the processor of the first node may acquire the entity of the read data requested to be read by the processor of the second node from the physical drive of the first node, based on the logical-physical conversion data of the own node, and transfer the entity of the read data to the second node.

When a request is made to delete the second virtual volume created as a virtual clone of the first virtual volume, the processor of the second node releases mapping from the first pool volume to the third virtual volume, and releases the link between the second virtual volume and the first pool volume. After release of mapping at the second node, the processor of the first node may delete the third virtual volume. When a request is made to delete the second virtual volume created as a virtual clone, the processor of the second node may further delete the write data stored in the physical drive of the own node, in response to a request to write the write data to the second virtual volume.

After the second virtual volume is created as a virtual clone of the first virtual volume, when the load on the first node exceeds a predetermined threshold due to a data input/output request to the second node, the processor of the second node may acquire the entity of at least part of the data of the first pool volume linked to the second virtual volume from the first node and store the data in the physical drive of the second node, and thereafter, the processor may copy the data to a third pool volume different from the first pool volume, and update the management information to link the second virtual volume and the third pool volume, for the data copied from the first pool volume to the third pool volume. When the entity of the entire data of the first pool volume linked to the second virtual volume is acquired from the first node and stored in the physical drive of the second node, the processor of the second node may release mapping from the first pool volume to the third virtual volume, and release link between the second virtual volume and the first pool volume.

When the storage system is configured to be connected to the cloud environment, the processor of the first node and the processor of a third node provided in the cloud environment may cooperate to execute the process of replacing the second virtual volume with a fourth virtual volume in the third node, thereby creating a virtual clone of the first virtual volume also in the third node in the cloud environment.

What is claimed is:

1. A storage system comprising a plurality of nodes including first and second nodes, wherein
   each node includes
      a virtual volume,
      a pool including one or more pool volumes, in which data to an address of the virtual volume is logically stored in an address mapped to the address of the virtual volume,
      one or more physical drives that store entity of data which is logically stored in the pool,
      a memory that stores management information about data, which is information including mapping between an address of the virtual volume and an address of the pool, and
      a processor connected to the memory,
   a processor of the first node performs virtual copy, which is a copy of the mapping between the address of the virtual volume and the address of the pool, to a first virtual volume in the first node, to create a third virtual volume in the first node,
   a processor of the second node
      performs mapping from a first pool volume in the second node to the third virtual volume created in the first node,
      links an address of the first pool volume, which is mapped to the third virtual volume, to an address of a second virtual volume in the second node on a one-to-one basis, and
      when an address of data to be written is an address of the second virtual volume, performs log-structured write of the data to a second pool volume in the second node, and
   the log-structured write includes storing post-update data in the pool while pre-update data remains in the pool, and changing a mapping destination address of the address of the virtual volume from an address of the pre-update data to an address of the post-update data.

2. The storage system according to claim 1, wherein
   the first node is a node in an on-premises environment,
   the second node is a node in a public cloud environment,
   the third virtual volume is a volume as a snapshot of the first virtual volume,
   the processor of the second node performs a prefetch process in response to a prefetch instruction, and
   the prefetch process includes
      prefetching the data in the second virtual volume through an address in the first pool volume that is mapped to the address with data in the third virtual volume, and
      performing log-structured write of the prefetched data to the second pool volume.

3. The storage system according to claim 2, wherein
the mapping from the first pool volume to the third virtual volume is changing a mapping destination of the first pool volume from a third virtual volume of an older generation than the third virtual volume to the third virtual volume,
the prefetch process includes specifying, from the first node, a difference position, which is an address having a difference in data between the third virtual volume and the third virtual volume of an older generation than the third virtual volume, among the third virtual volumes, and
the prefetched data is data obtained from the difference position.

4. The storage system according to claim 3, wherein
the processor of the second node invalidates data which is prefetched in a previous prefetch process and written to the second pool volume such that the data is subject to garbage collection, and
the previous prefetch process includes prefetching data from an address having a difference in data from a third virtual volume of a further older generation than the third virtual volume of the old generation, among the third virtual volumes of the old generation, and performing log-structured write of the prefetched data to the second pool volume.

5. The storage system according to claim 2, wherein
when a write request designating the second virtual volume is received after the prefetch process, the processor of the second node performs log-structured write of write data accompanying the write request, to any pool volume other than the first pool volume, among pools of the second node.

6. The storage system according to claim 2, wherein
when a read request designating the second virtual volume is received after the prefetch process, the processor of the second node
determines a node in which data at an address designated by the read request resides, based on management information in the memory of the second node,
when the determined node is the second node, reads the data from the address of the second pool volume mapped to the designated address, and
when the determined node is the first node, acquires the data from the third virtual volume of the first node through the address of the first pool volume mapped to the designated address.

7. The storage system according to claim 6, wherein
when data is acquired from the first node in response to the read request, the processor of the second node performs the log-structured write of the data to the second pool volume.

8. The storage system according to claim 3, wherein
the processor of the second node does not invalidate the data prefetched in the previous prefetch process and written to the second pool volume for subjecting the data to garbage collection, and
the previous prefetch process includes prefetching data from an address having a difference in data from a third virtual volume of a further older generation than the third virtual volume of the old generation, among the third virtual volumes of the old generation, and performing log-structured write of the prefetched data to any of the pool volumes.

9. The storage system according to claim 2, wherein
in the prefetch process, the processor of the second node invalidates write data written to the second pool volume in response to a write request before the prefetch process such that the write data is subject to garbage collection.

10. The storage system according to claim 9, wherein
the management information in the memory of the second node includes information indicating whether each piece of data written to the second pool volume is data prefetched and written in the prefetch process in response to a prefetch instruction or write data written in response to a write request, and
based on the management information, the processor of the second node specifies the write data written to the second pool volume in response to the write request before the prefetch process, and invalidates the specified write data.

11. The storage system according to claim 1, wherein
when a request is made to write the write data to the second virtual volume created as a virtual clone of the first virtual volume,
the processor of the second node
stores the write data in the second pool volume different from the first pool volume by the log-structured write, and stores entity of the write data in the physical drive of the second node, and
updates the mapping such that a link destination of the write data in the second virtual volume is write data stored in the second pool volume.

12. The storage system according to claim 1, wherein
the management information in each node includes logical-physical conversion data for managing correspondence between a logical storage destination of data and a physical storage destination of the data in an own node, and
when a virtual clone of the first virtual volume is created, the processor of the second node sets a physical storage destination of data virtually stored by the second virtual volume linked to the first pool volume to an invalid value, in the logical-physical conversion data.

13. The storage system according to claim 1, wherein
when a request is made to delete the second virtual volume created as a virtual clone of the first virtual volume,
the processor of the second node releases the mapping from the first pool volume to the third virtual volume, and releases the link between the second virtual volume and the first pool volume, and
the processor of the first node deletes the third virtual volume after the mapping in the second node is released.

14. The storage system according to claim 1, wherein
when a load on the first node exceeds a predetermined threshold due to a data input/output request to the second node, after the second virtual volume is created as a virtual clone of the first virtual volume,
the processor of the second node
after acquiring the entity of at least part of the data of the first pool volume linked to the second virtual volume from the first node and storing the data in the physical drive of the second node, copies the data to a third pool volume different from the first pool volume, and
updates the management information to link the second virtual volume and the third pool volume, for the data copied from the first pool volume to the third pool volume.

15. A memory control method comprising:
performing, by a first node among a plurality of nodes configuring a storage system, a virtual copy, which is a copy of mapping between an address of a virtual volume and an address of a pool, to a first virtual volume in the first node, to create a third virtual volume in the first node; and
performing, by a second node among the plurality of nodes configuring the storage system, mapping from a first pool volume in the second node to the third virtual volume created in the first node, linking an address of the first pool volume, which is mapped to the third virtual volume, to an address of a second virtual volume on a one-to-one basis, and when an address of data to be written is an address of the second virtual volume in the second node, performing log-structured write of the data to a second pool volume in the second node, wherein
the log-structured write includes storing post-update data in the pool while pre-update data remains in the pool, and changing a mapping destination address of the address of the virtual volume from an address of the pre-update data to an address of the post-update data.

* * * * *